United States Patent
Itoh et al.

(10) Patent No.: US 8,593,584 B2
(45) Date of Patent: Nov. 26, 2013

(54) LIQUID-CRYSTAL DISPLAY DEVICE INCLUDING FLOATING ELECTRODE

(75) Inventors: Ryohki Itoh, Osaka (JP); Takaharu Yamada, Osaka (JP); Yuhko Hisada, Osaka (JP); Satoshi Horiuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/377,686

(22) PCT Filed: Mar. 11, 2010

(86) PCT No.: PCT/JP2010/054117
§ 371 (c)(1),
(2), (4) Date: Dec. 12, 2011

(87) PCT Pub. No.: WO2011/001716
PCT Pub. Date: Jan. 6, 2011

(65) Prior Publication Data
US 2012/0081626 A1    Apr. 5, 2012

(30) Foreign Application Priority Data
Jun. 30, 2009    (JP) ................. 2009-155457

(51) Int. Cl.
*G02F 1/1333*    (2006.01)
*G02F 1/133*    (2006.01)
*G02F 1/1343*    (2006.01)

(52) U.S. Cl.
USPC .............. 349/54; 349/33; 349/141; 349/146

(58) Field of Classification Search
USPC ..................... 349/54, 33, 141, 146
See application file for complete search history.

(56) References Cited

U.S. PATENT DOCUMENTS

| | | | |
|---|---|---|---|
| 6,356,331 B1 | 3/2002 | Ono et al. | |
| 2001/0028429 A1 | 10/2001 | Wu | |
| 2003/0184699 A1 | 10/2003 | Matsumoto et al. | |
| 2004/0141098 A1 | 7/2004 | Suzuki et al. | |
| 2004/0222419 A1 | 11/2004 | Matsui et al. | |
| 2005/0099567 A1 | 5/2005 | Shimizu et al. | |
| 2006/0268198 A1 | 11/2006 | Utsumi et al. | |
| 2007/0046883 A1 | 3/2007 | Shimizu et al. | |
| 2008/0002078 A1* | 1/2008 | Ito .................................. 349/42 |

(Continued)

FOREIGN PATENT DOCUMENTS

| | | |
|---|---|---|
| EP | 2 042 917 A1 | 4/2009 |
| JP | 10-301141 A | 11/1998 |

(Continued)

OTHER PUBLICATIONS

Official Communication issued in International Patent Application No. PCT/JP2010/054117, mailed on Apr. 27, 2010.

*Primary Examiner* — Mike Qi
(74) *Attorney, Agent, or Firm* — Keating & Bennett, LLP

(57) ABSTRACT

The present invention provides a liquid-crystal display device in which a pixel defect does not occur even when an electrode becomes disconnected. The liquid-crystal display device according to the present invention comprises a liquid crystal layer and a pair of substrates between which the liquid crystal layer is interposed. At least one of the pair of substrates includes an electrode that applies a voltage to the liquid crystal layer. The electrode that applies the voltage to the liquid crystal layer includes two or more linear portions. The substrate comprising the electrode that applies the voltage to the liquid crystal layer, from among the pair of substrates, includes a floating electrode that overlaps at least two of the two or more linear portions via an insulating film.

16 Claims, 38 Drawing Sheets

(56) References Cited

U.S. PATENT DOCUMENTS

2008/0117349 A1 5/2008 Chang et al.
2009/0103035 A1 4/2009 Suzuki et al.

FOREIGN PATENT DOCUMENTS

| | | | |
|---|---|---|---|
| JP | 2000-035590 A | 2/2000 |
| JP | 2001-091972 A | 4/2001 |
| JP | 2003-295207 A | 10/2003 |
| JP | 2005-084180 A | 3/2005 |
| JP | 2006-330215 A | 12/2006 |
| JP | 2007-316535 A | 12/2007 |
| JP | 2009-103925 A | 5/2009 |

* cited by examiner

LIQUID-CRYSTAL DISPLAY DEVICE INCLUDING FLOATING ELECTRODE

TECHNICAL FIELD

The present invention relates to a liquid-crystal display device, and more particularly to a liquid-crystal display device in which features are applied to shapes of an electrode and a wiring.

BACKGROUND ART

A liquid-crystal display device (LCD) is a display device in which transmission/blocking of light (ON/OFF of a display) is controlled by controlling an alignment of liquid crystal molecules exhibiting birefringence. A VA (Vertical Alignment) mode, an IPS (In-Plane Switching) mode, and so on may be used in the LCD as a display method. In the VA mode, liquid crystal molecules having negative dielectric constant anisotropy are aligned vertically relative to a substrate surface, and in the IPS mode, liquid crystal molecules having positive dielectric constant anisotropy are aligned horizontally relative to the substrate surface, and a transverse electric field is applied to a liquid crystal layer.

In the IPS mode, a transverse electric field is applied to the liquid crystal layer, and therefore features are applied to an electrode and a wiring. A typical IPS mode liquid-crystal display device includes a common electrode to which a reference potential is supplied and a pixel electrode to which a potential of a pixel to be displayed is supplied (see Patent Documents 1 to 4, for example). A scanning line to which a scanning signal is supplied, a thin film transistor (TFT), and so on are also provided. The common electrode and the pixel electrode both have a comb tooth shape and are disposed such that comb teeth of the respective electrodes are disposed alternately. The liquid crystal is driven by an electric field formed between the pixel electrode and the common electrode.

Patent Document 1: Japanese Patent Application Publication No. H10-301141
Patent Document 2: Japanese Patent Application Publication No. 2000-35590
Patent Document 3: Japanese Patent Application Publication No. 2003-295207
Patent Document 4: Japanese Patent Application Publication No. 2006-330215

In a liquid-crystal display device of a mode in which the electrode and the wiring are formed narrowly, the electrode and the wiring are preferably formed as narrowly as possible from the viewpoint of improving a transmittance. When the electrode and the wiring are formed too narrowly, however, a disconnection may occur, making it impossible to supply the required potential to the electrode and the wiring.

FIG. 73 is a planar schematic view showing a disconnection in a conventional liquid-crystal display device. Here, an IPS mode liquid-crystal display device will be described on the basis of Patent Document 1. Normally in an IPS mode liquid-crystal display device, various wirings and electrodes are provided on a TFT (thin film transistor) array substrate.

As shown in FIG. 73, the TFT substrate includes a scanning electrode wiring 125 and a first common electrode wiring 122. The scanning electrode wiring 125 and the first common electrode wiring 122 are formed on an identical plane. Further, an insulating film is formed on the scanning electrode wiring 125 and first common electrode wiring 122, and a signal electrode wiring 124, a pixel electrode wiring 121, and a second common electrode wiring 123 are formed on the insulating film. The first common electrode wiring 122 and the second common electrode wiring 123 are electrically connected. The scanning electrode wiring 125, signal electrode wiring 124, and pixel electrode wiring 121 are connected via a TFT 126 constituted by a semiconductor element. The TFT 126 functions as a switching element. The pixel electrode wiring 121 and the second common electrode wiring 123 respectively have a line width of 5 μm.

Opposed substrates having red, green, and blue color filters are disposed in positions opposing the TFT substrate via a liquid crystal layer. When the TFT 126 is ON, a signal potential is supplied to the pixel electrode wiring 121 from the signal electrode wiring 124. When the TFT 126 becomes unselected (OFF) thereafter, the potential of the pixel electrode wiring 121 is maintained such that an electric field is generated in a lateral direction between the pixel electrode wiring 121 and the second common electrode wiring 123. In accordance with an intensity of the electric field, an alignment direction of liquid crystal molecules aligned in a certain direction in a horizontal direction relative to the substrate surface changes to a different direction in-plane, and as a result, a polarization condition of light incident on the liquid crystal layer varies.

However, when a disconnection occurs in a location of the pixel electrode wiring 121 marked by an X symbol, as shown in FIG. 73, the signal potential is not supplied to the location that has become isolated due to the disconnection, and therefore an electric field is not generated between the isolated pixel electrode wiring 121 and the opposing second common electric wiring 123. Accordingly, a location indicated by diagonal lines in FIG. 73 no longer contributes to transmission, and as a result, a pixel in which the disconnection occurs is recognized as either a dark defect or a pixel having a drastically reduced brightness.

DISCLOSURE OF THE INVENTION

The present invention has been designed in consideration of the current circumstances described above, and an object thereof is to provide a liquid-crystal display device with which a pixel defect does not occur even when an electrode is disconnected.

Following various investigations into liquid-crystal display devices that exhibit few problems even when an electrode or a wiring is disconnected, the present inventors focused on means for performing a correction using a laser when an electrode or a wiring is disconnected. Further, the present inventors found that by additionally providing a corrective electrode or wiring to overlap a plurality of electrodes or wirings, the electrode or wiring to be corrected can be fused through laser irradiation when a disconnection occurs, thereby securing conduction. Thus, the present inventors solved the problem described above with great success, thereby arriving at the present invention.

More specifically, the present invention is a liquid-crystal display device comprising a liquid crystal layer and a pair of substrates between which the liquid crystal layer is interposed, wherein at least one of the pair of substrates includes an electrode that applies a voltage to the liquid crystal layer, the electrode that applies the voltage to the liquid crystal layer includes two or more linear portions, and the substrate comprising the electrode that applies the voltage to the liquid crystal layer, from among the pair of substrates, includes a floating electrode that overlaps at least two of the two or more linear portions via an insulating film (also referred to hereafter as a first liquid-crystal display device of the present invention).

The present invention is also a liquid-crystal display device comprising a liquid crystal layer and a pair of substrates between which the liquid crystal layer is interposed, wherein at least one of the pair of substrates includes an electrode that applies the voltage to the liquid crystal layer, the electrode that applies the voltage to the liquid crystal layer includes two or more linear portions, the substrate comprising the electrode that applies the voltage to the liquid crystal layer, from among the pair of substrates, includes a bridge electrode that bridges at least two of the two or more linear portions, and the bridge electrode is disposed on a different layer from the electrode that applies the voltage to the liquid crystal layer via an insulating film (also referred to hereafter as a second liquid-crystal display device of the present invention).

The first and second liquid-crystal display devices of the present invention include the liquid crystal layer and the pair of substrates between which the liquid crystal layer is interposed. By providing wiring, electrodes, semiconductor elements, and the like on the pair of substrates and applying a voltage to the liquid crystal layer, an alignment of liquid crystal molecules can be controlled. The liquid crystal layer is preferably formed from nematic liquid crystal molecules having positive or negative dielectric constant anisotropy. An alignment mode of the liquid-crystal display device differs depending on whether the dielectric constant anisotropy is positive or negative. Examples of liquid crystal control modes employed in the first and second liquid-crystal display devices of the present invention include a VA mode, an IPS mode, a twisted nematic (TN) mode, and so on. An electric field direction may be either horizontal to the substrate surface (a transverse electric field) or vertical to the substrate surface (a vertical electric field). By disposing an alignment layer on surfaces of the pair of substrates that contact the liquid crystal layer, an initial tilt of the liquid crystal molecules can be defined in a fixed direction. The initial tilt of the liquid crystal molecules may be either vertical or horizontal to the substrate surface.

At least one of the pair of substrates includes the electrode that applies the voltage to the liquid crystal layer, and the electrode that applies the voltage to the liquid crystal layer includes two or more linear portions. A pixel electrode to which a signal voltage is supplied, a common electrode to which a common voltage is supplied, and so on may be employed as the electrode that applies the voltage to the liquid crystal layer. Further, by providing the pixel electrode and the common electrode as a pair, the tilt of the liquid crystal molecules can be controlled by the electric field formed between the pixel electrode and the common electrode, and as a result, a degree of birefringence in the light passing through the liquid crystal layer can be controlled. Furthermore, the electrode that applies the voltage to the liquid crystal layer includes the two or more linear portions, and therefore the tilt of the liquid crystal molecules can be controlled finely.

In the first liquid-crystal display device of the present invention, the substrate comprising the electrode that applies the voltage to the liquid crystal layer, from among the pair of substrates, includes the floating electrode that overlaps at least two of the two or more linear portions via the insulating film. The floating electrode is an electrically isolated electrode that is not conductive with other conductive members. Therefore, the floating electrode is not electrically connected to the electrode that applies the voltage to the liquid crystal layer, and is disposed on a different layer therefrom via the insulating film. The floating electrode may overlap three or more of the two or more linear portions, as long as it overlaps at least two of the two or more linear portions. Further, the floating electrode does not have to overlap the entirety of the two or more linear portions, and to achieve an improvement in transmittance, the floating electrode preferably overlaps respective parts of the two or more linear portions. By disposing the floating electrode to overlap the two or more linear portions in this manner, when a disconnection occurs in a part of the linear portion such that a disconnected part is disconnected from the electrode that applies the voltage to the liquid crystal layer, another non-disconnected linear portion and the floating electrode can be fused, and thereby electrically connected, to each other by emitting a laser onto the non-disconnected linear portion and the floating electrode. Furthermore, the disconnected part can be fused and electrically connected to the floating electrode by emitting a laser onto the disconnected part and the floating electrode, and therefore the disconnected part can be corrected so as to secure an electric connection therewith. When a voltage is not applied as designed due to a disconnection, the corresponding pixel is recognized as a defective pixel, or more specifically as a dark defect, and as a result, a display quality of the liquid-crystal display device deteriorates. Hence, with the first liquid-crystal display device of the present invention, it is possible to obtain a liquid-crystal display device that can respond easily to a disconnection. Further, it enables to form the two or more linear portions narrowly to achieve an improvement in transmittance.

In the second liquid-crystal display device of the present invention, the substrate comprising the electrode that applies the voltage to the liquid crystal layer, from among the pair of substrates, includes the bridge electrode that bridges at least two of the two or more linear portions. Further, the bridge electrode is disposed on a different layer from the electrode that applies the voltage to the liquid crystal layer via an insulating film. The bridge electrode is electrically connected to other conductive members and is capable of securing electric conduction between one conductive member and another conductive member. The bridge electrode may be disposed to overlap three or more of the two or more linear portions, as long as the bridge electrode overlaps at least two of the two or more linear portions. Further, the bridge electrode does not have to overlap the entirety of the two or more linear portions, and to achieve an improvement in transmittance, the bridge electrode is preferably disposed to overlap respective parts of the two or more linear portions. By connecting the two or more linear portions to each other via the bridge electrode in this manner, when a disconnection occurs in a part of the linear portion such that a disconnected part is disconnected from the electrode that applies the voltage to the liquid crystal layer, an electric connection between the disconnected part and the electrode that applies the voltage to the liquid crystal layer is secured via the bridge electrode, and therefore a pixel defect does not occur. Hence, with the second liquid-crystal display device of the present invention, it is possible to obtain a highly reliable liquid-crystal display device in which a disconnection does not pose a problem. Further, it enables to form the two or more linear portions narrowly to achieve an improvement in transmittance.

The configuration of each of the first and second liquid-crystal display devices of the present invention is not especially limited by other components as long as it essentially includes such components.

Preferable embodiments of the first and second liquid-crystal display devices of the present invention are mentioned in more detail below.

The floating electrode or the bridge electrode is preferably linearly shaped. To ensure that the floating electrode or the bridge electrode overlaps a part of each of the two or more linear portions and to secure transmittance, the floating electrode and bridge electrode preferably have a narrow elongated shape. Further, a linear shape is efficient since it can be used as a reference during alignment adjustment, which is performed in a manufacturing process to determine whether or not other constitutional members have been formed appropriately.

The floating electrode is preferably composed of a metallic element. A conductive member formed from a metallic element is fused more easily by laser irradiation than a conductive member formed from a metal oxide, a metal nitride, and so on, for example, and therefore correction can be performed more easily.

The floating electrode or the bridge electrode preferably overlaps respective end portions of the two or more linear portions. By causing the floating electrode or bridge electrode to overlap the end portions of the linear portions, a range in which a correction can be performed on a region in which a disconnection is likely to occur can be widened.

A width of the floating electrode is preferably substantially identical to or greater than a width of each of the two or more linear portions. By forming the linear portions to be as wide as or wider than the width of the floating electrode, a laser irradiation range can be widened, making correction through laser irradiation easier. Further, the likelihood of a disconnection in the floating electrode itself can be reduced.

A width of the floating electrode in a site overlapping the two or more linear portions is preferably greater than a width of the floating electrode in a site not overlapping the two or more linear portions. As a result, correction through laser irradiation can be performed more easily, and the site not overlapping the two or more linear portions can be formed narrowly, enabling an increase in transmittance.

The liquid-crystal display device preferably includes a plurality of floating electrodes or a plurality of bridge electrodes, and at least one of the plurality of floating electrodes or the plurality of bridge electrodes preferably overlaps one end portion of each of the two or more linear portions while at least one of the other of the plurality of floating electrodes or the plurality of bridge electrodes overlaps another end portion of each of the two or more linear portions. When each linear portion has two end portions, the laser irradiation range can be widened by disposing the floating electrode to overlap both end portions. Further, the range that can be covered by the bridge electrode can be widened by disposing the bridge electrode to overlap both end portions.

The liquid-crystal display device preferably includes a plurality of floating electrodes or a plurality of bridge electrodes, and at least two of the plurality of floating electrodes or the plurality of bridge electrodes each preferably overlap one end portion of each of the two or more linear portions. By increasing the number of floating electrodes, the number of possible laser irradiation subjects can be increased, making correction easier. Further, by increasing the number of bridge electrodes, the likelihood of a defect caused by a disconnection can be reduced.

The substrate comprising the electrode that applies the voltage to the liquid crystal layer preferably includes scanning wirings and signal wirings, and the floating electrode or the bridge electrode is preferably disposed within a range surrounded by the scanning wirings and the signal wirings. When the range surrounded by the scanning wirings and the signal wirings is set as a sub-pixel and the sub-pixel is set as a single unit of a display screen of the liquid-crystal display device, the floating electrode or the bridge electrode is preferably held within the sub-pixel, or in other words forms in sub-pixel units, so that defects in the sub-pixel can be corrected.

The floating electrode is preferably disposed in a position farther from the liquid crystal layer than the electrode that applies the voltage to the liquid crystal layer. By disposing the floating electrode in this manner, the floating electrode can be used as a shielding member for shielding the electrode that applies the voltage to the liquid crystal layer from an electric field. For example, an effect based on variation in a potential of another wiring or electrode on a potential of the electrode that applies the voltage to the liquid crystal layer can be reduced, and as a result, an alignment disturbance in the liquid crystal molecules in the liquid crystal layer can be suppressed.

The end portions of the two or more linear portions preferably overlap a light shielding film. Alignment disturbances are likely to occur in a region of the liquid crystal layer that overlaps the end portions of the comb teeth of the comb-shaped electrode, and therefore this region is preferably shielded from light.

The electrode that applies the voltage to the liquid crystal layer is preferably a comb-shaped electrode comprising a shaft portion and two or more comb teeth that project from the shaft portion, and the two or more linear portions are preferably the two or more comb teeth. According to the present invention, when the electrode that applies the voltage to the liquid crystal layer is a comb-shaped electrode, problems caused by a disconnection in the comb teeth can be eliminated.

The liquid-crystal display device preferably includes a pair of the comb-shaped electrodes, and respective comb teeth of the pair of comb-shaped electrodes preferably are disposed alternately via fixed intervals. An electric field generated when a potential difference is applied between the pair of comb-shaped electrodes is an arch-shaped transverse electric field. The alignment of the liquid crystal molecules corresponds to an orientation of the electric field, and therefore a similar display is exhibited in both a head-on direction and a diagonal direction relative to the substrate surface. As a result, a wide viewing angle characteristic is obtained. Further, in this type of control method, with which a transverse electric field is generated, even when a disconnection occurs in the comb teeth of only one of the pair of comb-shaped electrodes, the electric field is not formed in relation to the comb teeth of the other comb-shaped electrode, and therefore the electric field is not generated over a wide range. Hence, serious pixel defects are particularly likely to occur. By applying the features of the present invention, however, pixel defects can be dealt with easily, and therefore a highly reliable transverse electric field type liquid-crystal display device is obtained. Note that the pair of electrodes may be formed on an identical layer or different layers.

The floating electrode preferably overlaps the comb teeth of both of the pair of comb-shaped electrodes. When it is possible to overlap the floating electrode with the comb teeth of both of the pair of comb-shaped electrodes, both of the electrodes can be dealt with by the single floating electrode, leading to an improvement in efficiency.

The floating electrode or the bridge electrode preferably overlaps comb teeth of a comb-shaped electrode having a larger number of comb teeth, from among the pair of comb-shaped electrodes. As the number of comb teeth increases, the likelihood of a disconnection also increases, and therefore the floating electrode or the bridge electrode preferably overlaps at least the comb-shaped electrode having the larger number of comb teeth, from among the pair of comb-shaped electrodes.

The floating electrode or the bridge electrode preferably overlaps comb teeth of a comb-shaped electrode having narrower comb teeth, from among the pair of comb-shaped electrodes. As the comb teeth become narrower, the likelihood of a disconnection increases, and therefore the floating electrode or the bridge electrode preferably overlaps at least the comb-shaped electrode having the narrower comb teeth, from among the pair of comb-shaped electrodes.

Effect of the Invention

With the liquid-crystal display device according to the present invention, a correction for securing conduction can be performed and the occurrence of a pixel defect can be suppressed when a disconnection occurs in an electrode that applies the voltage to a liquid crystal layer.

BRIEF DESCRIPTION OF THE DRAWINGS

FIG. 3-1 is a sectional schematic view showing the liquid-crystal display device according to Embodiment 1-1 in a condition where a voltage is not applied to a liquid crystal layer;

FIG. 3-2 is a sectional schematic view showing the liquid-crystal display device according to Embodiment 1-1 in a condition where a voltage is applied to the liquid crystal layer;

FIG. 17-1 is a sectional schematic view showing the liquid-crystal display device according to Embodiment 1-10 in a condition where a voltage is not applied to the liquid crystal layer;

FIG. 17-2 is a sectional schematic view showing the liquid-crystal display device according to Embodiment 1-10 in a condition where a voltage is applied to the liquid crystal layer;

FIG. 72-1 is a sectional schematic view showing the liquid-crystal display device according to Embodiment 5-15 in a condition where a voltage is not applied to the liquid crystal layer;

FIG. 72-2 is a sectional schematic view showing the liquid-crystal display device according to Embodiment 5-15 in a condition where a voltage is applied to the liquid crystal layer.

MODES FOR CARRYING OUT THE INVENTION

Figure 1:
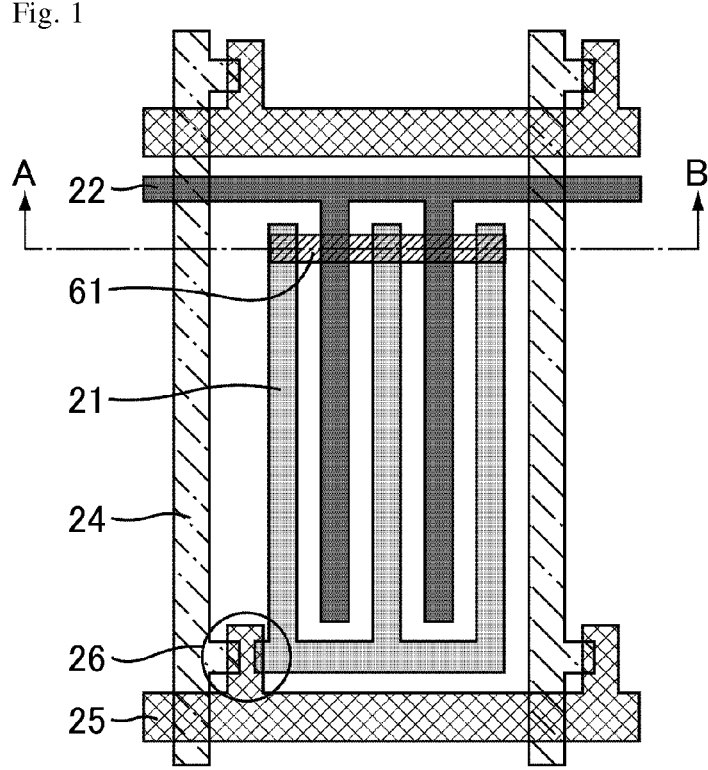
FIG. 1 is a planar schematic view showing a single sub-pixel unit of a TFT substrate provided in liquid-crystal display devices according to Embodiments 1-1, 1-9 and 1-10.

The present invention will be mentioned in more detail referring to the drawings in the following embodiments, but is not limited to these embodiments.

Embodiment 1

A liquid-crystal display device according to Embodiment 1 will be described below in ten individual embodiments, namely Embodiments 1-1 to 1-10. A feature of the respective liquid-crystal display devices according to Embodiment 1 is that both a pixel electrode and a common electrode have comb teeth on one side of a single shaft.

Embodiment 1-1

Figure 2:
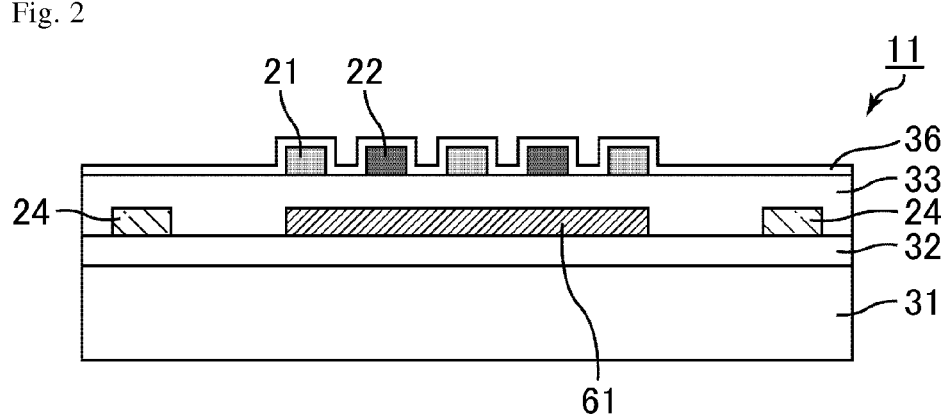
FIG. 2 is a sectional schematic view showing the TFT substrate along an A-B line of FIG. 1.

FIG. 1 is a planar schematic view showing a single sub-pixel unit of a TFT substrate provided in a liquid-crystal display device according to Embodiment 1-1. FIG. 2 is a sectional schematic view showing the TFT substrate along an A-B line of FIG. 1.

As shown in FIG. 1, a pixel electrode 21 is connected to a thin film transistor (TFT) 26 having a semiconductor layer and connected to a source wiring (a signal wiring) 24 via the TFT 26. Further, the TFT 26 is connected to the source wiring 24 and the pixel electrode 21 are electrically connected at a timing of a gate voltage applied to the semiconductor layer through the gate wiring (a scanning wiring) 25, whereby a signal voltage is applied to the pixel electrode 21. The pixel electrode 21 and a common electrode 22 both have a basic constitution including a shaft part serving as a trunk and a comb tooth part projecting from the shaft. A plurality of source wirings 24 are provided to extend substantially parallel to each other in a longitudinal direction. Further, a plurality of gate wirings 25 are provided to extend substantially parallel to each other in a latitudinal direction and to intersect the respective source wirings 24. The source wiring 24 and the gate wiring 25 are disposed on different layers via an insulating film. The pixel electrode 21 and the common electrode 22 are disposed on an identical layer, but the layer on which the source wiring 24 is formed and the layer on which the gate wiring 25 is formed are disposed on different layers via an insulating film.

As shown in FIG. 2, the TFT substrate 11 includes a glass substrate 31, a first insulating film 32 provided on the glass substrate 31, and a second insulating film 33 provided on the first insulating film 32. The source wiring 24 and a corrective floating electrode 61, to be described below, are provided between the first insulating film 32 and the second insulating film 33. A pair of comb-shaped electrodes whose comb teeth are disposed alternately via fixed intervals are provided on the second insulating film 33. One of the pair of comb-shaped electrodes is the pixel electrode 21 to which the signal voltage is applied through the signal wiring 24, while the other is the common electrode 22 to which a common voltage is applied through a common wiring. A metal oxide such as light transmissive indium tin oxide (ITO) or indium zinc oxide (IZO) may be used favorably as a material of the pixel electrode 21 and the common electrode 22. A width of the comb teeth of the pixel electrode 21 and the common electrode 22 is preferably as narrow as possible, for example between 2 and 8 µm. Further, a distance between the comb teeth of the pixel electrode 21 and the comb teeth of the common electrode 22 is preferably between 2 and 10 µm. A vertical alignment layer 36 for defining an initial tilt of liquid crystal molecules is disposed on the pixel electrode 21 and the common electrode 22.

In FIG. 2, a thickness of the first insulating film 32 is preferably between 0.2 and 0.6 µm and a thickness of the second insulating film 33 is preferably between 0.3 and 3.0 µm. Further, a thickness of the pixel electrode 21 is preferably between 0.05 and 0.15 µm, a thickness of the common electrode 22 is preferably between 0.05 and 0.15 µm, a thickness of the source wiring 24 is preferably between 0.1 and 0.3 µm, and a thickness of the floating electrode 61 is preferably at least 0.1 µm. The thickness of the second insulating film 33 is preferably less than 0.5 µm to facilitate correction through laser irradiation but preferably at least 2 µm to prevent the pixel electrode 21 or the common electrode 22 from being affected by variation in a voltage from another wiring.

As shown in FIG. 1, the corrective floating electrode 61 is provided to overlap end portions of the comb teeth (linear portions) of the pixel electrode 21 and end portions of the comb teeth (linear portions) of the common electrode 22. The floating electrode 61 takes a linear shape extending in a substantially orthogonal direction to a length direction of the comb teeth of the pixel electrode 21 and a length direction of the comb teeth of the common electrode 22, and overlaps both the end portions of the comb teeth of the pixel electrode 21 and the end portions of the comb teeth of the common electrode 22. Further, the floating electrode 61 is disposed in a region surrounded by the gate wiring (scanning wiring) 25 and the source wiring (signal wiring) 24, or in other words within a single sub-pixel. As shown in FIG. 2, the floating electrode 61 is disposed on the same layer as the source wiring 24 but separated, and thereby electrically isolated, from the source wiring 24 and the gate wiring 25 via an insulating film. The material of the floating electrode 61 may be light transmissive or not, and as long as a conductive material is used, there are no particular limitations thereon. To obtain a favorable fusing ability during laser irradiation, however, a metallic element such as tantalum (Ta), molybdenum (Mo), or aluminum (Al) is preferable.

In the TFT substrate 11 thus configured, the voltage applied to the gate wiring 25 or the source wiring 24 may switch between positive and negative, and at this time, the voltage supplied to the pixel electrode 21 or the common electrode 22 may vary in response to the varied voltage. By disposing the floating electrode 61 below the pixel electrode 21 or the common electrode 22 via the second insulating film 33, however, the effect of variation in the voltage applied to the gate wiring 25 or the source wiring 24 can be reduced, and therefore the floating electrode 61 can be used as a so-called electric field shielding member. The floating electrode 61 extends in a substantially orthogonal direction to the length directions of the respective comb teeth of the pixel electrode 21 and the common electrode 22, and therefore an electric field shielding effect can be obtained in a wide range of the pixel electrode 21 and the common electrode 22.

From the viewpoint of transmittance, the floating electrode 61 is preferably light transmissive. However, both the insulating film and the metal in a part subjected to laser irradiation lose their flat shape, and as a result, an alignment disturbance may occur in the liquid crystal molecules. Hence, in order to shield a region that overlaps the corrected part, the floating electrode 61 preferably has a light shielding property.

The width of the floating electrode 61 is preferably no smaller than 2 µm. Further, to facilitate correction through laser irradiation and improve the electric field shielding effect, the width of the floating electrode 61 is preferably greater than the width of the comb teeth of the pixel electrode 21 and the width of the comb teeth of the common electrode 22.

The common electrode 22 is connected to the common wiring. The gate wiring 25 and the source wiring 24 are disposed to intersect, and a region surrounded by the gate wiring 25 and the source wiring 24 constitutes a single sub-pixel. A color filter of a single color corresponds to a single sub-pixel, and a single pixel is constituted by a plurality of sub-pixels.

Note that in contrast to the floating electrode 61, the pixel electrode 21 and the common electrode 22 may be extended to a region that overlaps the gate wiring 25 or the source wiring 24, and in so doing, an aperture ratio can be increased.

In Embodiment 1-5, to be described below, a bridge electrode is used instead of the floating electrode, but in consideration of the difficulty of providing a contact hole in the comb teeth, it may be said that a greater yield is obtained with the constitution of Embodiment 1-1.

Figures 1, 3:
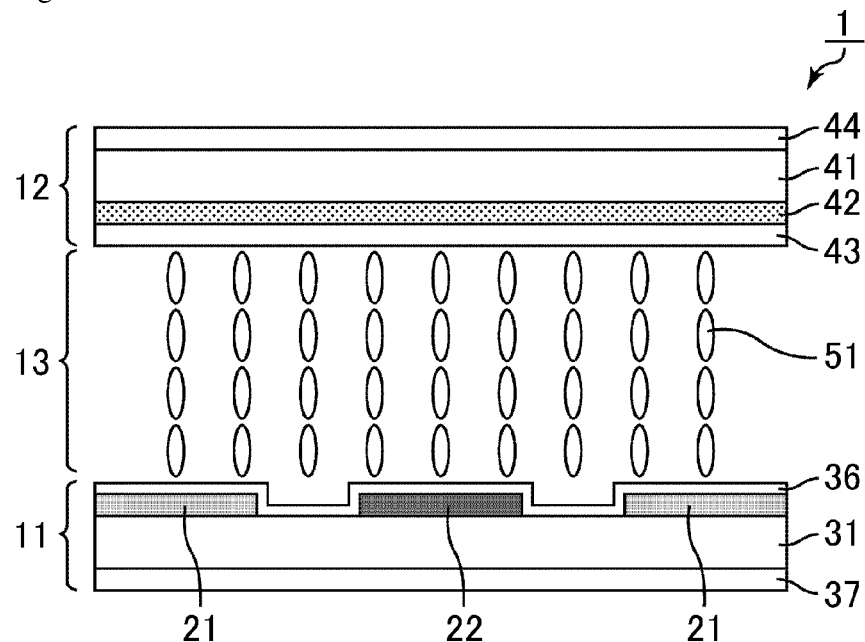
Figures 2, 3:
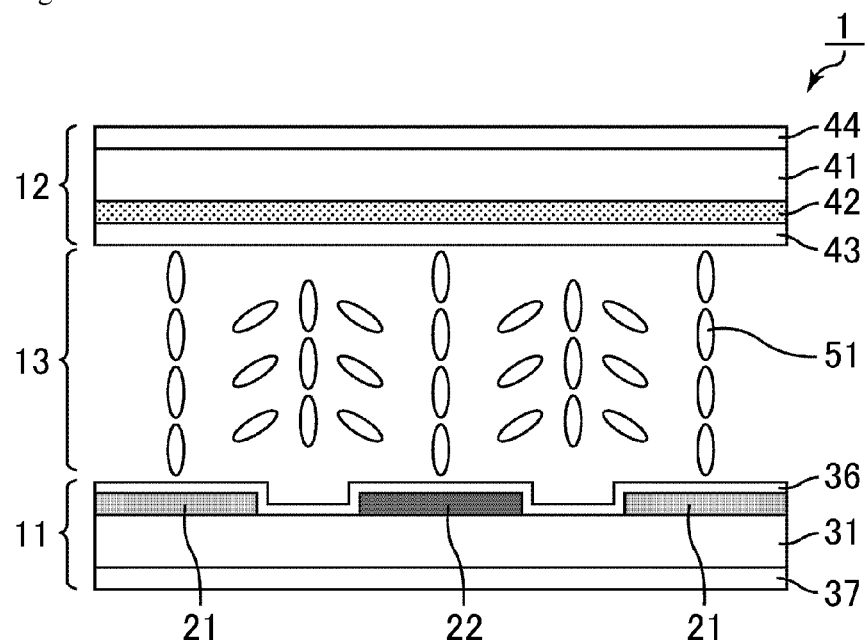

A method of controlling the liquid crystal molecules in the liquid-crystal display device according to Embodiment 1 will now be described. FIGS. 3-1 and 3-2 are sectional schematic views showing the liquid-crystal display device according to Embodiment 1-1 and illustrating behavior of the liquid crystal molecules in particular detail. FIG. 3-1 shows a condition in which a voltage is not applied to the liquid crystal layer, and FIG. 3-2 shows a condition in which a voltage is applied to the liquid crystal layer.

As shown in FIGS. 3-1 and 3-2, the liquid-crystal display device according to Embodiment 1 includes a liquid crystal display panel 1 comprising a liquid crystal layer 13 and a pair of substrates 11, 12 between which the liquid crystal layer 13 is interposed. More specifically, in the liquid-crystal display device according to Embodiment 1, the TFT substrate 11, the liquid crystal layer 13, and an opposed substrate 12 are provided in that order from a back surface side toward a viewing surface side. The liquid crystal layer 13 contains nematic liquid crystal having positive dielectric constant anisotropy ($\Delta\epsilon > 0$). Further, in the liquid-crystal display device according to Embodiment 1, a backlight unit is provided on a back surface side of the liquid crystal display panel 1.

The TFT substrate 11 includes the glass substrate 31, and the pixel electrode 21 and common electrode 22 are provided on the liquid crystal layer 13 side of the glass substrate 31. The pixel electrode 21 and the common electrode 22 are disposed alternately in a latitudinal direction when seen from a cross-sectional direction thereof.

The opposed substrate 12 includes a glass substrate 41 and a color filter 42. The color filter 42 is disposed on the liquid crystal layer 13 side of the glass substrate 41. The color filter 42 is constituted by a filter having a red, green, or blue color, and one color filter corresponds to one sub-pixel. By combining red, green, and blue sub-pixels, a single pixel is formed. Note that the color of the color filter 42 does not necessarily have to be one of these colors. Further, the number of colors of the color filter is not limited to three, and four or more colors may be employed. A black matrix (BM) is disposed between color filters of different colors to prevent mixed color and light leakage.

Vertical alignment layers 36, 43 are disposed on respective surfaces of the TFT substrate 11 and the opposed substrate 12 that contact the liquid crystal layer 13. As shown in FIG. 3-1, when no voltage is applied, liquid crystal molecules 51 are aligned homeotropically, or in other words aligned vertically relative to the surfaces of the pair of substrates 11, 12. More specifically, respective major axes of the rod-shaped liquid crystal molecules 51 are oriented in a substantially orthogonal direction to the surfaces of the substrates 11, 12, and all of the liquid crystal molecules 51 are arranged regularly in an identical direction.

When a voltage is applied between the pixel electrode 21 and the common electrode 22, as shown in FIG. 3-2, variation occurs in the alignment of the liquid crystal molecules 51 along an arch-shaped transverse electric field formed between the electrodes. A group of the liquid crystal molecules 51 thus affected by the electric field exhibits a bend alignment that is symmetrical about an intermediate region between the comb teeth (the pixel electrode 21 and the common electrode 22) and oriented in the latitudinal direction overall. As shown in FIG. 3-2, however, the liquid crystal molecules 51 positioned at a terminal end of the arch-shaped transverse electric field, or in other words the liquid crystal molecules 51 positioned directly above the pixel electrode 21 and the common electrode 22, are less likely to be affected by the electric field variation and therefore remain aligned in a substantially orthogonal direction to the surfaces of the substrates 11, 12. Further, the liquid crystal molecules 51 positioned in the intermediate region between the comb teeth (the pixel electrode 21 and the common electrode 22) and furthest removed from the comb teeth in the region between the comb teeth (the pixel electrode 21 and the common electrode 22) also remain aligned in a substantially orthogonal direction to the surfaces of the pair of substrates 11, 12.

The TFT substrate 11 and the opposed substrate 12 respectively include polarizers 37, 44. In the TFT substrate 11, the polarizer 37 is disposed furthest toward the back surface side of the TFT substrate 11, and in the opposed substrate 12, the polarizer 44 is disposed furthest toward the viewing surface side of the opposed substrate 12. The polarizers 37, 44 are capable of converting natural light emitted from a light source into polarized light that oscillates in a certain fixed direction (a polarization axis direction).

In Embodiment 1, the liquid crystal molecules 51 are aligned in a substantially orthogonal direction to the surfaces of the substrates 11, 12 when no voltage is applied. Accordingly, a transmission axis of the polarizer 37 provided on the TFT substrate 11 and a transmission axis of the polarizer 44 provided on the opposed substrate 12 have a mutually intersecting (a cross nicol) relationship, and therefore, when no voltage is applied, light transmitted through the liquid crystal layer 13 is blocked by the polarizers 37, 44. By setting a vertical alignment as an initial alignment of the liquid crystal molecules 51 and disposing the polarizers 37, 44 in a cross nicol arrangement in this manner, a normally black mode having a high contrast ratio can be obtained as a display mode.

When a voltage is applied, on the other hand, the liquid crystal molecules 51 exhibit an alignment corresponding to the transverse electric field, and at this time, an oscillation direction (the polarization axis) of the light passing through the liquid crystal layer 13 varies. Accordingly, the light that passes through the liquid crystal layer 13 can pass through the polarizer 44 on the opposed substrate 12 side, and as a result, this light passes through the liquid crystal display panel 1 to be used as display light.

Hence, the control method for the liquid-crystal display device according to Embodiment 1-1 corresponds to a mode in which the alignment of the liquid crystal molecules is controlled using a transverse electric field. As described above, however, the vertical alignment layer is provided such that when a voltage is not applied, the liquid crystal molecules 51 are aligned homeotropically, or in other words aligned vertically relative to the surfaces of the pair of substrates 11, 12, and this differs from a so-called IPS mode, in which the liquid crystal molecules 51 are aligned homogeneously, or in other words aligned horizontally relative to the surfaces of the pair of substrates 11, 12, when a voltage is not applied. Note that this point applies similarly to liquid-crystal display devices of Embodiments 1-2 to 1-9, to be described below.

Figure 4:
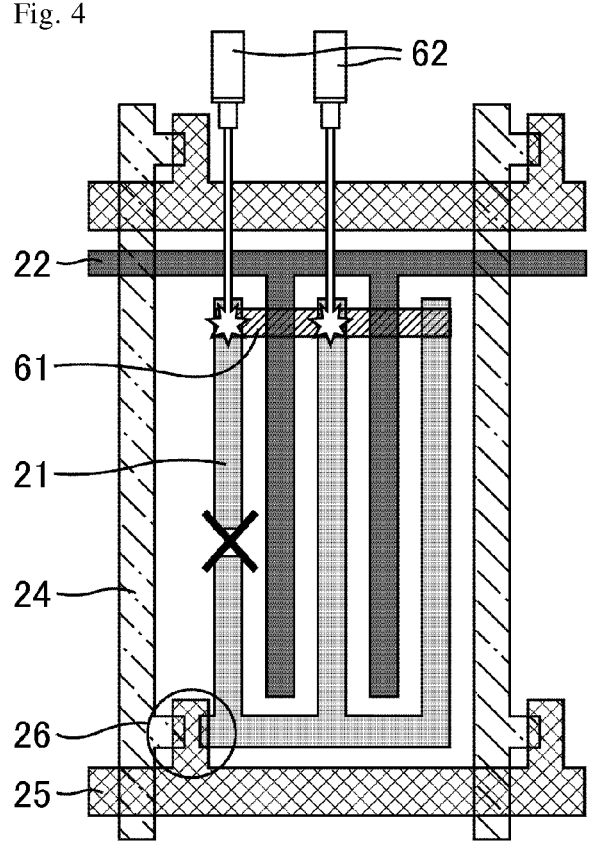
FIG. 4 is a planar schematic view showing the manner in which a correction is performed through laser irradiation when a disconnection occurs in the liquid-crystal display device according to Embodiment 1-1.

A method of performing a correction using laser irradiation when a disconnection occurs in the liquid-crystal display device according to Embodiment 1 will now be described. FIG. 4 is a planar schematic view showing the manner in which a correction is performed through laser irradiation when a disconnection occurs in the liquid-crystal display device according to Embodiment 1-1. A device integrating an optical microscope and a laser oscillator is preferably employed as a device for performing the laser correction.

As shown in FIG. 4, in the liquid-crystal display device according to Embodiment 1-1, the floating electrode 61 is disposed in a region overlapping the end portion of the pixel electrode 21. When a disconnection occurs in a part of the comb teeth of the pixel electrode 21, an electric field is no longer formed between the disconnected comb tooth of the pixel electrode 21 and the opposing comb tooth of the common electrode 22, and therefore a sufficient voltage is not applied to a region of the liquid crystal layer 13 that overlaps the pixel. As a result, the liquid crystal molecules 51 remain vertically aligned such that a dark display is generated. In this case, first, the end portion of the disconnected comb tooth of the pixel electrode 21 and a part of the floating electrode 61 that overlaps the disconnected comb tooth of the pixel electrode 21 are fused by laser using a laser device 62 so as to be connected each other, whereupon the end portions of the non-disconnected comb teeth of the pixel electrode 21 and the part of the floating electrode 61 that overlaps the end portions of the non-disconnected comb teeth of the pixel electrode 21 are fused by laser using the laser device 62 so as to be connected each other. As a result, the signal voltage can be supplied to the entire pixel electrode 21 via the floating electrode 61, and therefore a pixel defect can be avoided.

Embodiment 1-2

Figure 5:
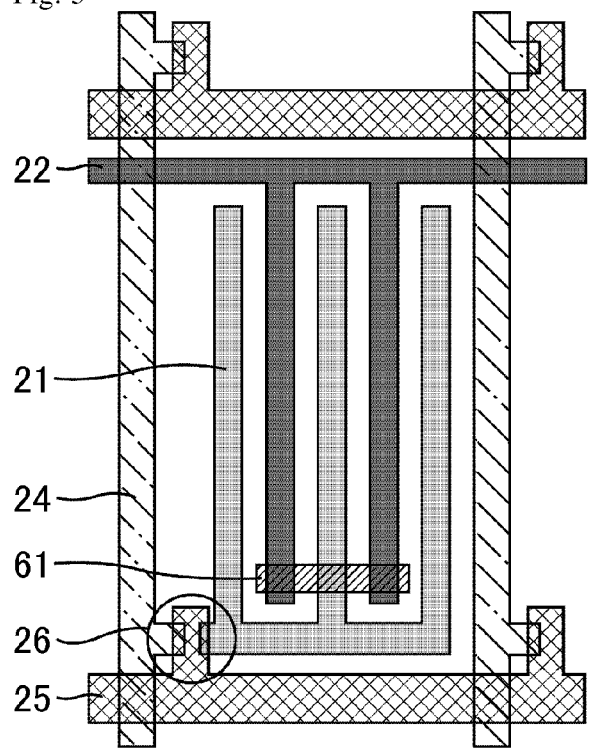
FIG. 5 is a planar schematic view showing a single sub-pixel unit of a TFT substrate provided in a liquid-crystal display device according to Embodiment 1-2.

FIG. 5 is a planar schematic view showing a single sub-pixel unit of a TFT substrate provided in a liquid-crystal display device according to Embodiment 1-2. As shown in FIG. 5, in the liquid-crystal display device according to Embodiment 1-2, the floating electrode 61 is disposed in a region that overlaps the end portion of the common electrode 22.

Figure 6:
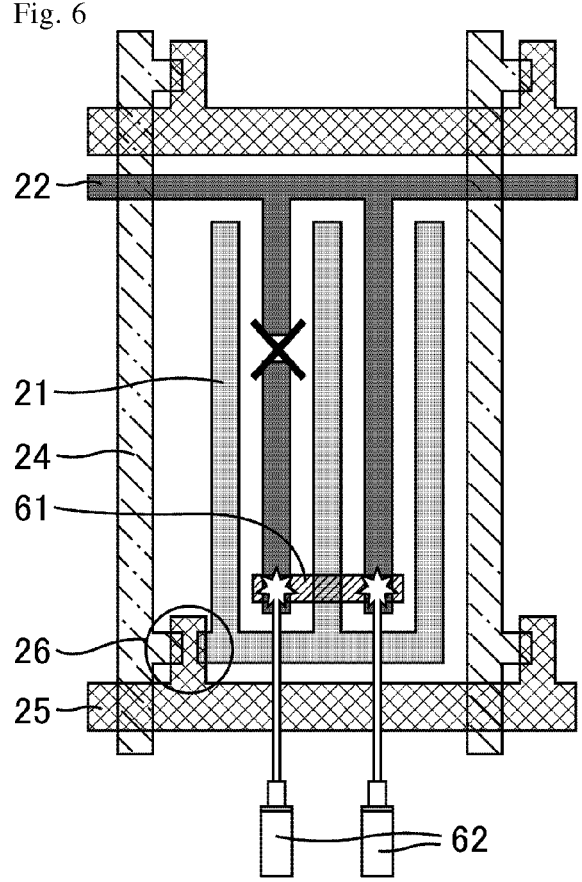
FIG. 6 is a planar schematic view showing the manner in which a correction is performed through laser irradiation when a disconnection occurs in the liquid-crystal display device according to Embodiment 1-2.

FIG. 6 is a planar schematic view showing the manner in which a correction is performed through laser irradiation when a disconnection occurs in the liquid-crystal display device according to Embodiment 1-2. As shown in FIG. 6, when a disconnection occurs in a part of the comb teeth of the common electrode 22, an electric field is no longer formed between the disconnected comb tooth of the common electrode 22 and the opposing comb tooth of the pixel electrode 21, and therefore a sufficient voltage is not applied to a region of the liquid crystal layer 13 that overlaps the pixel. As a result, the liquid crystal molecules 51 remain vertically aligned such that a dark display is generated. In this case, first, the disconnected comb tooth of the common electrode 22 and a part of the floating electrode 61 that overlaps the end portion of the disconnected comb tooth of the common electrode 22 are fused by laser using the laser device 62 so as to be connected each other, whereupon the non-disconnected comb teeth of the common electrode 22 and the part of the floating electrode 61 that overlaps the end portions of the non-disconnected comb teeth of the common electrode 22 are fused by laser using the laser device 62 so as to be connected each other. As a result, the common voltage can be supplied to the entire common electrode 22 via the floating electrode 61, and therefore a pixel defect can be avoided.

Embodiment 1-3

Figure 7:
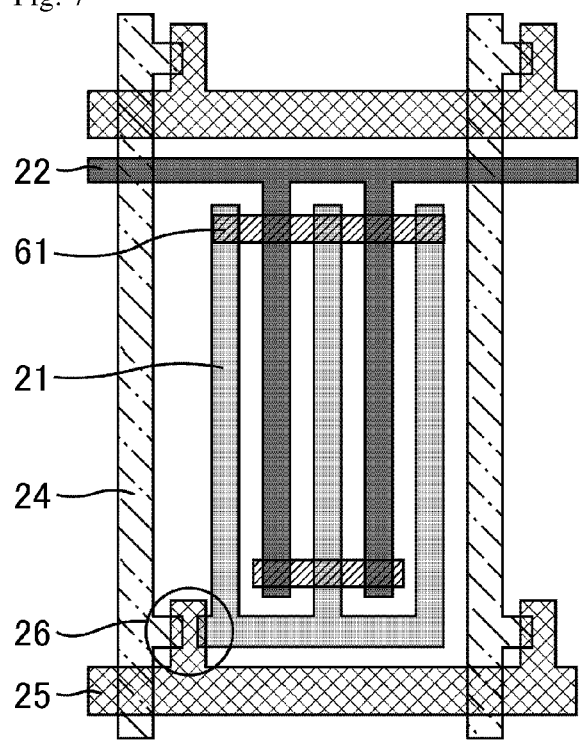
FIG. 7 is a planar schematic view showing a single sub-pixel unit of a TFT substrate provided in a liquid-crystal display device according to Embodiment 1-3.

FIG. 7 is a planar schematic view showing a single sub-pixel unit of a TFT substrate provided in a liquid-crystal display device according to Embodiment 1-3. As shown in FIG. 7, in the liquid-crystal display device according to Embodiment 1-3, a corrective electrode is disposed in a region that overlaps both the end portion of the pixel electrode and the end portion of the common electrode.

By disposing the floating electrode 61 to overlap both the end portion of the pixel electrode 21 and the end portion of the common electrode 22 in this manner, a disconnection in either the pixel electrode 21 or the common electrode 22 can be corrected through laser irradiation.

Embodiment 1-4

Figure 8:
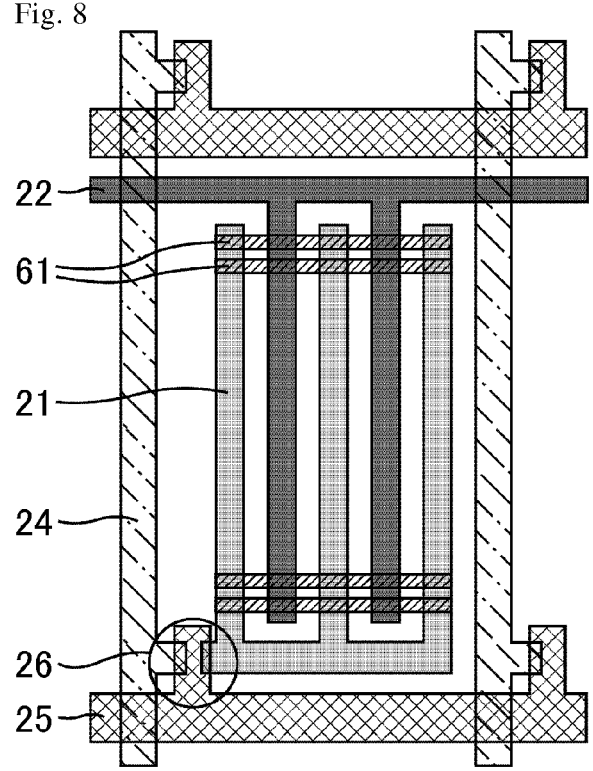
FIG. 8 is a planar schematic view showing a single sub-pixel unit of a TFT substrate provided in a liquid-crystal display device according to Embodiment 1-4.

FIG. 8 is a planar schematic view showing a single sub-pixel unit of a TFT substrate provided in a liquid-crystal display device according to Embodiment 1-4. As shown in FIG. 8, in the liquid-crystal display device according to Embodiment 1-4, two floating electrodes 61 are disposed respectively in the region overlapping the end portion of the pixel electrode 21 and the region overlapping the end portion of the common electrode 22. The two floating electrodes 61 may be disposed on the same layer or different layers.

By disposing the corrective floating electrode 61 in duplex in this manner, when a disconnection occurs in one of the floating electrodes 61, a correction can be performed using the other floating electrode 61.

Embodiment 1-5

Figure 9:
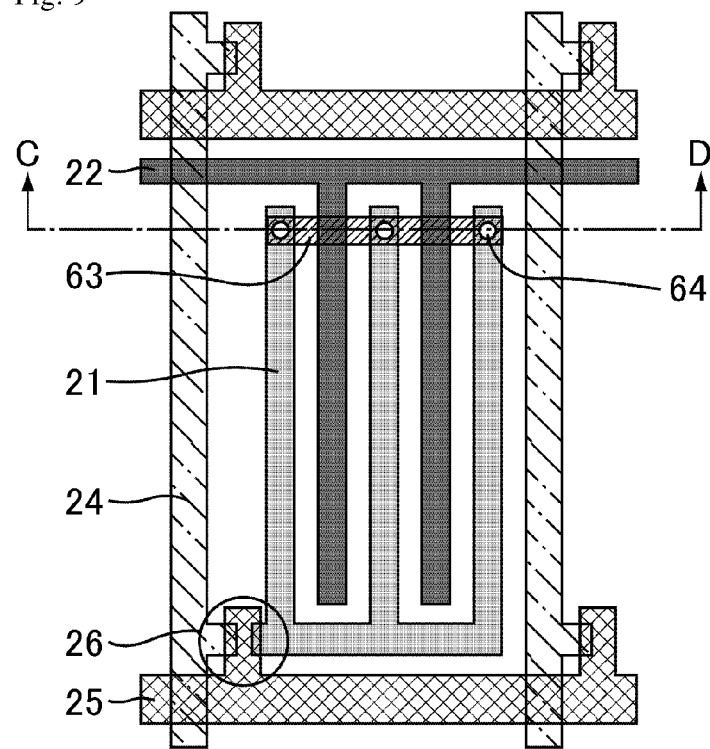
FIG. 9 is a planar schematic view showing a single sub-pixel unit of a TFT substrate provided in a liquid-crystal display device according to Embodiment 1-5.
Figure 10:
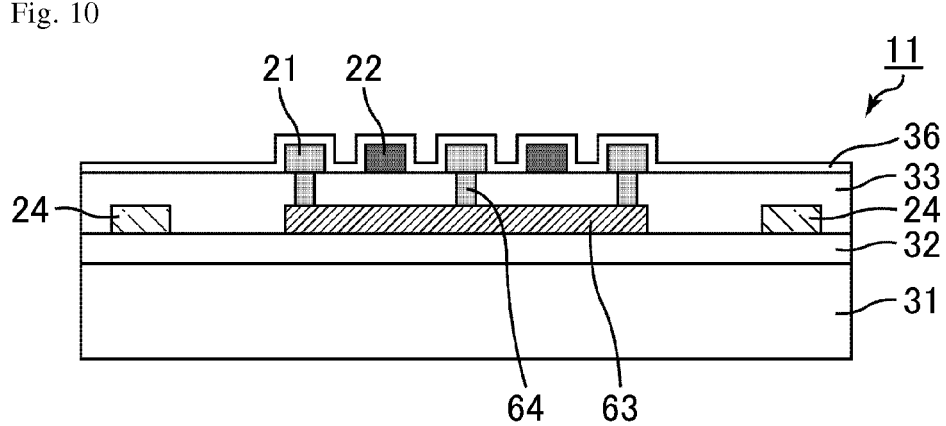
FIG. 10 is a sectional schematic view showing the TFT substrate along a C-D line of FIG. 9.

FIG. 9 is a planar schematic view showing a single sub-pixel unit of a TFT substrate provided in a liquid-crystal display device according to Embodiment 1-5. FIG. 10 is a sectional schematic view showing the TFT substrate along a C-D line of FIG. 9. As shown in FIGS. 9 and 10, in the liquid-crystal display device according to Embodiment 1-5, a contact hole 64 is formed in the end portion of each comb tooth of the pixel electrode 21, and the respective end portions of the comb teeth of the pixel electrode 21 are connected to a bridge electrode 63 via the contact holes 64. The bridge electrode 63 is linearly shaped and disposed to overlap the respective end portions of the pixel electrode 21.

Figure 11:
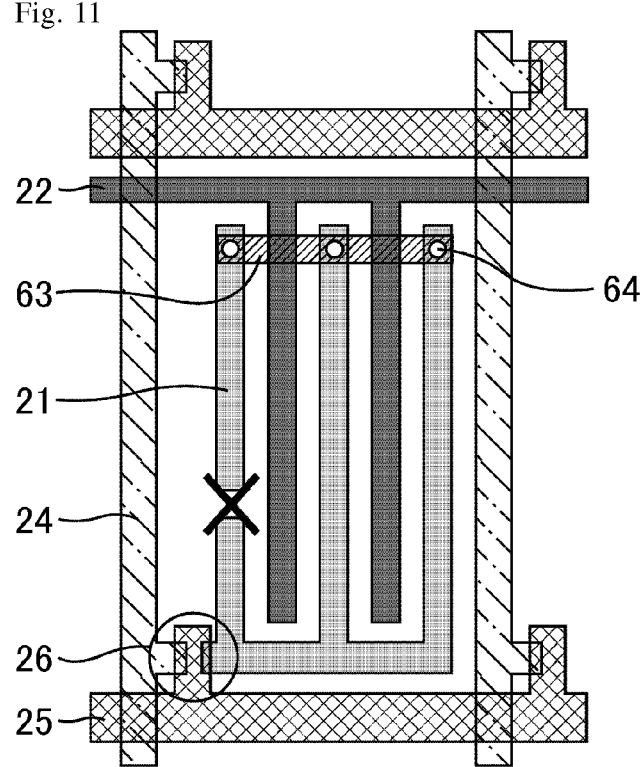
FIG. 11 is a planar schematic view showing a condition in which a disconnection occurs in the liquid-crystal display device according to Embodiment 1-5.

FIG. 11 is a planar schematic view showing a condition in which a disconnection occurs in the liquid-crystal display device according to Embodiment 1-5. As shown in FIG. 11, even when a disconnection occurs in a part of the comb teeth of the pixel electrode 21, the disconnected comb tooth of the pixel electrode 21 and the non-disconnected comb teeth of the pixel electrode 21 remain connected via the bridge electrode 63. Therefore, the signal voltage can be supplied to the entire pixel electrode 21, and as a result, a pixel defect does not occur.

Correction through laser irradiation need not be performed on the bridge electrode 63, and therefore a metal oxide film made of ITO or the like is preferably used as a material of the bride electrode 63 in order to secure transmittance. Further, there are no particular limitations on a relationship between a width of the bridge electrode 63 and the width of the comb teeth of the pixel electrode 21 or of the comb teeth of the common electrode 22.

Embodiment 1-6

Figure 12:
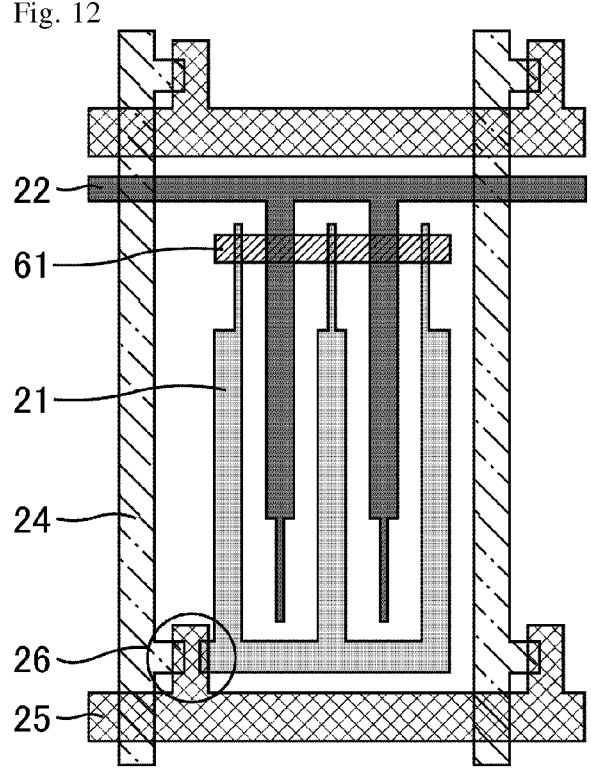
FIG. 12 is a planar schematic view showing a single sub-pixel unit of a TFT substrate provided in a liquid-crystal display device according to Embodiment 1-6.

FIG. 12 is a planar schematic view showing a single sub-pixel unit of a TFT substrate provided in a liquid-crystal display device according to Embodiment 1-6. As shown in FIG. 12, in the liquid-crystal display device according to Embodiment 1-6, the end portions of the comb teeth of the pixel electrode 21 and the end portions of the comb teeth of the common electrode 22 are both narrowed, and the floating electrode 61 is disposed in the region overlapping the end portion of the pixel electrode 21.

By disposing the floating electrode 61 to overlap the narrowed part on the end portion of the pixel electrode 21, where a disconnection is more likely to occur, a disconnection in the narrowed part on the end portion of the pixel electrode 21 can be corrected through laser irradiation.

The width of the comb teeth in the narrowed part on the end portion of the pixel electrode 21 is preferably at least 1 μm narrower than the width of the comb teeth in the non-narrowed part of the pixel electrode 21.

Embodiment 1-7

Figure 13:
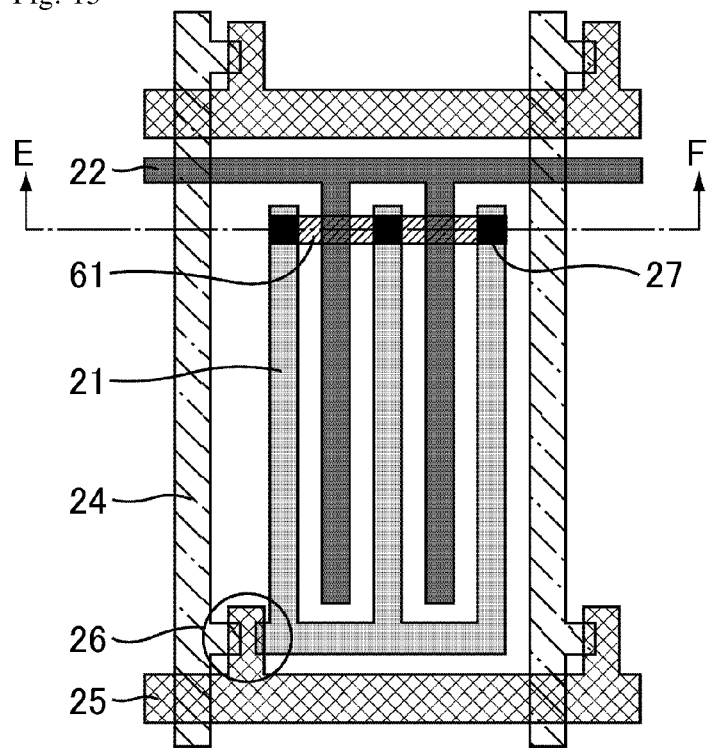
FIG. 13 is a planar schematic view showing a single sub-pixel unit of a TFT substrate provided in a liquid-crystal display device according to Embodiment 1-7.
Figure 14:
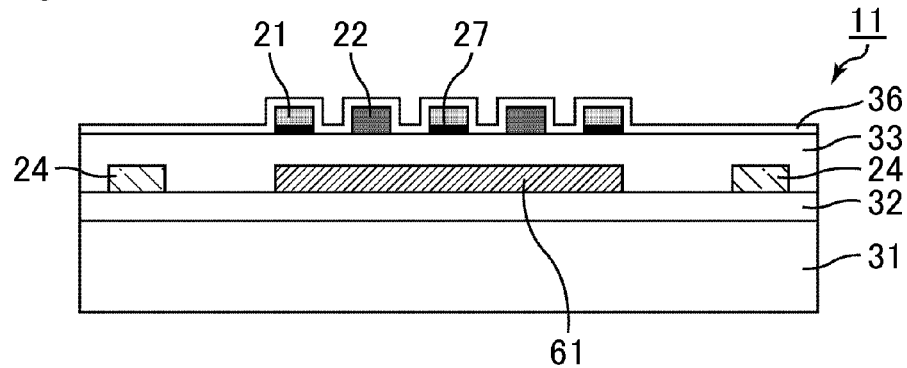
FIG. 14 is a sectional schematic view showing the TFT substrate along an E-F line of FIG. 13.

FIG. 13 is a planar schematic view showing a single sub-pixel unit of a TFT substrate provided in a liquid-crystal display device according to Embodiment 1-7. FIG. 14 is a sectional schematic view showing the TFT substrate along an E-F line of FIG. 13. As shown in FIGS. 13 and 14, in the liquid-crystal display device according to Embodiment 1-7, a light shielding film 27 is disposed on a lower layer of the respective end portions of the comb teeth of the pixel electrode 21, or in other words on a lower side of the floating electrode 61. A thickness of the light shielding film 27 is preferably no less than 0.1 μm.

In the part subjected to laser irradiation, both the insulating film and the metal lose their flat shape, and as a result, an alignment disturbance may occur in the liquid crystal molecules. However, by disposing the light shielding film 27 in a position overlapping the end portions of the comb teeth of the pixel electrode 21, the alignment disturbance can be prevented from adversely affecting a display quality.

Embodiment 1-8

Figure 15:
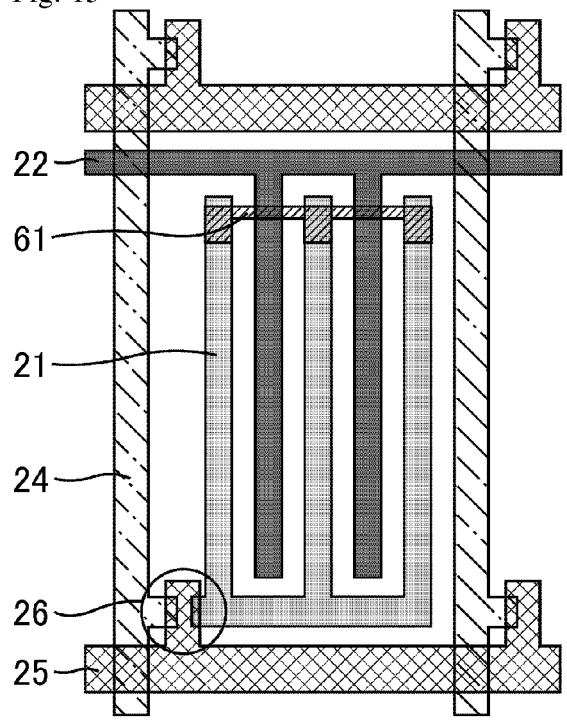
FIG. 15 is a planar schematic view showing a single sub-pixel unit of a TFT substrate provided in a liquid-crystal display device according to Embodiment 1-8.

FIG. 15 is a planar schematic view showing a single sub-pixel unit of a TFT substrate provided in a liquid-crystal display device according to Embodiment 1-8. As shown in FIG. 15, in the liquid-crystal display device according to Embodiment 1-8, the floating electrode 61 is formed to be wider in sites overlapping the end portions of the comb teeth of the pixel electrode 21 than in sites not overlapping the end portions of the comb teeth of the pixel electrode 21.

By forming the sites overlapping the end portions of the comb teeth of the pixel electrode 21 to be wider in this manner, correction through laser irradiation becomes easier. Further, the sites not overlapping the end portions of the comb teeth of the pixel electrode 21, which are not subjected to laser irradiation, can be made narrower, leading to an improvement in the transmittance.

Embodiment 1-9

In a liquid-crystal display device according to Embodiment 1-9, the pixel electrode and the common electrode are disposed on different layers. Therefore, a planar schematic view showing a single sub-pixel unit of a TFT substrate provided in the liquid-crystal display device according to Embodiment 1-9 is similar to FIG. 1. Meanwhile, FIG. 16 is a sectional schematic view showing the TFT substrate of the liquid-crystal display device according to Embodiment 1-9 along the A-B line of FIG. 1, which differs from FIG. 2.

Figure 16:
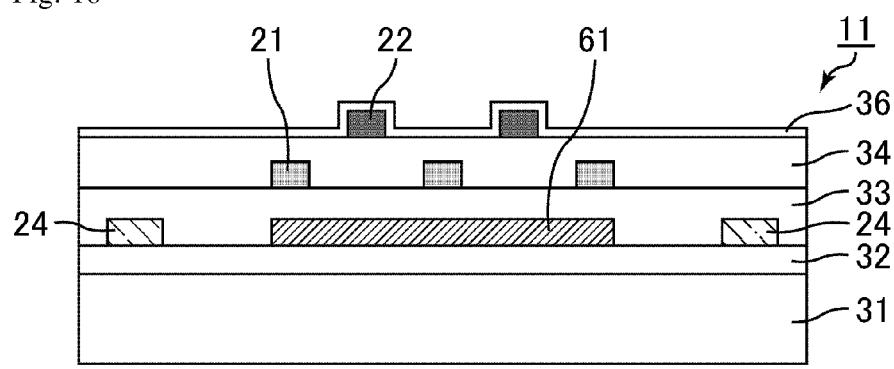
FIG. 16 is a sectional schematic view showing the TFT substrate of the liquid-crystal display device according to Embodiment 1-9 along the A-B line of FIG. 1.

As shown in FIG. 16, the TFT substrate 11 includes the glass substrate 31, the first insulating film 32 provided on the glass substrate 31, and the second insulating film 33 provided on the first insulating film 32. The source wiring 24 and the floating electrode 61 are provided between the first insulating film 32 and the second insulating film 33. The pixel electrode 21 is disposed on the second insulating film 33, and a third insulating film 34 is provided on the pixel electrode 21. The common electrode 22 is disposed on the third insulating film 34. The vertical alignment layer 36 for defining the initial tilt of the liquid crystal molecules is disposed on the common electrode 22.

Even when the pixel electrode 21 and the common electrode 22 are disposed on different layers in this manner, by disposing the pixel electrode 21 and the common electrode 22 such that the respective comb teeth thereof are disposed alternately via fixed intervals, a transverse electric field can be formed in the liquid crystal layer, and as a result, the alignment of the liquid crystal molecules can be controlled. Either the pixel electrode 21 or the common electrode 22 may be disposed on the layer closer to the liquid crystal layer. Note that when the pixel electrode 21 and the common electrode 22 are disposed on different layers, the thickness of the second insulating film 33 is preferably between 0.3 and 3.0 μm and the thickness of the third insulating film 34 is preferably between 0.3 and 3.0 μm.

Embodiment 1-10

In a liquid-crystal display device according to Embodiment 1-10, a horizontal alignment layer is used instead of the vertical alignment layer used in Embodiments 1-1 to 1-9. In other words, the method of controlling the liquid crystal molecules in the liquid-crystal display device according to Embodiment 1-10 corresponds to the IPS mode. Accordingly, a planar schematic view showing a single sub-pixel unit of a TFT substrate provided in the liquid-crystal display device according to Embodiment 1-10 is similar to FIG. 1.

Figures 1, 17:
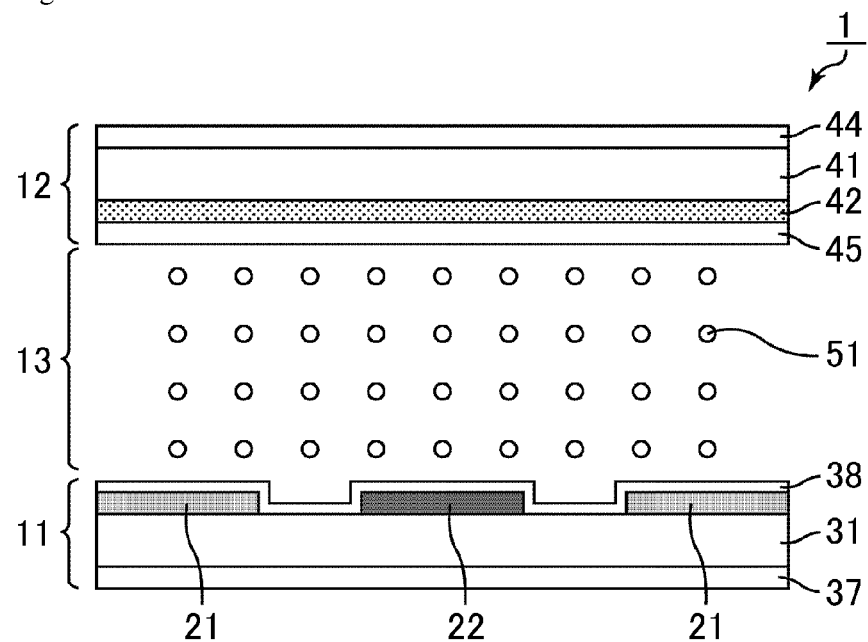
Figures 2, 17:
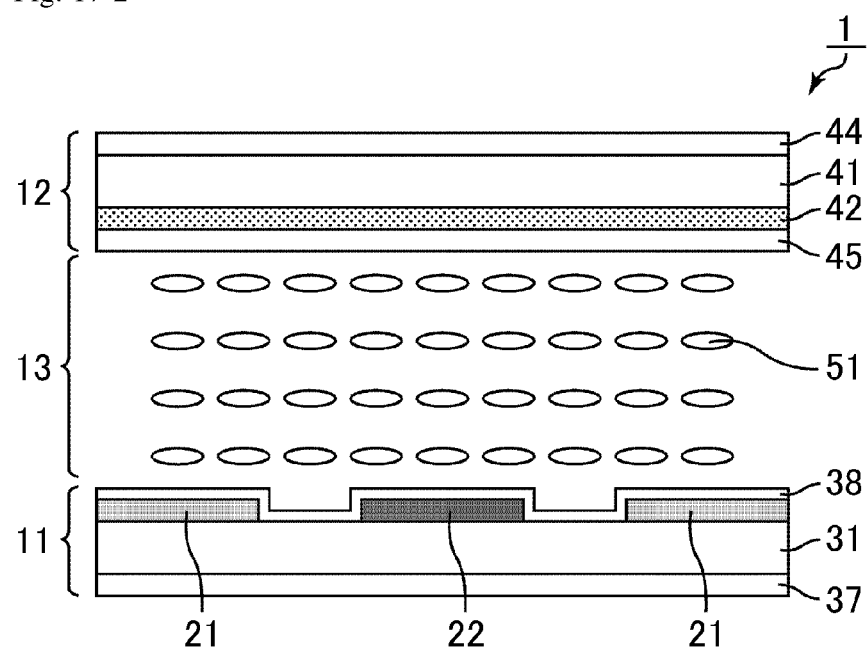

The method of controlling the liquid crystal molecules in the liquid-crystal display device according to Embodiment 1-10 will now be described. FIGS. 17-1 and 17-2 are sectional schematic views showing the liquid-crystal display device according to Embodiment 1-10 and illustrating the behavior of the liquid crystal molecules in particular detail. FIG. 17-1 shows a condition in which a voltage is not applied to the liquid crystal layer, and FIG. 17-2 shows a condition in which a voltage is applied to the liquid crystal layer.

As shown in FIG. 17-1, horizontal alignment layers 38, 45 are disposed on the respective surfaces of the TFT substrate 11 and the opposed substrate 12 that contact the liquid crystal layer. When no voltage is applied, the liquid crystal molecules 51 are aligned homogeneously, or in other words aligned horizontally relative to the surfaces of the pair of substrates 11, 12. More specifically, the respective major axes of the rod-shaped liquid crystal molecules 51 are oriented in a substantially horizontal direction relative to the substrate surfaces such that a long axis direction of the liquid crystal molecules 51 is substantially parallel to a comb tooth direction, and all of the liquid crystal molecules 51 are arranged regularly in an identical direction.

As shown in FIG. 17-2, when a voltage is applied between the pixel electrode 21 and the common electrode 22, variation in the alignment of the liquid crystal molecules 51 occurs along the arch-shaped transverse electric field formed between the electrodes. The liquid crystal molecules 51, all of which are affected by the electric field, perform a lateral rotation while remaining substantially horizontal relative to the substrate surfaces, whereby the long axis direction of the liquid crystal molecules 51 becomes substantially orthogonal to the comb tooth direction.

When a disconnection occurs in a comb tooth of the pixel electrode 21 or the common electrode 22 in this type of IPS mode liquid-crystal display device, an electric field is not formed between the pixel electrode 21 and the common electrode 22, and therefore, by forming the corrective floating electrode, the disconnection can be corrected through laser irradiation.

Embodiments 1-1 to 1-10 were described above, but in the respective embodiments, a bridge electrode may be used instead of the floating electrode, as in Embodiment 1-5, for example. Further, respective features of Embodiments 1-1 to 1-10 may be combined in other ways.

Embodiment 2

A liquid-crystal display device according to Embodiment 2 will be described below in eleven individual embodiments, namely Embodiments 2-1 to 2-11. A feature of the respective liquid-crystal display devices according to Embodiment 2 is that the pixel electrode has comb teeth on one side of the single shaft, while the common electrode has comb teeth on both sides of the single shaft.

The liquid-crystal display devices according to Embodiments 2-1 to 2-11 are all of a mode in which the alignment of the liquid crystal molecules is controlled using a transverse electric field. Embodiments 2-1 to 2-10 correspond to a control mode in which the liquid crystal molecules are aligned homeotropically, or in other words aligned vertically relative to the pair of substrate surfaces, when no voltage is applied, whereas Embodiment 2-11 corresponds to the so-called IPS mode in which the liquid crystal molecules are aligned homogeneously, or in other words aligned horizontally relative to the pair of substrate surfaces, when no voltage is applied.

Embodiment 2-1

Figure 18:
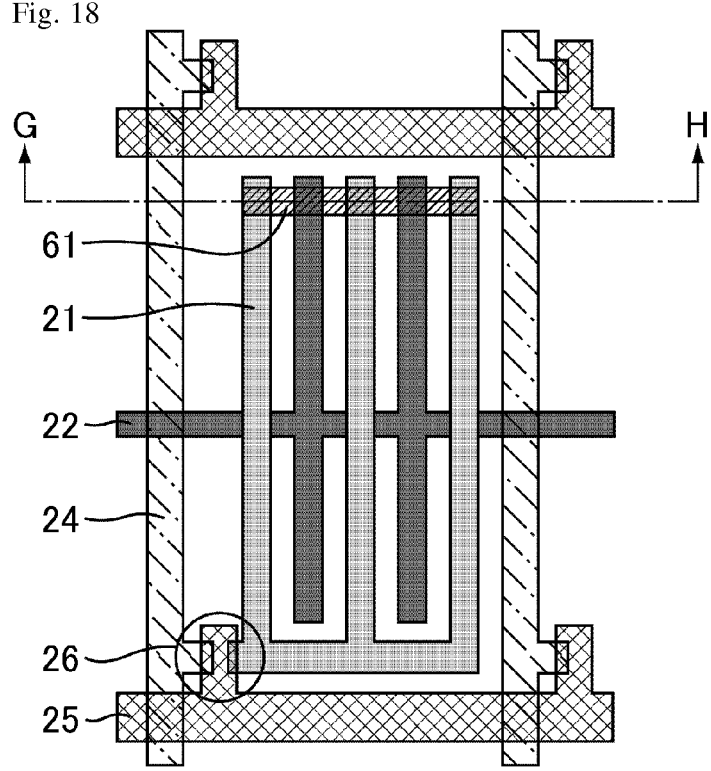
FIG. 18 is a planar schematic view showing a single sub-pixel unit of a TFT substrate provided in liquid-crystal display devices according to Embodiments 2-1 and 2-11.

FIG. 18 is a planar schematic view showing a single sub-pixel unit of a TFT substrate provided in the liquid-crystal display device according to Embodiment 2-1. Further, FIG. 19 is a sectional schematic view showing the TFT substrate along a G-H line of FIG. 18.

Figure 19:
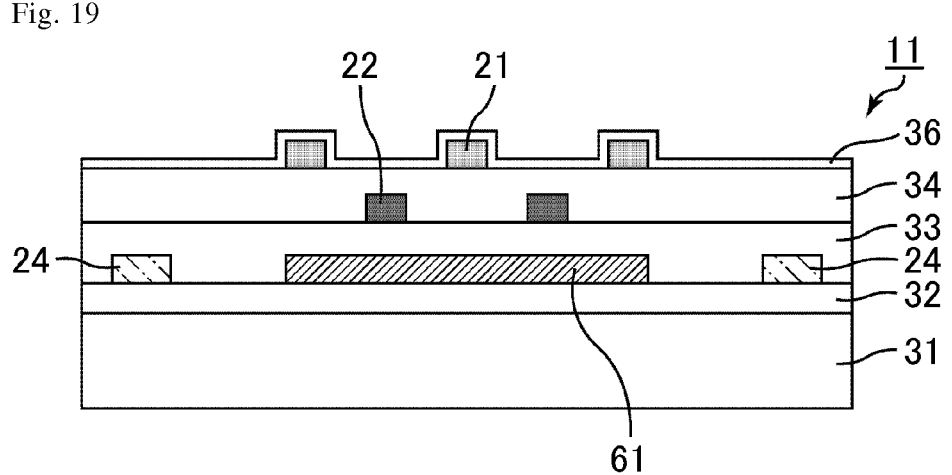
FIG. 19 is a sectional schematic view showing the TFT substrate along a G-H line of FIG. 18 and a sectional schematic view showing the TFT substrate along an M-N line of FIG. 46.

As shown in FIG. 19, the pixel electrode 21 and the common electrode 22 are disposed on different layers, the pixel electrode 21 being disposed closer to the liquid crystal layer and the common electrode 22 being disposed further from the liquid crystal layer. Further, as shown in FIG. 18, the liquid-crystal display device according to Embodiment 2-1 includes the corrective floating electrode 61, and the floating electrode 61 is disposed to overlap both the end portions of the comb teeth of the pixel electrode 21 and the end portions of the comb teeth of the common electrode 22. Hence, in the liquid-crystal display device according to Embodiment 2-1, the single floating electrode 61 can be used as a corrective electrode for both the pixel electrode 21 and the common electrode 22.

Figure 20:
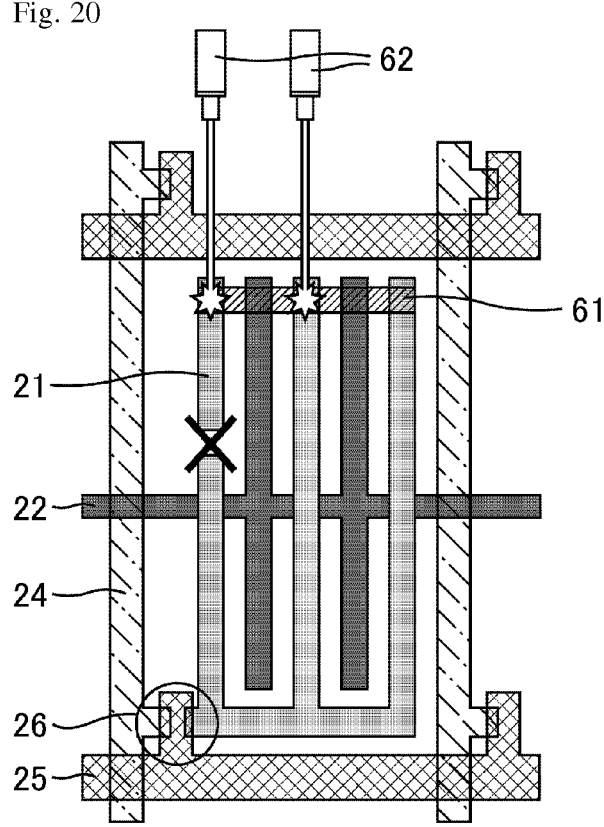
FIG. 20 is a planar schematic view showing the manner in which a correction is performed through laser irradiation when a disconnection occurs in a pixel electrode of the liquid-crystal display device according to Embodiment 2-1.
Figure 21:
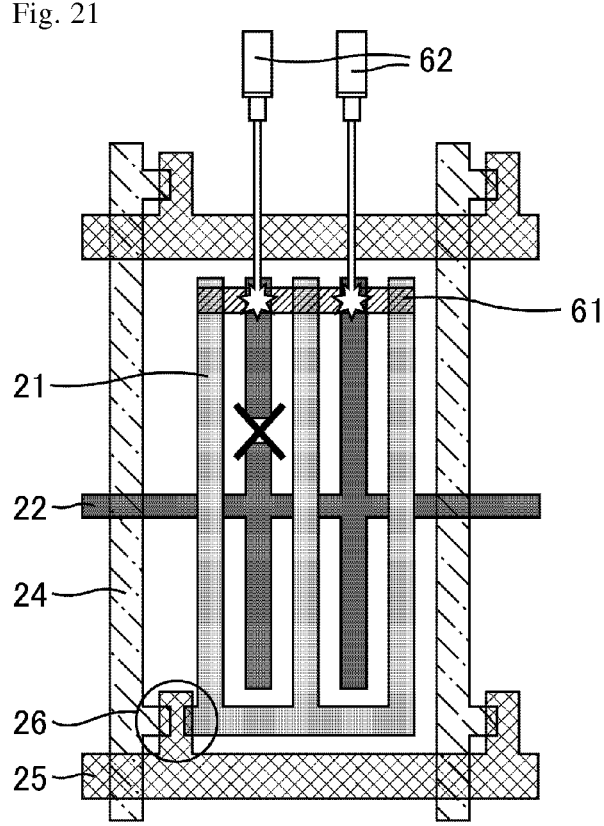
FIG. 21 is a planar schematic view showing the manner in which a correction is performed through laser irradiation when a disconnection occurs in a common electrode of the liquid-crystal display device according to Embodiment 2-1.

FIG. 20 is a planar schematic view showing the manner in which a correction is performed through laser irradiation when a disconnection occurs in the pixel electrode of the liquid-crystal display device according to Embodiment 2-1. FIG. 21 is a planar schematic view showing the manner in which a correction is performed through laser irradiation when a disconnection occurs in the common electrode of the liquid-crystal display device according to Embodiment 2-1.

As shown in FIG. 20, when a disconnection occurs in a part of the comb teeth of the pixel electrode 21, first, the end portion of the disconnected comb tooth of the pixel electrode 21 and the part of the floating electrode 61 that overlaps the disconnected comb tooth of the pixel electrode 21 are fused by laser using the laser device 62 so as to be connected each other, whereupon the end portions of the non-disconnected comb teeth of the pixel electrode 21 and the part of the floating electrode 61 that overlaps the end portions of the non-disconnected comb teeth of the pixel electrode 21 are fused by laser using the laser device 62 so as to be connected each other. As a result, the signal voltage can be passed through the entire pixel electrode 21 via the floating electrode 61, and therefore a pixel defect can be avoided.

As shown in FIG. 21, likewise when a disconnection occurs in a part of the comb teeth of the common electrode 22, first, the end portion of the disconnected comb tooth of the common electrode 22 and the part of the floating electrode 61 that overlaps the disconnected comb tooth of the common electrode 22 are fused by laser using the laser device 62 so as to be connected each other, whereupon the end portions of the non-disconnected comb teeth of the common electrode 22 and the part of the floating electrode 61 that overlaps the end portions of the non-disconnected comb teeth of the common electrode 22 are fused by laser using the laser device 62 so as to be connected each other. As a result, the common voltage can be supplied to the entire common electrode 22 via the floating electrode 61, and therefore a pixel defect can be avoided.

Embodiment 2-2

Figure 22:
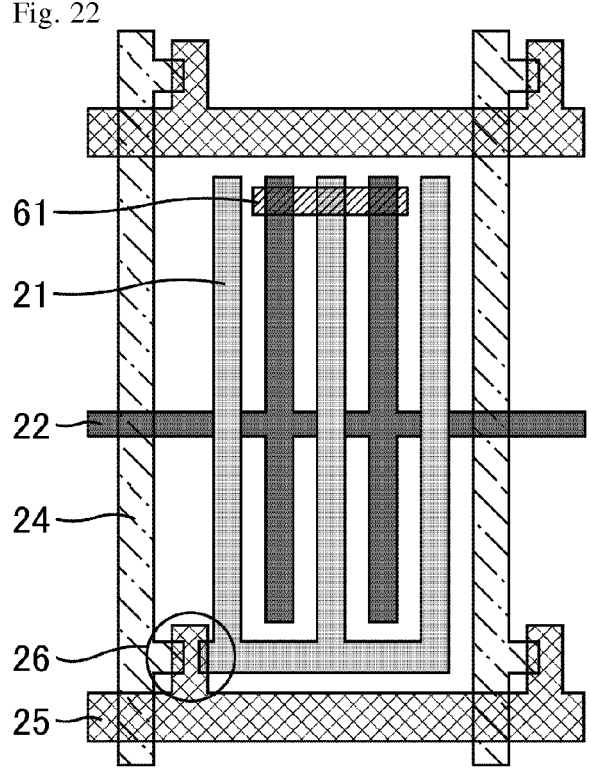
FIG. 22 is a planar schematic view showing a single sub-pixel unit of a TFT substrate provided in a liquid-crystal display device according to Embodiment 2-2.

FIG. 22 is a planar schematic view showing a single sub-pixel unit of a TFT substrate provided in a liquid-crystal display device according to Embodiment 2-2. As shown in FIG. 22, in the liquid-crystal display device according to Embodiment 2-2, a floating electrode 61 having a shorter length than the floating electrode 61 of the liquid-crystal display device according to Embodiment 2-1 is provided for use in correcting the common electrode 22. By reducing the length of the floating electrode 61, an improvement in transmittance is achieved.

Embodiment 2-3

Figure 23:
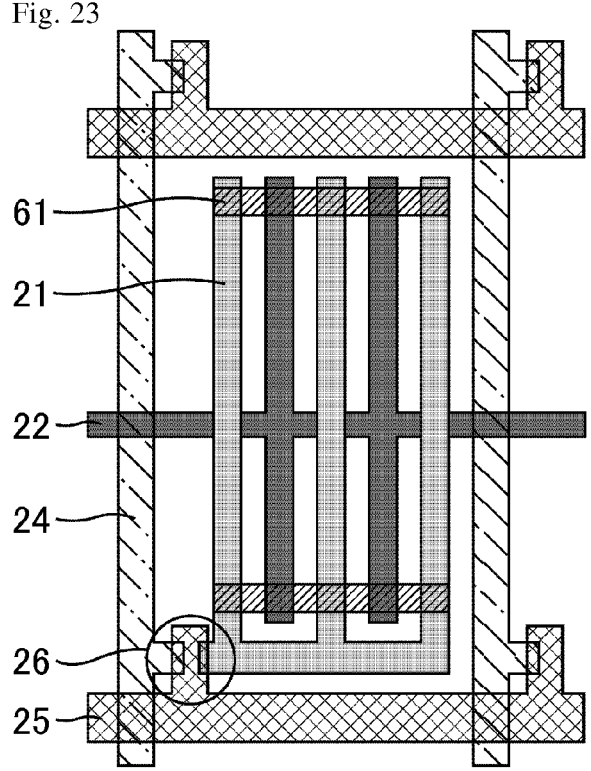
FIG. 23 is a planar schematic view showing a single sub-pixel unit of a TFT substrate provided in a liquid-crystal display device according to Embodiment 2-3.

FIG. 23 is a planar schematic view showing a single sub-pixel unit of a TFT substrate provided in a liquid-crystal display device according to Embodiment 2-3. As shown in FIG. 23, in the liquid-crystal display device according to Embodiment 2-3, the floating electrode 61 is disposed not only in a region overlapping the end portions of the pixel electrode 21 and the end portions of the comb teeth on one side of the common electrode 22, but also a region overlapping the end portions of the comb teeth on the other side of the common electrode 22.

By disposing the floating electrode 61 to overlap both the end portions of the comb teeth of the pixel electrode 21 and the end portions of the comb teeth on both sides of the common electrode 22 in this manner, a disconnection occurring in any part of the pixel electrode 21 and the common electrode 22 can be corrected through laser irradiation.

Embodiment 2-4

Figure 24:
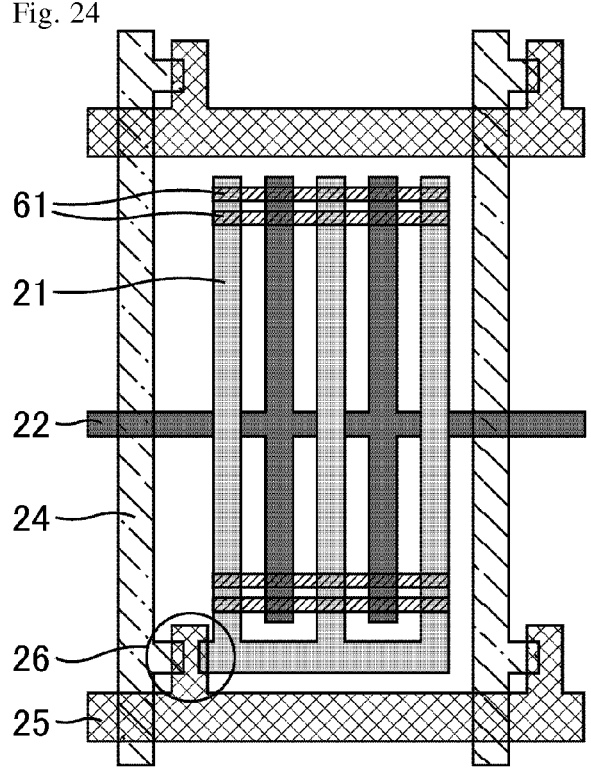
FIG. 24 is a planar schematic view showing a single sub-pixel unit of a TFT substrate provided in a liquid-crystal display device according to Embodiment 2-4.

FIG. 24 is a planar schematic view showing a single sub-pixel unit of a TFT substrate provided in a liquid-crystal display device according to Embodiment 2-4. As shown in FIG. 24, in the liquid-crystal display device according to Embodiment 2-4, two floating electrodes 61 are disposed respectively in the regions overlapping the end portions of the comb teeth of the pixel electrode 21 and the end portions of the comb teeth on both sides of the common electrode 22.

By disposing the floating electrode 61 in duplex in this manner, when a disconnection occurs in one of the floating electrodes 61, a correction can be performed using the other floating electrode 61.

Embodiment 2-5

Figure 25:
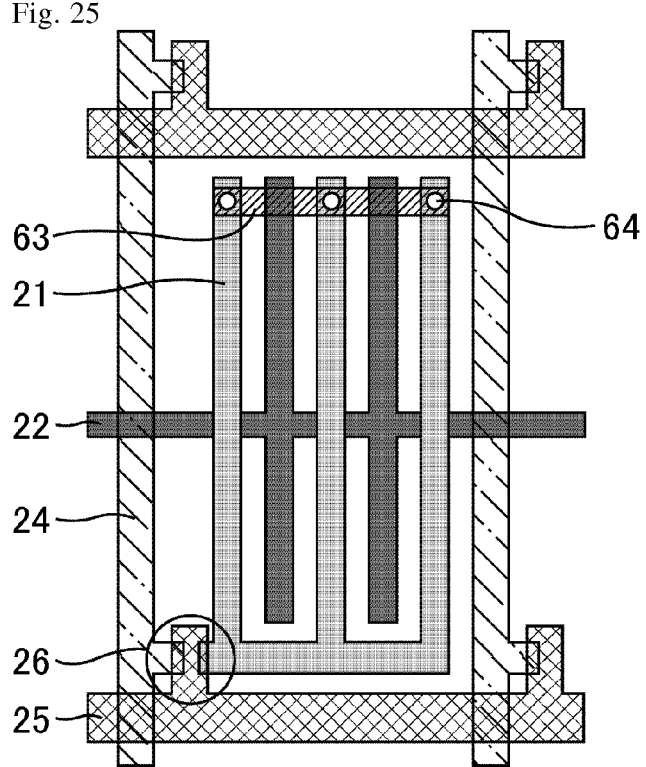
FIG. 25 is a planar schematic view showing a single sub-pixel unit of a TFT substrate provided in a liquid-crystal display device according to Embodiment 2-5.

FIG. 25 is a planar schematic view showing a single sub-pixel unit of a TFT substrate provided in a liquid-crystal display device according to Embodiment 2-5. As shown in FIG. 25, in the liquid-crystal display device according to Embodiment 2-5, the contact hole 64 is formed in the end portion of each comb tooth of the pixel electrode 21, and the respective end portions of the comb teeth of the pixel electrode 21 are connected to the bridge electrode 63 via the contact holes 64. The bridge electrode 63 is linearly shaped and disposed to overlap the end portions of the comb teeth of the pixel electrode 21 and the end portions of the comb teeth on one side of the common electrode 22.

Figure 26:
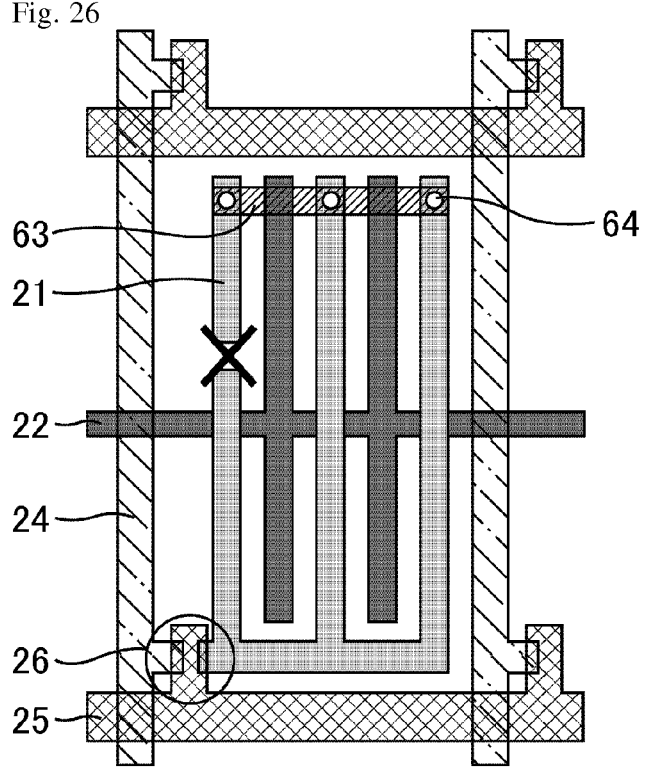
FIG. 26 is a planar schematic view showing a condition in which a disconnection occurs in the liquid-crystal display device according to Embodiment 2-5.

FIG. 26 is a planar schematic view showing a condition in which a disconnection occurs in the liquid-crystal display device according to Embodiment 2-5. As shown in FIG. 26, even when a disconnection occurs in a part of the comb teeth of the pixel electrode 21, the disconnected comb tooth of the pixel electrode 21 remains connected to the non-disconnected comb teeth of the pixel electrode 21 via the bridge electrode 63. Therefore, the signal voltage can be supplied to the entire pixel electrode 21, and as a result, a pixel defect does not occur. A similar material to that of Embodiment 1-5 may be used as the material of the bridge electrode 63.

Embodiment 2-6

Figure 27:
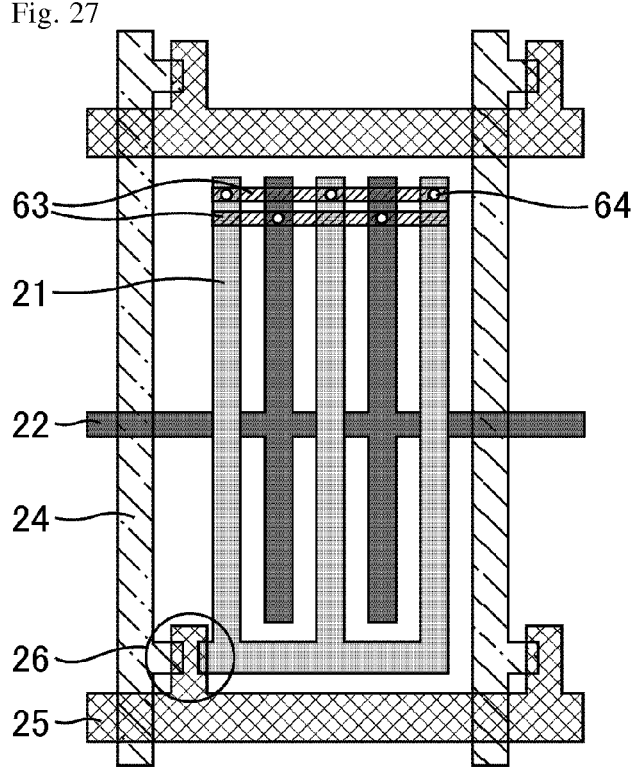
FIG. 27 is a planar schematic view showing a single sub-pixel unit of a TFT substrate provided in a liquid-crystal display device according to Embodiment 2-6.

FIG. 27 is a planar schematic view showing a single sub-pixel unit of a TFT substrate provided in a liquid-crystal display device according to Embodiment 2-6. As shown in FIG. 27, in the liquid-crystal display device according to Embodiment 2-6, the contact hole 64 is formed in the end portion of each comb tooth of the pixel electrode 21 and each comb tooth of the common electrode 22. The bridge electrode 63 is linearly shaped, and two bridge electrodes 63 are disposed to overlap the end portions of the comb teeth of the pixel electrode 21 and the end portions of the comb teeth on one side of the common electrode 22. Further, one of the two bridge electrodes 63 is connected only to the pixel electrode 21 via the contact holes 64, while the other is connected only to the common electrode 22 via the contact holes 64.

By providing the two bridge electrodes 63 connected to different electrodes in this manner, the signal voltage can be supplied to the entire pixel electrode 21 via one bridge electrode 63 and the common voltage can be supplied to the entire common electrode 22 via the other bridge electrode 63 when a disconnection occurs in either the pixel electrode 21 or the common electrode 22. Therefore, the likelihood of a pixel defect can be reduced.

Embodiment 2-7

Figure 28:
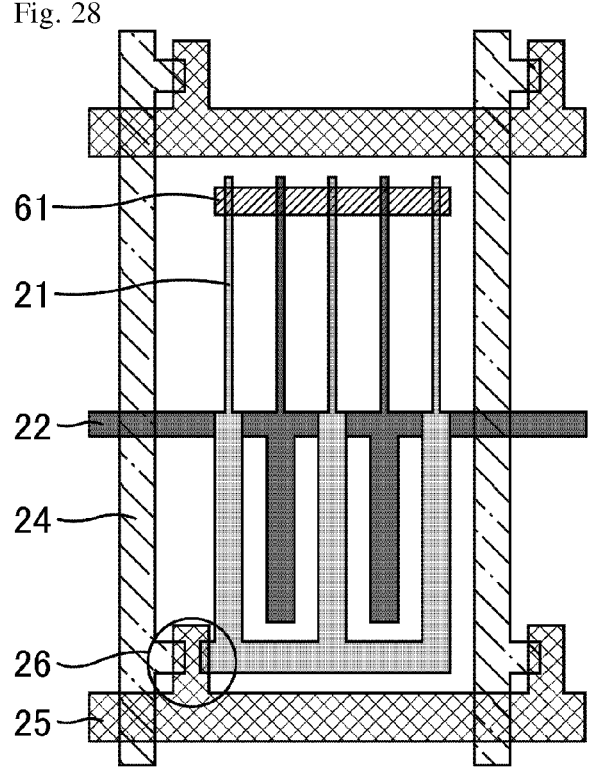
FIG. 28 is a planar schematic view showing a single sub-pixel unit of a TFT substrate provided in a liquid-crystal display device according to Embodiment 2-7.

FIG. 28 is a planar schematic view showing a single sub-pixel unit of a TFT substrate provided in a liquid-crystal display device according to Embodiment 2-7. As shown in FIG. 28, in the liquid-crystal display device according to Embodiment 2-7, one half the comb teeth of the pixel electrode 21 and the comb teeth on one side of the common electrode 22 are formed to be narrow, and the floating electrode 61 is disposed in the region overlapping the end portions of the comb teeth of the pixel electrode 21 and the end portions of the comb teeth of the common electrode 22.

By disposing the floating electrode 61 to overlap the narrowed parts on the end portions of the pixel electrode 21, where a disconnection is more likely to occur, a disconnection in either the pixel electrode 21 or the common electrode 22 can be corrected through laser irradiation.

Embodiment 2-8

Figure 29:
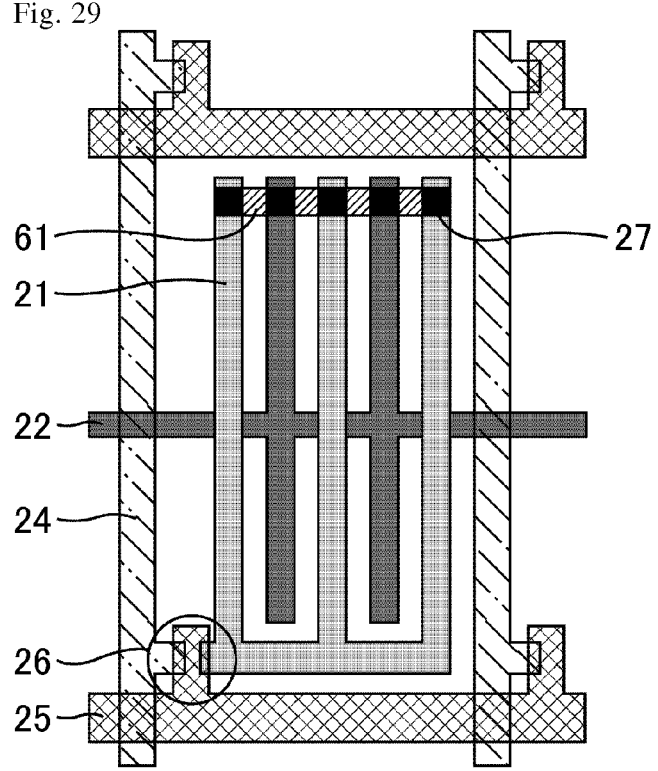
FIG. 29 is a planar schematic view showing a single sub-pixel unit of a TFT substrate provided in a liquid-crystal display device according to Embodiment 2-8.

FIG. 29 is a planar schematic view showing a single sub-pixel unit of a TFT substrate provided in a liquid-crystal display device according to Embodiment 2-8. As shown in FIG. 29, in the liquid-crystal display device according to Embodiment 2-8, the light shielding film 27 is disposed on the end portions of the comb teeth of the pixel electrode 21 and the end portions of the comb teeth on one side of the common electrode 22.

As a result, similarly to Embodiment 1-7, an alignment disturbance can be prevented from adversely affecting the display quality even when a correction is performed through laser irradiation.

Embodiment 2-9

Figure 30:
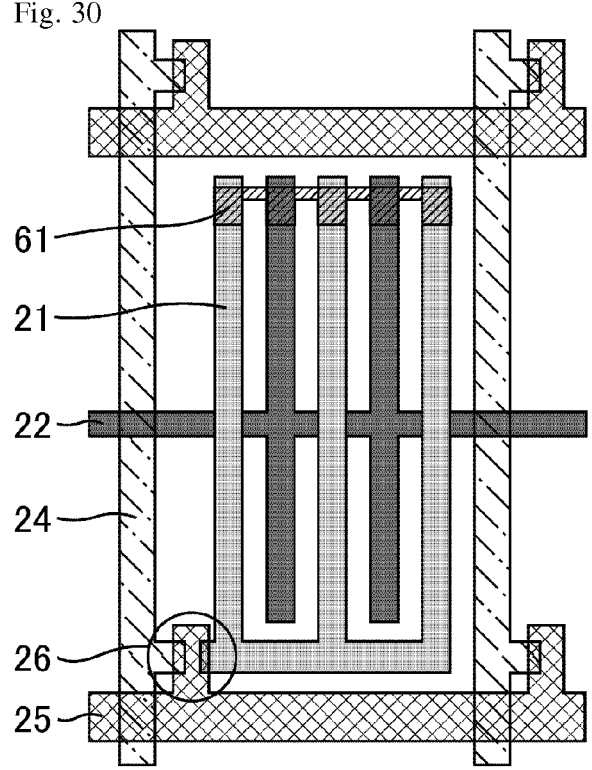
FIG. 30 is a planar schematic view showing a single sub-pixel unit of a TFT substrate provided in a liquid-crystal display device according to Embodiment 2-9.

FIG. 30 is a planar schematic view showing a single sub-pixel unit of a TFT substrate provided in a liquid-crystal display device according to Embodiment 2-9. As shown in FIG. 30, in the liquid-crystal display device according to Embodiment 2-9, the floating electrode 61 is formed to be wider in the sites overlapping the end portions of the comb teeth of the pixel electrode 21 than in the sites not overlapping the end portions of the comb teeth of the pixel electrode 21. Further, the floating electrode 61 is formed to be wider in the sites overlapping the end portions of the comb teeth of the common electrode 22 than in the sites not overlapping the end portions of the comb teeth of the common electrode 22.

Similarly to Embodiment 1-8, by forming the sites overlapping the end portions of the comb teeth of the pixel electrode 21 and common electrode 22 to be wider in this manner, correction through laser irradiation becomes easier. Further, the sites not overlapping the end portions of the comb teeth of the pixel electrode 21 and common electrode 22 can be made narrower, leading to a corresponding improvement in the transmittance.

Embodiment 2-10

Figure 31:
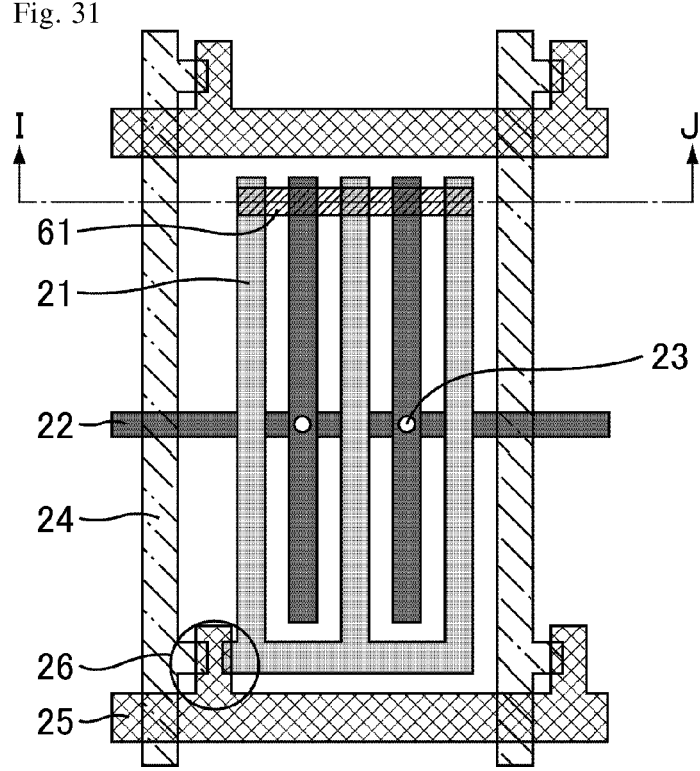
FIG. 31 is a planar schematic view showing a single sub-pixel unit of a TFT substrate provided in a liquid-crystal display device according to Embodiment 2-10.
Figure 32:
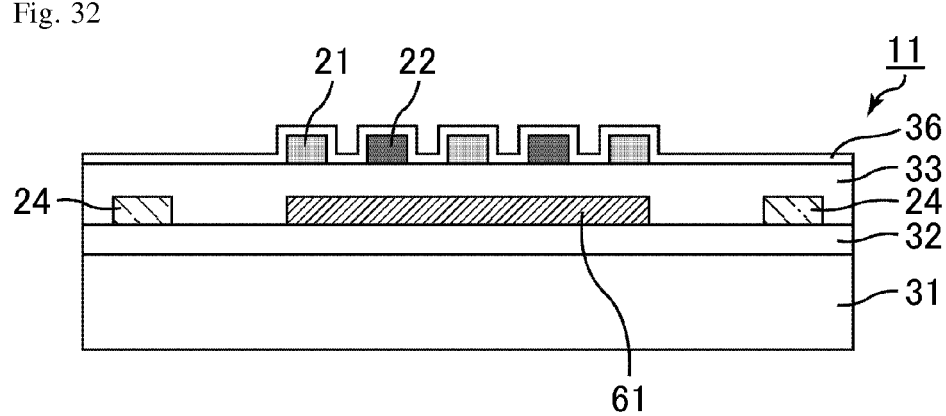
FIG. 32 is a sectional schematic view showing the TFT substrate along an I-J line of FIG. 31 and a sectional schematic view showing the TFT substrate along an O-P line of FIG. 55.

FIG. 31 is a planar schematic view showing a single sub-pixel unit of a TFT substrate provided in a liquid-crystal display device according to Embodiment 2-10. As shown in FIG. 31, in the liquid-crystal display device according to Embodiment 2-10, the comb tooth part of the common electrode 22 is disposed on the same layer as the pixel electrode 21, and the shaft part and the comb tooth part of the common electrode 22 are connected to each other via a contact hole 23. Accordingly, a sectional schematic view of the TFT substrate along an I-J line in FIG. 31 is as shown in FIG. 32. In this case, the shaft part of the common electrode 22 is disposed on the glass substrate 31 and the comb tooth part of the common electrode 22 is disposed on the second insulating film 33.

Hence, it is possible to dispose only a part of the common electrode 22 on the same layer as the pixel electrode 21, and in this case, the pixel electrode 21 and the shaft part of the common electrode 22 may be manufactured in an identical process.

Embodiment 2-11

In a liquid-crystal display device according to Embodiment 2-11, a horizontal alignment layer is used instead of the vertical alignment layer used in Embodiments 2-1 to 2-10. In other words, the method of controlling the liquid crystal molecules in the liquid-crystal display device according to Embodiment 2-11 corresponds to the IPS mode. Accordingly, a planar schematic view showing a single sub-pixel unit of a TFT substrate provided in the liquid-crystal display device according to Embodiment 2-11 is similar to FIG. 18.

The method of controlling the liquid crystal molecules in the liquid-crystal display device according to Embodiment 2-11 is similar to that of Embodiment 1-10.

Figure 33:
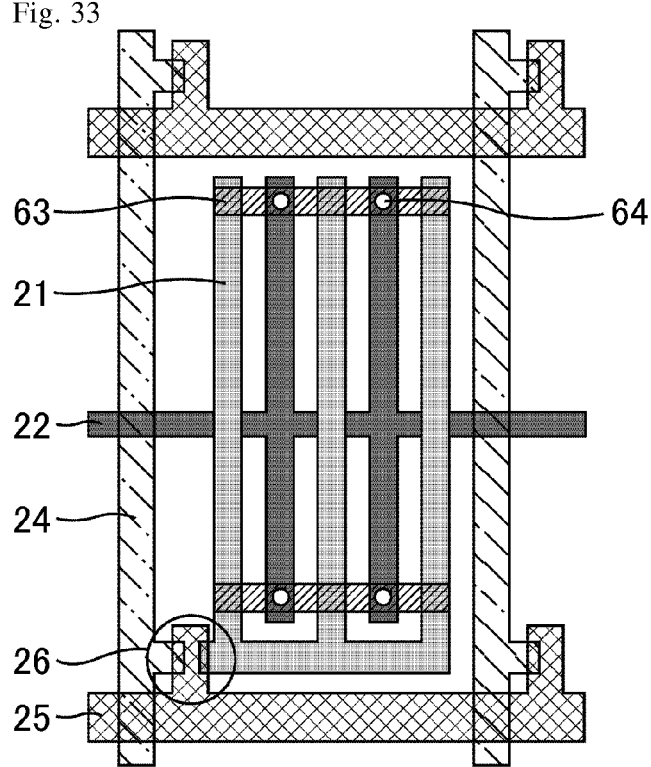
FIG. 33 is a planar schematic view showing a condition in which a bridge electrode is used instead of a floating electrode in Embodiment 2-3.
Figure 34:
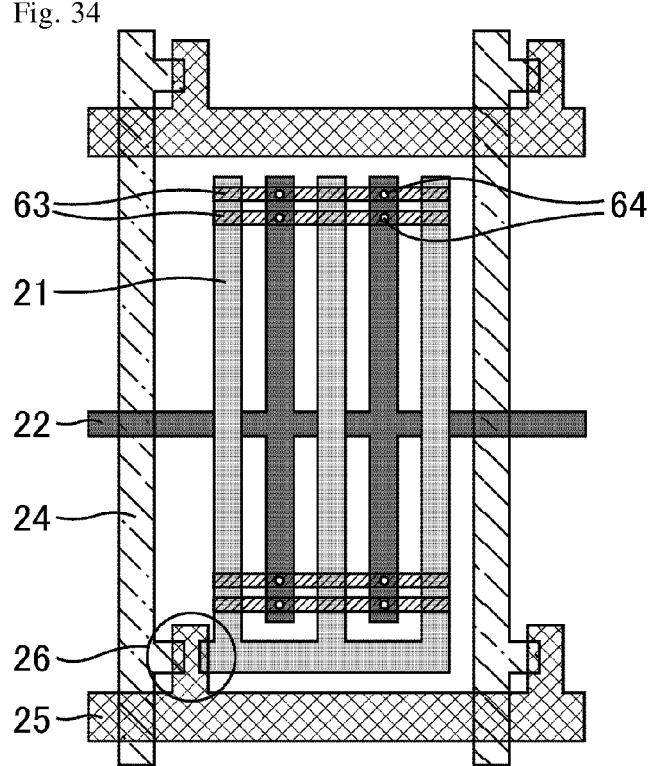
FIG. 34 is a planar schematic view showing a condition in which a bridge electrode is used instead of the floating electrode in Embodiment 2-4.
Figure 35:
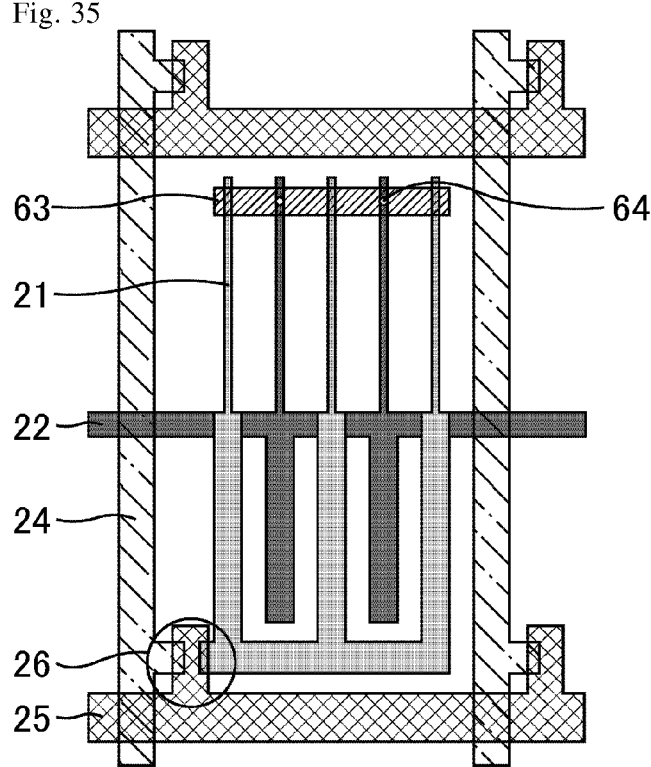
FIG. 35 is a planar schematic view showing a condition in which a bridge electrode is used instead of a floating electrode in Embodiment 2-7.

Embodiments 2-1 to 2-11 were described above, but in the respective embodiments, a bridge electrode may be used instead of the floating electrode, as in Embodiment 2-5, for example, and respective features of Embodiments 2-1 to 2-11 may be combined in other ways. FIGS. 33 to 35 are planar schematic views showing embodiments in which a bridge electrode is used instead of the floating electrode. FIGS. 33, 34, and 35 correspond to Embodiment 2-3, Embodiment 2-4, and Embodiment 2-7, respectively.

Embodiment 3

A liquid-crystal display device according to Embodiment 3 will be described below in ten individual embodiments, namely Embodiments 3-1 to 3-10. A feature of the respective liquid-crystal display devices according to Embodiment 3 is that the pixel electrode has comb teeth on both sides of the single shaft, while the common electrode has comb teeth on one side of the single shaft.

The liquid-crystal display devices according to Embodiments 3-1 to 3-10 are all of a mode in which the alignment of the liquid crystal molecules is controlled using a transverse electric field. Embodiments 3-1 to 3-9 correspond to a mode in which the liquid crystal molecules are aligned homeotropically, or in other words aligned vertically relative to the pair of substrate surfaces, when no voltage is applied, whereas Embodiment 3-10 corresponds to the so-called IPS mode in which the liquid crystal molecules are aligned homogeneously, or in other words aligned horizontally relative to the pair of substrate surfaces, when no voltage is applied.

Embodiment 3-1

Figure 36:
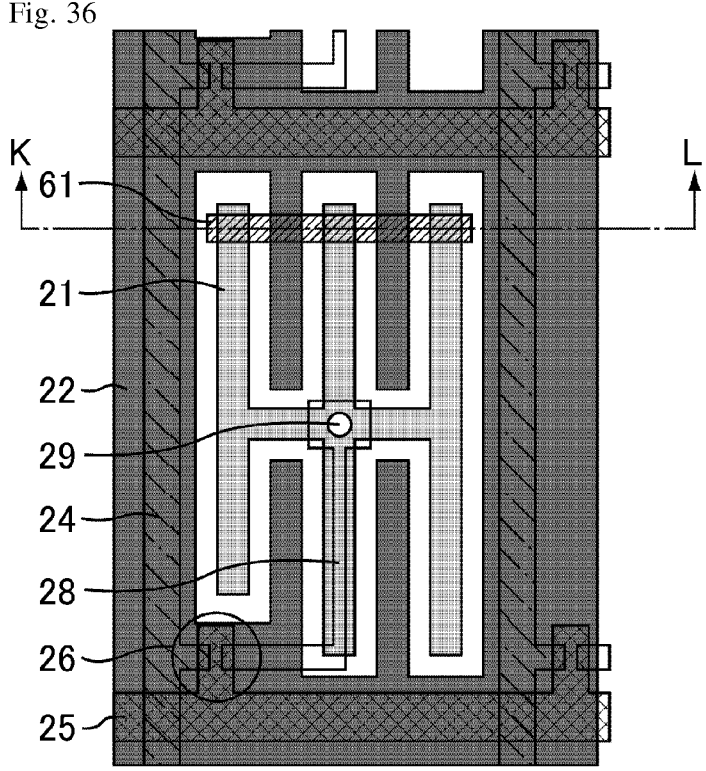
FIG. 36 is a planar schematic view showing a single sub-pixel unit of a TFT substrate provided in liquid-crystal display devices according to Embodiments 3-1, 3-9 and 3-10.
Figure 37:
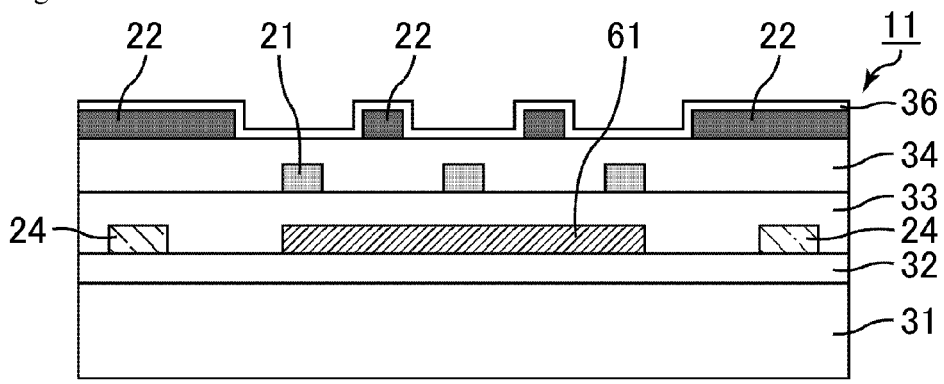
FIG. 37 is a sectional schematic view showing the TFT substrate along a K-L line of FIG. 36.

FIG. 36 is a planar schematic view showing a single sub-pixel unit of a TFT substrate provided in the liquid-crystal display device according to Embodiment 3-1. FIG. 37 is a sectional schematic view showing the TFT substrate along a K-L line of FIG. 36.

As shown in FIG. 37, the pixel electrode 21 and the common electrode 22 are disposed on different layers, the common electrode 22 being disposed closer to the liquid crystal layer and the pixel electrode 21 being disposed further from the liquid crystal layer. Further, as shown in FIG. 36, the liquid-crystal display device according to Embodiment 3-1 includes the corrective floating electrode 61, and the floating electrode 61 is disposed to overlap the end portions of the comb teeth of the pixel electrode 21. Furthermore, in Embodiment 3-1, the common electrode 22 is disposed in a position overlapping the gate wiring 25 and the source wiring 24 and on a different layer from the gate wiring 25 and the source wiring 24 via an insulating film. A drain electrode is extended from the TFT 26 to a central part of the sub-pixel by an extension wiring 28, and the TFT 26 is connected to the pixel electrode 21 via a contact hole 29 formed in the drain electrode.

Embodiment 3-2

Figure 38:
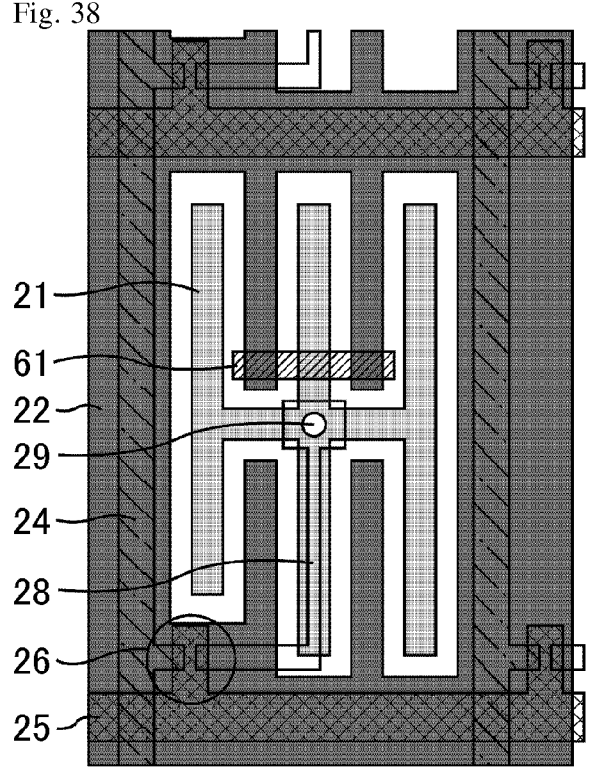
FIG. 38 is a planar schematic view showing a single sub-pixel unit of a TFT substrate provided in a liquid-crystal display device according to Embodiment 3-2.

FIG. 38 is a planar schematic view showing a single sub-pixel unit of a TFT substrate provided in a liquid-crystal display device according to Embodiment 3-2. As shown in FIG. 38, in the liquid-crystal display device according to Embodiment 3-2, the floating electrode 61 is disposed to overlap the end portions of the comb teeth of the common electrode 22.

Embodiment 3-3

Figure 39:
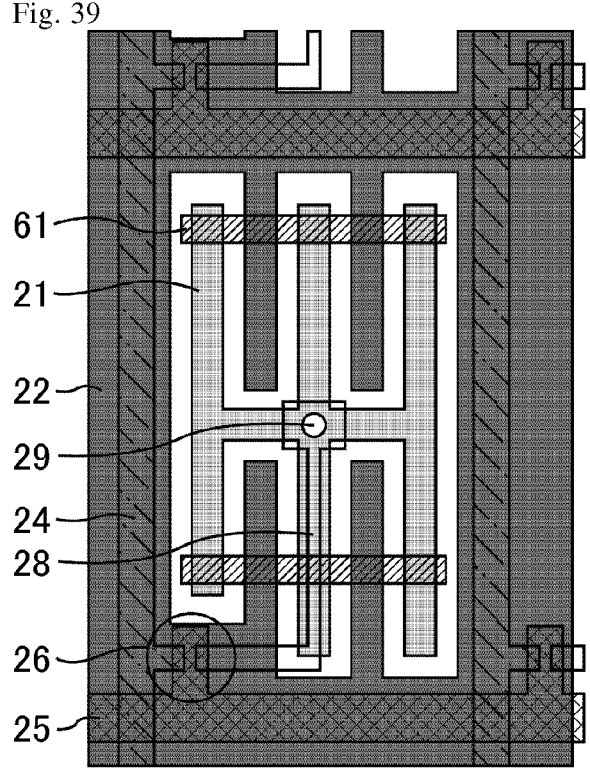
FIG. 39 is a planar schematic view showing a single sub-pixel unit of a TFT substrate provided in a liquid-crystal display device according to Embodiment 3-3.

FIG. 39 is a planar schematic view showing a single sub-pixel unit of a TFT substrate provided in a liquid-crystal display device according to Embodiment 3-3. As shown in FIG. 39, in the liquid-crystal display device according to Embodiment 3-3, the floating electrode 61 is disposed in respective regions overlapping the end portions of the comb teeth on both sides of the pixel electrode 21.

By disposing the floating electrode 61 to overlap the end portions of the comb teeth on both sides of the pixel electrode 21 in this manner, a disconnection in any part of the pixel electrode 21 and the common electrode 22 can be corrected through laser irradiation.

Embodiment 3-4

Figure 40:
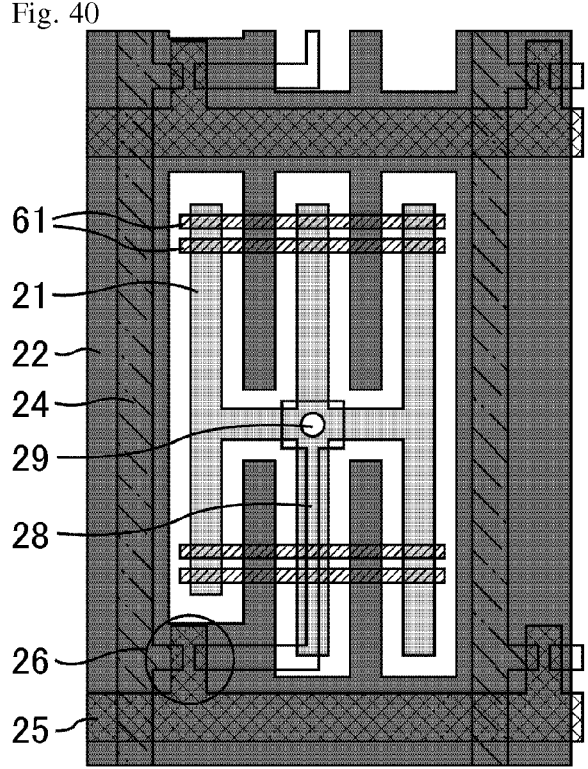
FIG. 40 is a planar schematic view showing a single sub-pixel unit of a TFT substrate provided in a liquid-crystal display device according to Embodiment 3-4.

FIG. 40 is a planar schematic view showing a single sub-pixel unit of a TFT substrate provided in a liquid-crystal display device according to Embodiment 3-4. As shown in FIG. 40, in the liquid-crystal display device according to Embodiment 3-4, two floating electrodes 61 are disposed in the respective regions overlapping the end portions of the comb teeth on both sides of the pixel electrode 21.

By disposing the floating electrode 61 in duplex in this manner, when a disconnection occurs in one of the floating electrodes 61, a correction can be performed using the other floating electrode 61.

Embodiment 3-5

Figure 41:
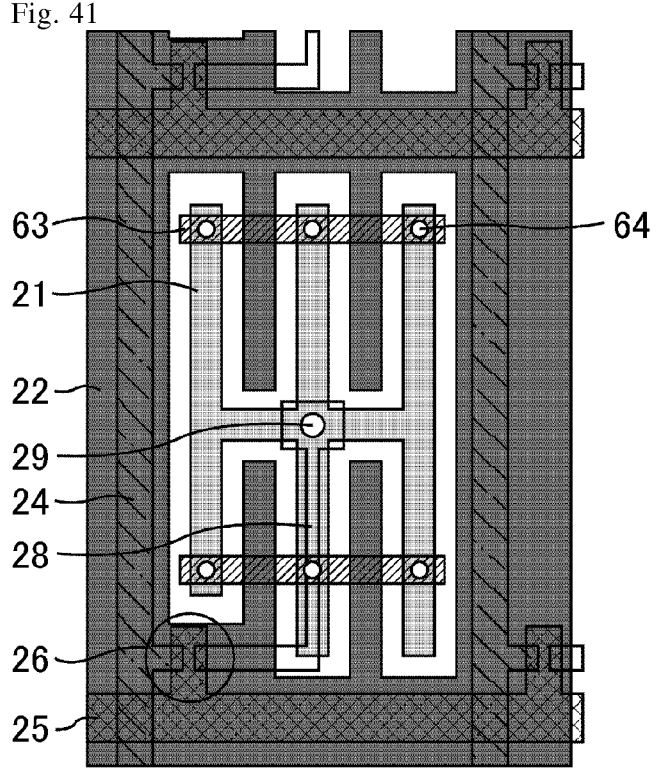
FIG. 41 is a planar schematic view showing a single sub-pixel unit of a TFT substrate provided in a liquid-crystal display device according to Embodiment 3-5.

FIG. 41 is a planar schematic view showing a single sub-pixel unit of a TFT substrate provided in a liquid-crystal display device according to Embodiment 3-5. As shown in FIG. 41, in the liquid-crystal display device according to Embodiment 3-5, the contact hole 64 is formed in the end portion of each comb tooth of the pixel electrode 21, and the respective end portions of the comb teeth of the pixel electrode 21 are connected to the bridge electrode 63 via the contact holes 64. The bridge electrode 63 is linearly shaped and disposed to overlap the respective end portions of the comb teeth of the pixel electrode 21. A similar material to that of Embodiment 1-5 may be used as the material of the bridge electrode 63.

By providing the bridge electrode 63, when a disconnection occurs in a part of the comb teeth of the pixel electrode 21, the disconnected comb tooth of the pixel electrode 21 and the non-disconnected comb teeth of the pixel electrode 21 remain connected via the bridge electrode 63. Therefore, the signal voltage can be supplied to the entire pixel electrode 21, and as a result, a pixel defect does not occur.

Embodiment 3-6

Figure 42:
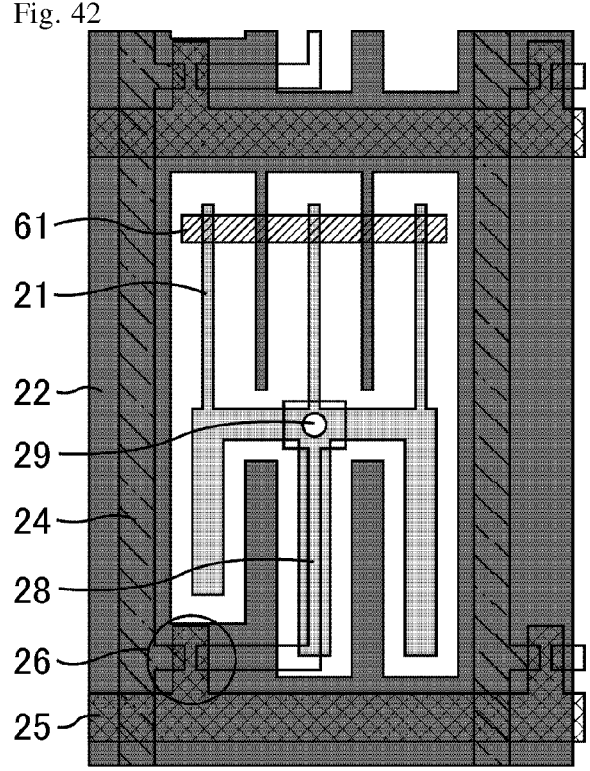
FIG. 42 is a planar schematic view showing a single sub-pixel unit of a TFT substrate provided in a liquid-crystal display device according to Embodiment 3-6.

FIG. 42 is a planar schematic view showing a single sub-pixel unit of a TFT substrate provided in a liquid-crystal display device according to Embodiment 3-6. As shown in FIG. 42, in the liquid-crystal display device according to Embodiment 3-6, the comb teeth on one side of the pixel electrode 21 are formed to be narrower than the comb teeth on the other side, and the floating electrode 61 is disposed in the region overlapping the end portions of the comb teeth of the pixel electrode 21.

By disposing the floating electrode 61 to overlap the narrow part of the pixel electrode 21 where a disconnection is more likely to occur, a disconnection in the pixel electrode 21 can be corrected through laser irradiation.

Embodiment 3-7

Figure 43:
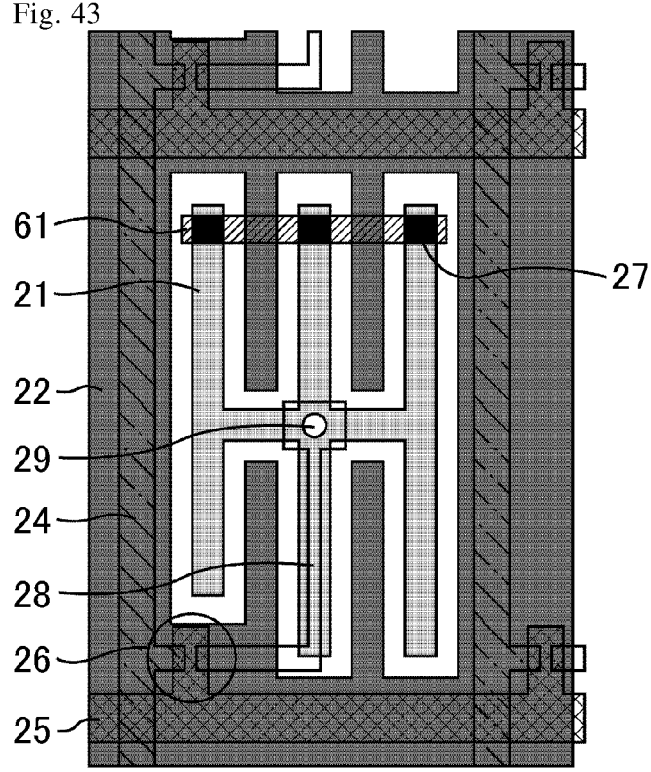
FIG. 43 is a planar schematic view showing a single sub-pixel unit of a TFT substrate provided in a liquid-crystal display device according to Embodiment 3-7.

FIG. 43 is a planar schematic view showing a single sub-pixel unit of a TFT substrate provided in a liquid-crystal display device according to Embodiment 3-7. As shown in FIG. 43, in the liquid-crystal display device according to Embodiment 3-7, the light shielding film 27 is disposed in the region overlapping the end portions of the comb teeth of the pixel electrode 21.

As a result, similarly to Embodiment 1-7, an alignment disturbance can be prevented from adversely affecting the display quality even when a correction is performed through laser irradiation.

Embodiment 3-8

Figure 44:
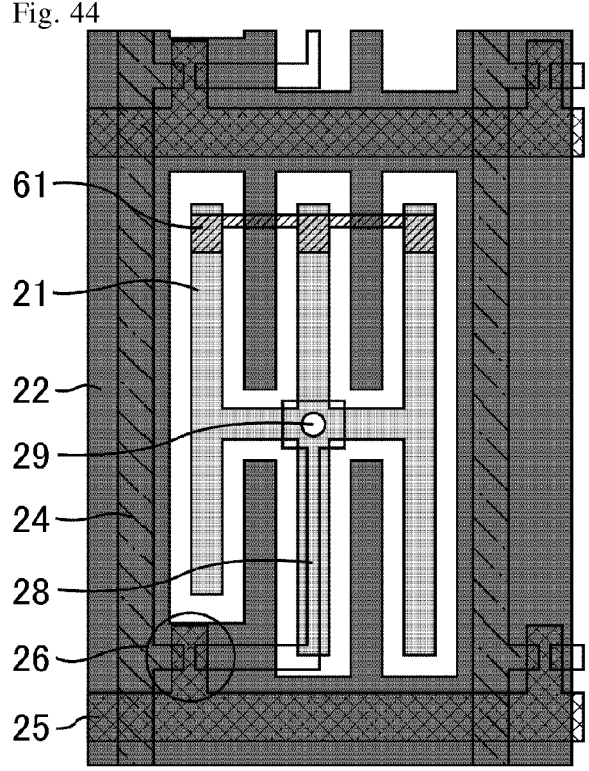
FIG. 44 is a planar schematic view showing a single sub-pixel unit of a TFT substrate provided in a liquid-crystal display device according to Embodiment 3-8.

FIG. 44 is a planar schematic view showing a single sub-pixel unit of a TFT substrate provided in a liquid-crystal display device according to Embodiment 3-8. As shown in FIG. 44, in the liquid-crystal display device according to Embodiment 3-8, the floating electrode 61 is formed to be wider in sites overlapping the end portions of the comb teeth of the pixel electrode 21 than in sites not overlapping the end portions of the comb teeth of the pixel electrode 21.

Similarly to Embodiment 1-8, by forming the sites overlapping the end portions of the comb teeth of the pixel electrode 21 to be wider in this manner, correction through laser irradiation becomes easier. Further, the sites not overlapping the end portions of the comb teeth of the pixel electrode 21 can be made narrower, leading to a corresponding improvement in the transmittance.

Embodiment 3-9

Figure 45:
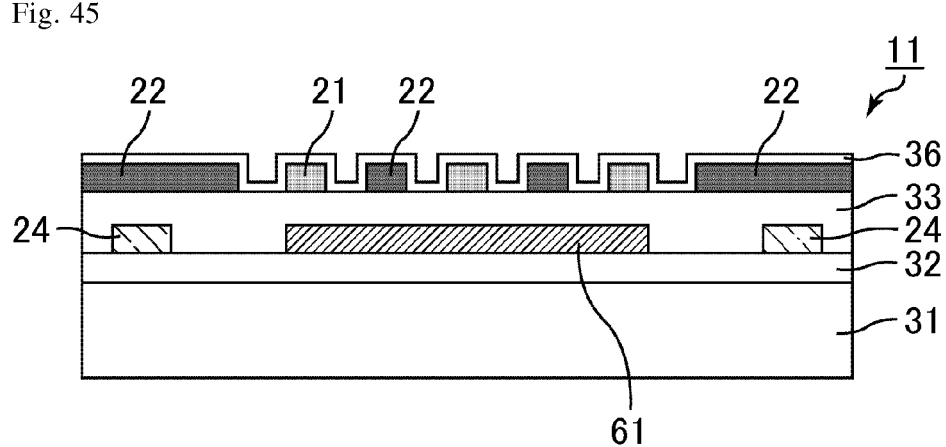
FIG. 45 is a sectional schematic view showing a TFT substrate of the liquid-crystal display device according to Embodiment 3-9 along the K-L line of FIG. 36.

In a liquid-crystal display device according to Embodiment 3-9, the pixel electrode and the common electrode are disposed on an identical layer. Therefore, a planar schematic view showing a single sub-pixel unit of a TFT substrate provided in the liquid-crystal display device according to Embodiment 3-9 is similar to FIG. 36. Meanwhile, FIG. 45 is a sectional schematic view showing the TFT substrate of the liquid-crystal display device according to Embodiment 3-9 along a K-L line of FIG. 36.

Hence, the pixel electrode 21 and the common electrode 22 may be disposed on the same layer, and in this case, the pixel electrode 21 and the common electrode 22 may be manufactured in an identical process.

Embodiment 3-10

In a liquid-crystal display device according to Embodiment 3-10, a horizontal alignment layer is used instead of the vertical alignment layer used in Embodiments 3-1 to 3-9. In other words, the method of controlling the liquid crystal molecules in the liquid-crystal display device according to Embodiment 3-10 corresponds to the IPS mode. Accordingly, a planar schematic view showing a single sub-pixel unit of a TFT substrate provided in the liquid-crystal display device according to Embodiment 3-10 is similar to FIG. 36. The method of controlling the liquid crystal molecules in the liquid-crystal display device according to Embodiment 3-10 is similar to that of Embodiment 1-10.

Embodiments 3-1 to 3-10 were described above, but in the respective embodiments, a bridge electrode may be used instead of the floating electrode, as in Embodiment 3-5, for example, and respective features of Embodiments 3-1 to 3-10 may be combined in other ways.

Embodiment 4

A liquid-crystal display device according to Embodiment 4 will be described below in twelve individual embodiments, namely Embodiments 4-1 to 4-12. A feature of the respective liquid-crystal display devices according to Embodiments 4-1 to 4-11 is that the pixel electrode has comb teeth on one side of the single shaft while the common electrode has comb teeth on both sides of the single shaft, and the common electrode extends so as to traverse the center of the sub-pixel. In a liquid-crystal display device according to Embodiment 4-12, on the other hand, the pixel electrode has comb teeth on both sides of the single shaft while the common electrode has comb teeth on one side of the single shaft, and the common electrode extends so as to traverse a gap between sub-pixels.

Further, in the liquid-crystal display device according to Embodiment 4, the source wiring, the pixel electrode, and the common electrode are respectively formed in a sideways V shape. In other words, the sub-pixel according to Embodiment 4 takes the shape of an arrow head. Thus, the liquid crystal molecules can be aligned with a favorable balance in a diagonal direction also, leading to an improvement in a viewing angle characteristic.

The liquid-crystal display devices according to Embodiments 4-1 to 4-12 are all of a mode in which the alignment of the liquid crystal molecules is controlled using a transverse electric field. Embodiments 4-1 to 4-10 correspond to a mode in which the liquid crystal molecules are aligned homeotropically, or in other words aligned vertically relative to the pair of substrate surfaces, when no voltage is applied, whereas Embodiment 4-11 corresponds to the so-called IPS mode in which the liquid crystal molecules are aligned homogeneously, or in other words aligned horizontally relative to the pair of substrate surfaces, when no voltage is applied. In Embodiment 4-12, either mode may be applied.

Embodiment 4-1

Figure 46:
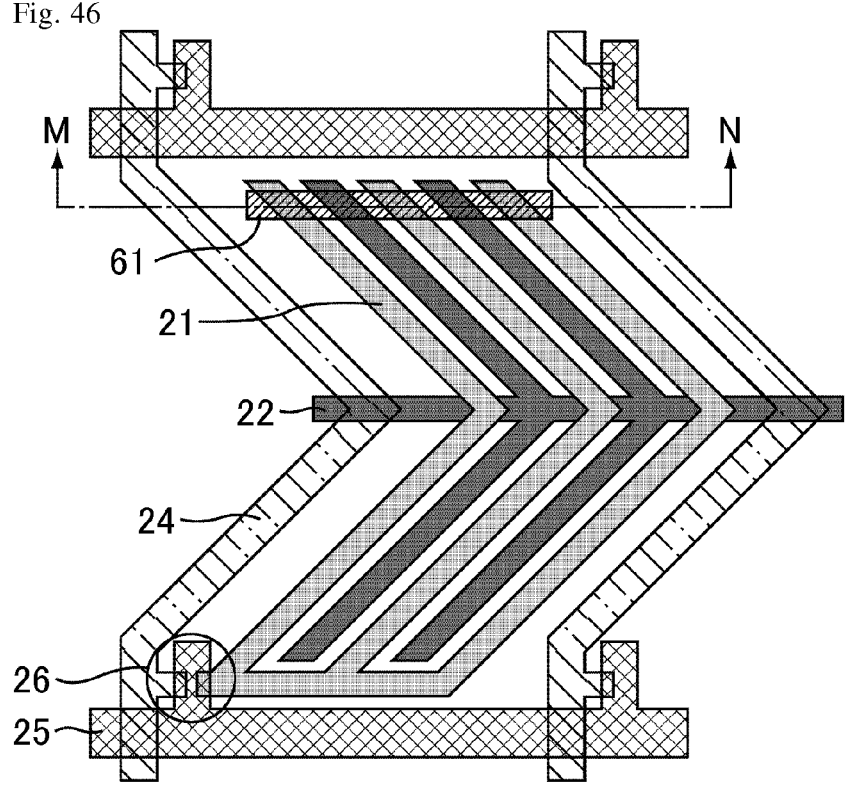
FIG. 46 is a planar schematic view showing a single sub-pixel unit of a TFT substrate provided in liquid-crystal display devices according to Embodiments 4-1 and 4-11.

FIG. 46 is a planar schematic view showing a single sub-pixel unit of a TFT substrate provided in a liquid-crystal display device according to Embodiment 4-1. Further, FIG. 19 is a sectional schematic view showing the TFT substrate along an M-N line of FIG. 46.

As shown in FIG. 19, the pixel electrode 21 and the common electrode 22 are disposed on different layers, the pixel electrode 21 being disposed closer to the liquid crystal layer and the common electrode 22 being disposed further from the liquid crystal layer. Further, as shown in FIG. 46, the liquid-crystal display device according to Embodiment 4-1 includes the corrective floating electrode 61, and the floating electrode 61 is disposed to overlap both the end portions of the comb teeth of the pixel electrode 21 and the end portions of the comb teeth of the common electrode 22. Hence, in the liquid-crystal display device according to Embodiment 4-1, the single floating electrode 61 can be used as a corrective electrode for both the pixel electrode 21 and the common electrode 22.

Embodiment 4-2

Figure 47:
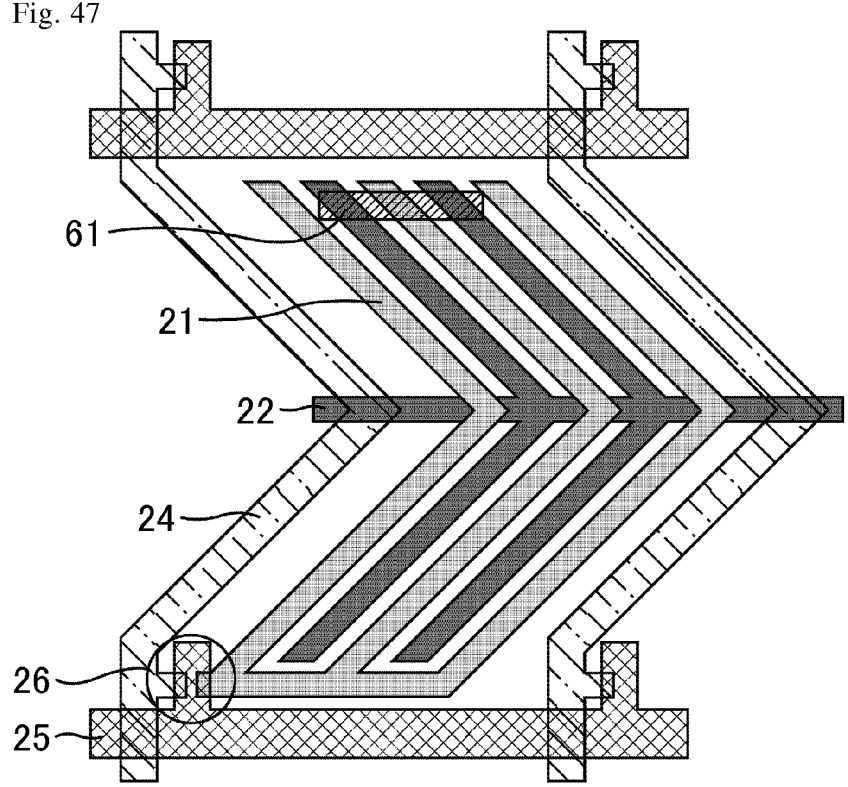
FIG. 47 is a planar schematic view showing a single sub-pixel unit of a TFT substrate provided in a liquid-crystal display device according to Embodiment 4-2.

FIG. 47 is a planar schematic view showing a single sub-pixel unit of a TFT substrate provided in a liquid-crystal display device according to Embodiment 4-2. As shown in FIG. 47, in the liquid-crystal display device according to Embodiment 4-2, a floating electrode 61 having a shorter length than the floating electrode 61 of the liquid-crystal display device according to Embodiment 4-1 is provided for use in correcting the common electrode 22. By reducing the length of the floating electrode 61, an improvement in the transmittance is achieved.

Embodiment 4-3

Figure 48:
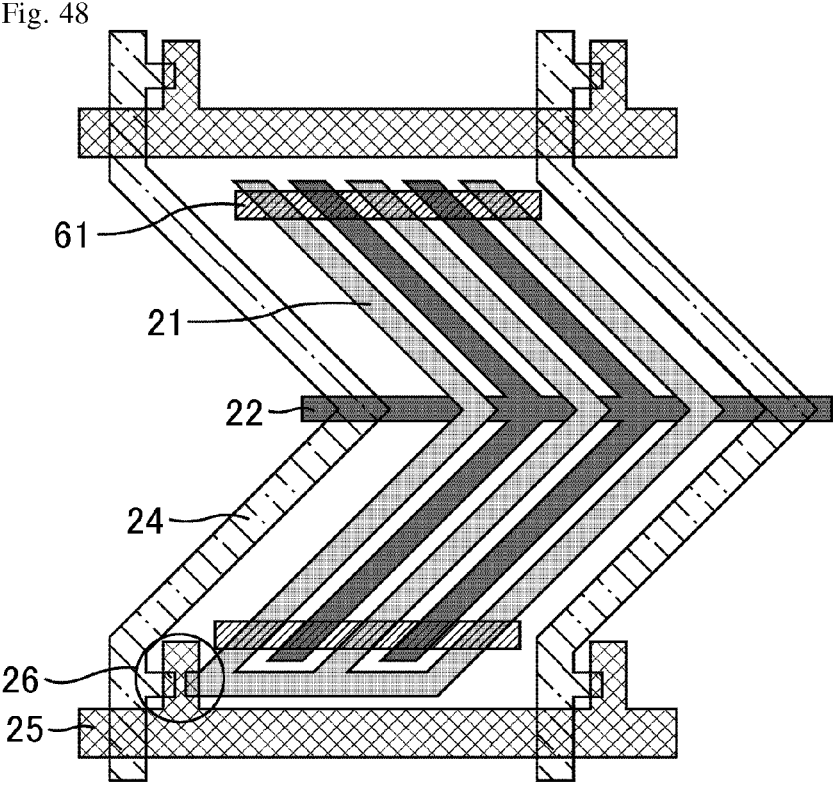
FIG. 48 is a planar schematic view showing a single sub-pixel unit of a TFT substrate provided in a liquid-crystal display device according to Embodiment 4-3.

FIG. 48 is a planar schematic view showing a single sub-pixel unit of a TFT substrate provided in a liquid-crystal display device according to Embodiment 4-3. As shown in FIG. 48, in the liquid-crystal display device according to Embodiment 4-3, the floating electrode 61 is disposed not only in a region overlapping the end portions of the comb teeth of the pixel electrode 21 and the end portions of the comb teeth on one side of the common electrode 22, but also in a region overlapping the end portions of the comb teeth on the other side of the common electrode 22.

By disposing the floating electrode 61 to overlap both the end portions of the comb teeth of the pixel electrode 21 and the end portions of the comb teeth on both sides of the common electrode 22 in this manner, a disconnection occurring in any part of the pixel electrode 21 and the common electrode 22 can be corrected through laser irradiation.

Embodiment 4-4

Figure 49:
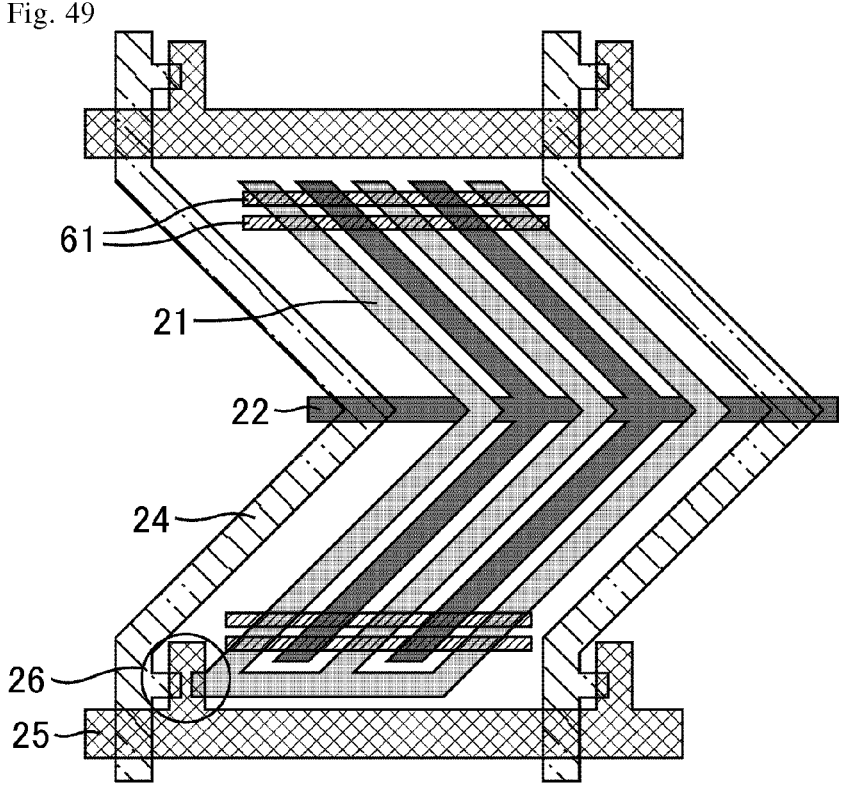
FIG. 49 is a planar schematic view showing a single sub-pixel unit of a TFT substrate provided in a liquid-crystal display device according to Embodiment 4-4.

FIG. 49 is a planar schematic view showing a single sub-pixel unit of a TFT substrate provided in a liquid-crystal display device according to Embodiment 4-4. As shown in FIG. 49, in the liquid-crystal display device according to Embodiment 4-4, two floating electrodes 61 are disposed respectively in the regions overlapping the end portions of the comb teeth of the pixel electrode 21 and the end portions of the comb teeth on both sides of the common electrode 22.

By disposing the floating electrode 61 in duplex in this manner, when a disconnection occurs in one of the floating electrodes 61, a correction can be performed using the other floating electrode 61, leading to an improvement in reliability.

Embodiment 4-5

Figure 50:
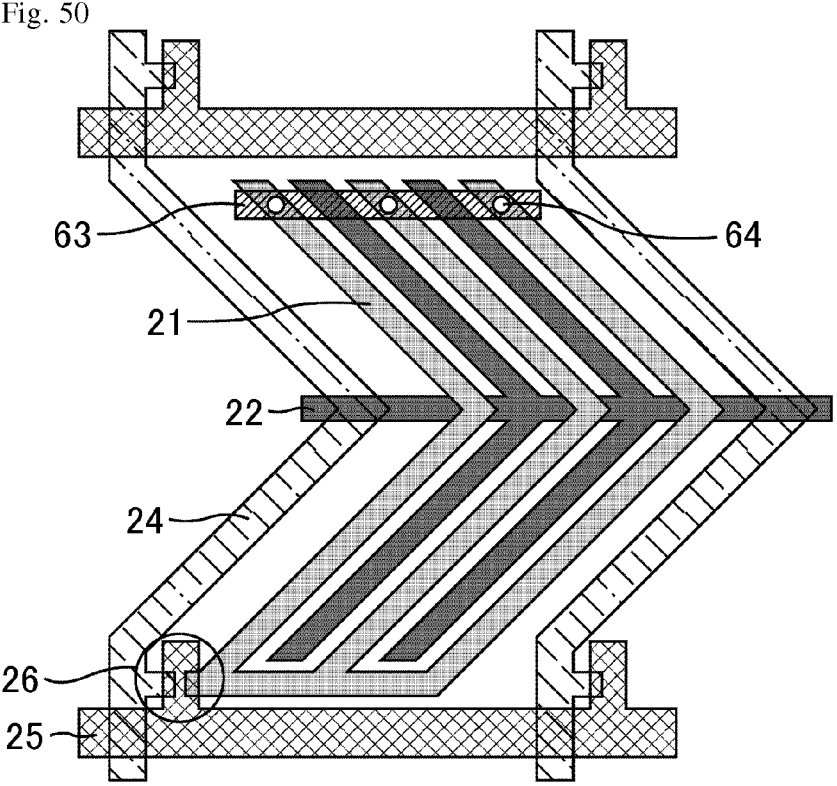
FIG. 50 is a planar schematic view showing a single sub-pixel unit of a TFT substrate provided in a liquid-crystal display device according to Embodiment 4-5.

FIG. 50 is a planar schematic view showing a single sub-pixel unit of a TFT substrate provided in a liquid-crystal display device according to Embodiment 4-5. As shown in FIG. 50, in the liquid-crystal display device according to Embodiment 4-5, the contact hole 64 is formed in the end portion of each comb tooth of the pixel electrode 21, and the respective end portions of the comb teeth of the pixel electrode 21 are connected to the bridge electrode 63 via the contact holes 64. The bridge electrode 63 is linearly shaped and disposed to overlap the end portions of the comb teeth of the pixel electrode 21 and the end portions of the comb teeth on one side of the common electrode 22. A similar material to that of Embodiment 1-5 may be used as the material of the bridge electrode 63.

By providing the bridge electrode 63, when a disconnection occurs in a part of the comb teeth of the pixel electrode 21, the disconnected comb tooth of the pixel electrode 21 and the non-disconnected comb teeth of the pixel electrode 21 remain connected via the bridge electrode 63. Therefore, the signal voltage can be supplied to the entire pixel electrode 21, and as a result, a pixel defect does not occur.

Embodiment 4-6

Figure 51:
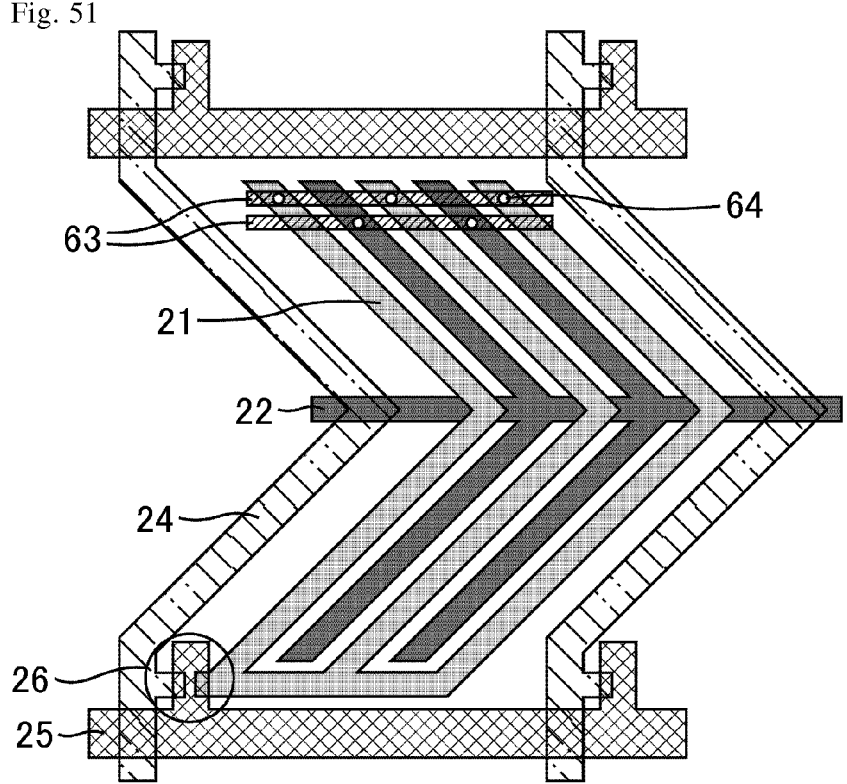
FIG. 51 is a planar schematic view showing a single sub-pixel unit of a TFT substrate provided in a liquid-crystal display device according to Embodiment 4-6.

FIG. 51 is a planar schematic view showing a single sub-pixel unit of a TFT substrate provided in a liquid-crystal display device according to Embodiment 4-6. As shown in FIG. 51, in the liquid-crystal display device according to Embodiment 4-6, the contact hole 64 is formed in the respective end portions of the comb teeth of the pixel electrode 21 and the comb teeth of the common electrode 22. The bridge electrode 63 takes a linear shape, and two bridge electrodes 63 are disposed to overlap the end portions of the comb teeth of the pixel electrode 21 and the end portions of the comb teeth on one side of the common electrode 22. Further, of the two bridge electrodes 63, one is connected only to the pixel electrode 21 via the contact holes 64, while the other is connected only to the common electrode 22 via the contact holes 64.

By providing two bridge electrodes 63 connected to separate electrodes in this manner, when a disconnection occurs in one of the pixel electrode 21 and the common electrode 22, the signal voltage can be supplied to the entire pixel electrode 21 via one of the bridge electrodes 63 and the common voltage can be supplied to the entire common electrode 22 via the other bridge electrode 63. As a result, the likelihood of a pixel defect can be reduced.

Embodiment 4-7

Figure 52:
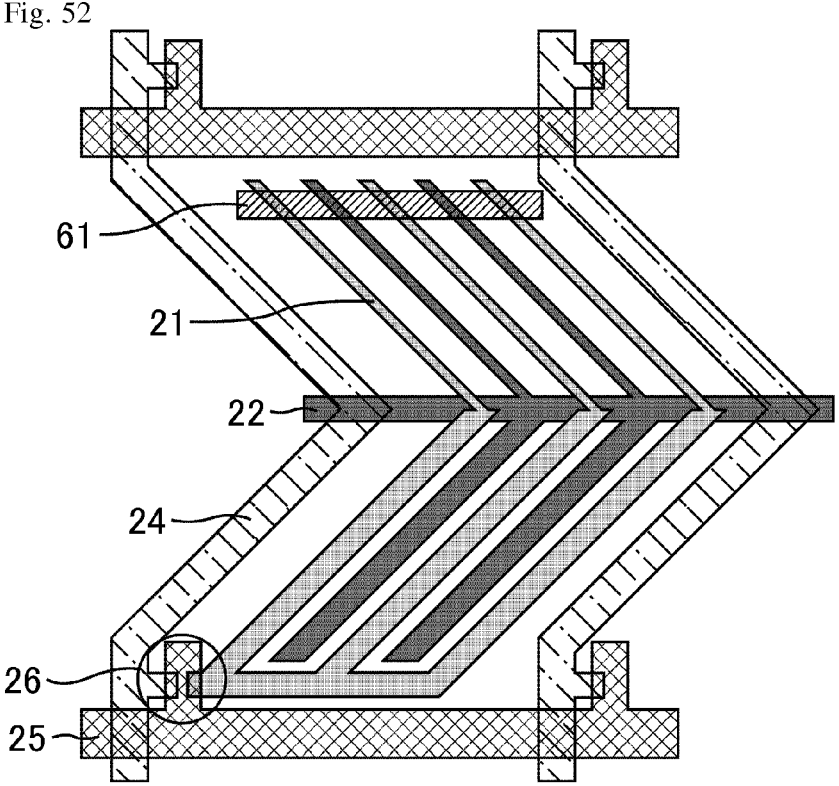
FIG. 52 is a planar schematic view showing a single sub-pixel unit of a TFT substrate provided in a liquid-crystal display device according to Embodiment 4-7.

FIG. 52 is a planar schematic view showing a single sub-pixel unit of a TFT substrate provided in a liquid-crystal display device according to Embodiment 4-7. As shown in FIG. 52, in the liquid-crystal display device according to Embodiment 4-7, half of the comb teeth of the pixel electrode 21 and the comb teeth on one side of the common electrode 22 are formed to be narrow, and the floating electrode 61 is disposed in the region overlapping the end portions of the comb teeth of the pixel electrode 21 and the end portions of the comb teeth of the common electrode 22.

By disposing the floating electrode 61 to overlap the narrow part of the pixel electrode 21 where a disconnection is more likely to occur, a disconnection in either the pixel electrode 21 or the common electrode 22 can be corrected through laser irradiation.

Embodiment 4-8

Figure 53:
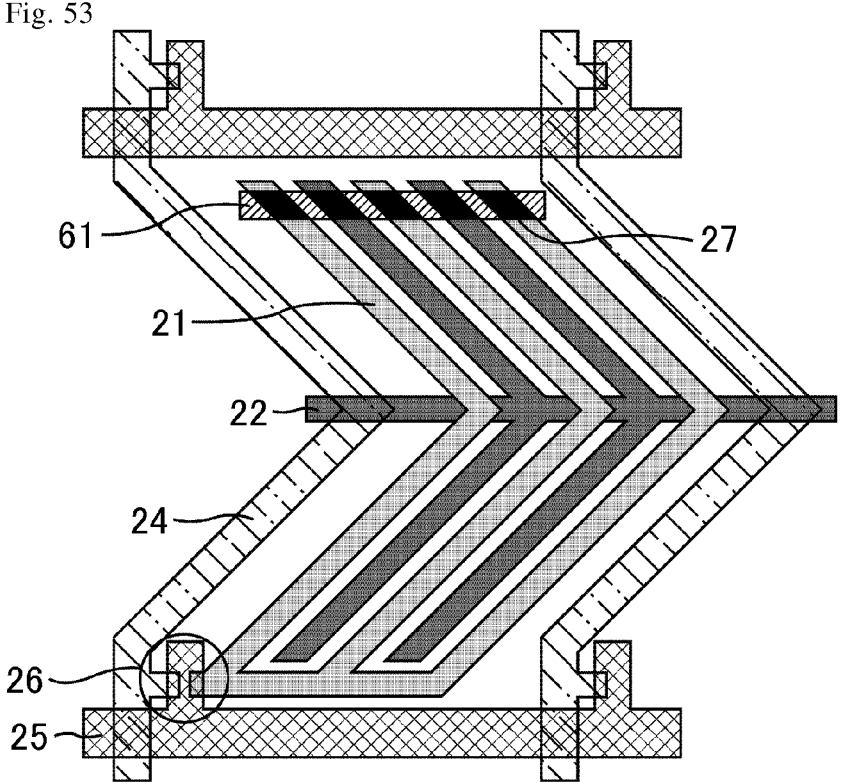
FIG. 53 is a planar schematic view showing a single sub-pixel unit of a TFT substrate provided in a liquid-crystal display device according to Embodiment 4-8.

FIG. 53 is a planar schematic view showing a single sub-pixel unit of a TFT substrate provided in a liquid-crystal display device according to Embodiment 4-8. As shown in FIG. 53, in the liquid-crystal display device according to Embodiment 4-8, the light shielding film 27 is disposed respectively on the end portions of the comb teeth of the pixel electrode 21 and the end portions of the comb teeth on one side of the common electrode 22.

As a result, similarly to Embodiment 1-7, an alignment disturbance can be prevented from adversely affecting the display quality even when a correction is performed through laser irradiation.

Embodiment 4-9

Figure 54:
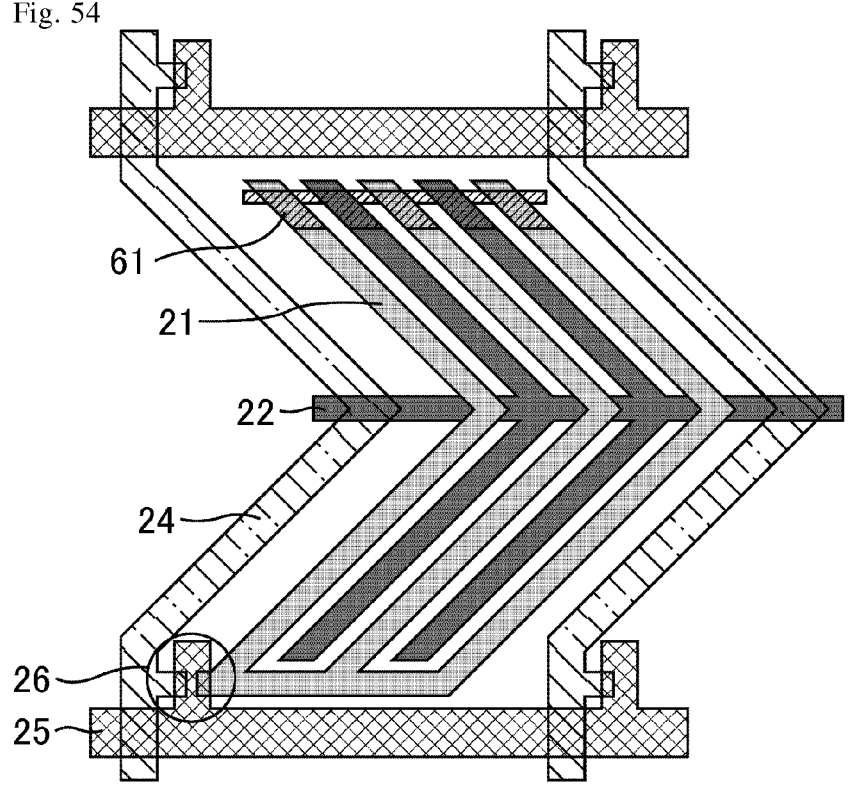
FIG. 54 is a planar schematic view showing a single sub-pixel unit of a TFT substrate provided in a liquid-crystal display device according to Embodiment 4-9.

FIG. 54 is a planar schematic view showing a single sub-pixel unit of a TFT substrate provided in a liquid-crystal display device according to Embodiment 4-9. As shown in FIG. 54, in the liquid-crystal display device according to Embodiment 4-9, the floating electrode 61 is formed to be wider in the sites overlapping the end portions of the comb teeth of the pixel electrode 21 than in the sites not overlapping the end portions of the comb teeth of the pixel electrode 21 and the common electrode 22.

Similarly to Embodiment 1-8, by forming the sites overlapping the end portions of the comb teeth of the pixel electrode 21 and common electrode 22 to be wider in this manner, correction through laser irradiation becomes easier. Further, the sites not overlapping the end portions of the comb teeth of the pixel electrode 21 and common electrode 22 can be made narrower, leading to a corresponding improvement in the transmittance.

Embodiment 4-10

Figure 55:
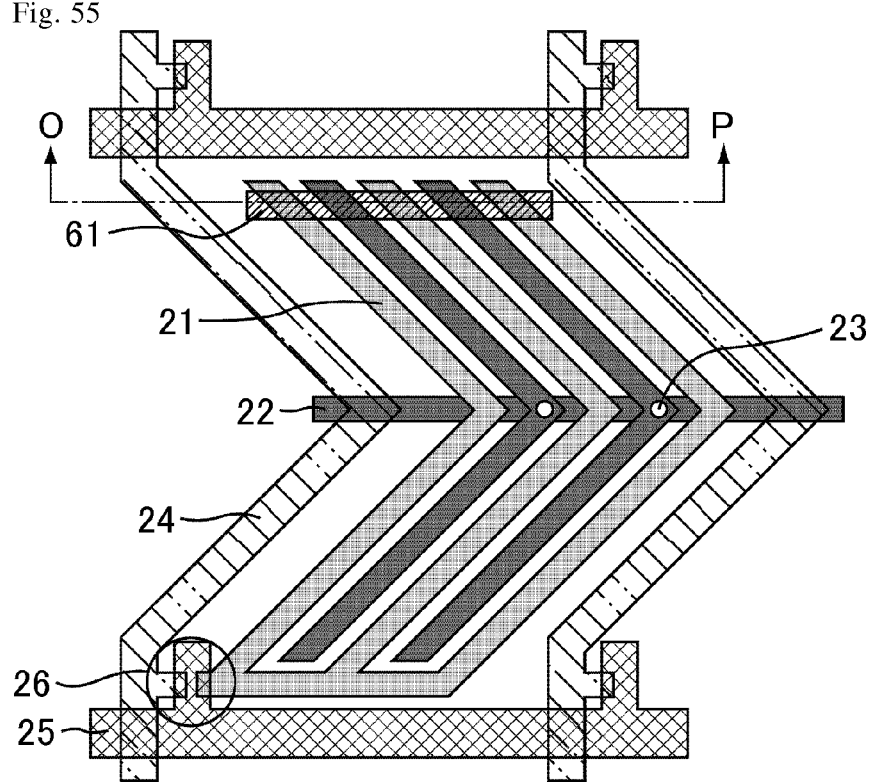
FIG. 55 is a planar schematic view showing a single sub-pixel unit of a TFT substrate provided in a liquid-crystal display device according to Embodiment 4-10.

FIG. 55 is a planar schematic view showing a single sub-pixel unit of a TFT substrate provided in a liquid-crystal display device according to Embodiment 4-10. As shown in FIG. 55, in the liquid-crystal display device according to Embodiment 4-10, the comb tooth parts of the pixel electrode 21 and the common electrode 22 are disposed on an identical layer. Therefore, a sectional schematic view showing the TFT substrate along an O-P line of FIG. 55 is similar to FIG. 32.

Hence, it is possible to dispose only a part of the common electrode 22 on the same layer as the pixel electrode 21, and in this case, the pixel electrode 21 and the shaft part of the common electrode 22 may be manufactured in an identical process.

Embodiment 4-11

In a liquid-crystal display device according to Embodiment 4-11, a horizontal alignment layer is used instead of the vertical alignment layer used in Embodiments 4-1 to 4-10. In other words, the method of controlling the liquid crystal molecules in the liquid-crystal display device according to Embodiment 4-11 corresponds to the IPS mode. Accordingly, a planar schematic view showing a single sub-pixel unit of a TFT substrate provided in the liquid-crystal display device according to Embodiment 4-11 is similar to FIG. 46.

The method of controlling the liquid crystal molecules in the liquid-crystal display device according to Embodiment 4-11 is similar to that of Embodiment 1-10.

Embodiment 4-12

Figure 56:
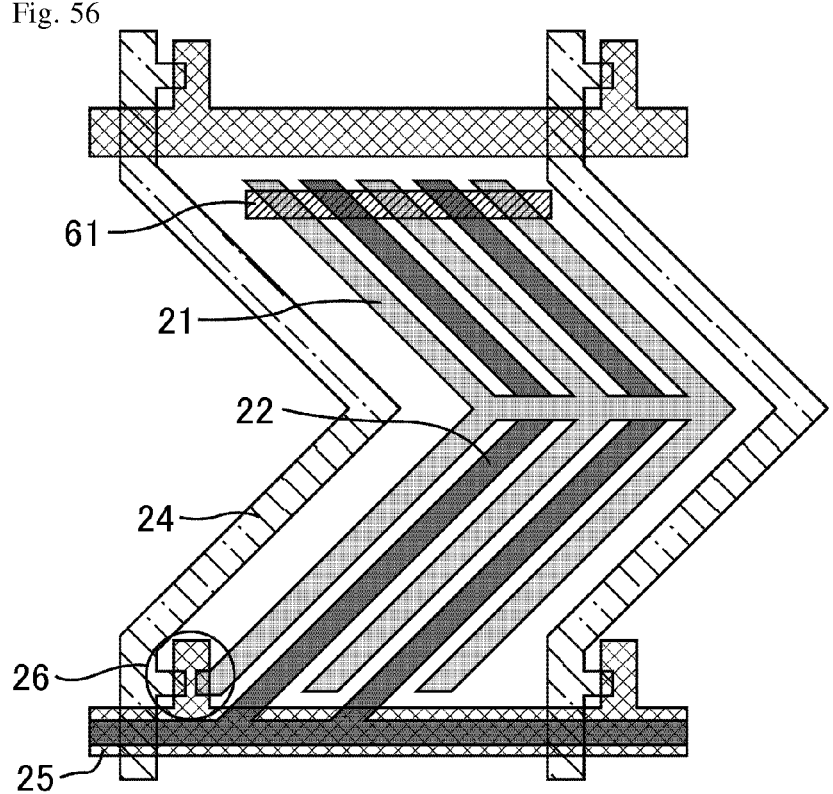
FIG. 56 is a planar schematic view showing a single sub-pixel unit of a TFT substrate provided in a liquid-crystal display device according to Embodiment 4-12.

FIG. 56 is a planar schematic view showing a single sub-pixel unit of a TFT substrate provided in a liquid-crystal display device according to Embodiment 4-12. A feature of the respective liquid-crystal display devices according to Embodiments 4-1 to 4-11 is that the pixel electrode has comb teeth on one side of the single shaft while the common electrode has comb teeth on both sides of the single shaft, and the common electrode extends so as to traverse the center of the sub-pixel. In the liquid-crystal display device according to Embodiment 4-12, on the other hand, as shown in FIG. 56, the pixel electrode 21 has comb teeth on both sides of the single shaft while the common electrode 22 has comb teeth on one side of the single shaft, and the common electrode 22 extends to the outside of the sub-pixel, or in other words above the gate wiring 25. Note that this wiring arrangement may also be applied to any of Embodiments 4-1 to 4-11.

Embodiments 4-1 to 4-12 were described above, but in the respective embodiments, a bridge electrode may be used instead of the floating electrode, as in Embodiment 4-5, for example, and respective features of Embodiments 4-1 to 4-12 may be combined in other ways.

Embodiment 5

A liquid-crystal display device according to Embodiment 5 will be described below in fifteen individual embodiments, namely Embodiments 5-1 to 5-15. A feature of the respective liquid-crystal display devices according to Embodiment 5 is that the pixel electrode has comb teeth on both sides of a cross-shaped shaft and the common electrode has comb teeth on both sides of a cross-shaped shaft. The common electrode extends so as to traverse the center of the sub-pixel. Thus, the liquid crystal molecules can be aligned with a favorable balance in a diagonal direction also, leading to an improvement in the viewing angle characteristic. Further, the pixel electrode and common electrode have a complicated symmetrical structure, and therefore the liquid crystal molecules can be subjected to fine control.

The liquid-crystal display devices according to Embodiments 5-1 to 5-14 are of a mode in which the alignment of the liquid crystal molecules is controlled using a transverse electric field, whereas the liquid-crystal display device according to Embodiment 5-15 is of a mode in which the alignment of the liquid crystal molecules is controlled using a vertical electric field. Further, Embodiments 5-1 to 5-13 and 5-15 correspond to a mode in which the liquid crystal molecules are aligned homeotropically, or in other words aligned vertically relative to the pair of substrate surfaces, when no voltage is applied, whereas Embodiment 5-14 corresponds to the so-called IPS mode in which the liquid crystal molecules are aligned homogeneously, or in other words aligned horizontally relative to the pair of substrate surfaces, when no voltage is applied. The liquid-crystal display device according to Embodiment 5-15 is of a so-called VA mode.

Embodiment 5-1

Figure 57:
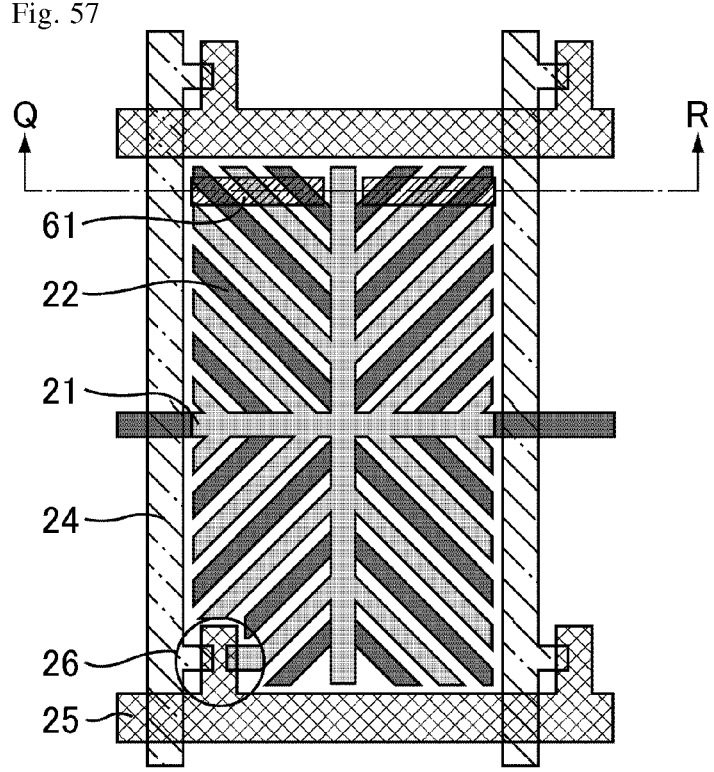
FIG. 57 is a planar schematic view showing a single sub-pixel unit of a TFT substrate provided in liquid-crystal display devices according to Embodiments 5-1 and 5-14.

FIG. 57 is a planar schematic view showing a single sub-pixel unit of a TFT substrate provided in a liquid-crystal display device according to Embodiment 5-1. Further, FIG. 58 is a sectional schematic view showing the TFT substrate along a Q-R line of FIG. 57.

Figure 58:
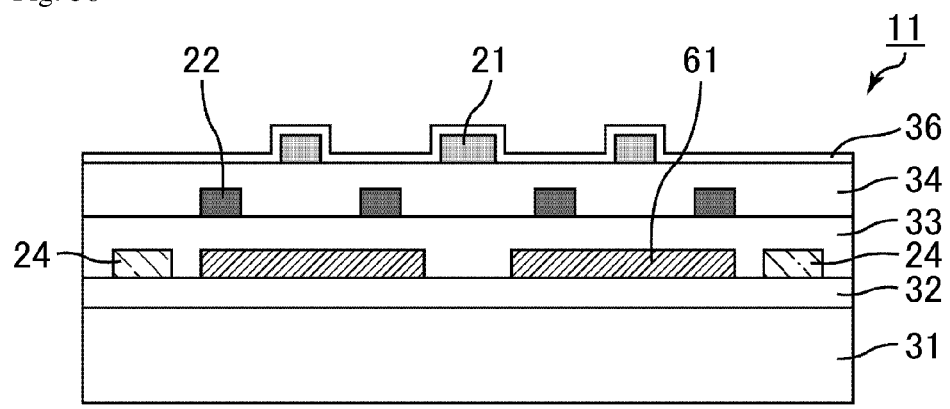
FIG. 58 is a sectional schematic view showing the TFT substrate along a Q-R line of FIG. 57.

As shown in FIG. 58, the pixel electrode 21 and the common electrode 22 are disposed on different layers, the pixel electrode 21 being disposed closer to the liquid crystal layer and the common electrode 22 being disposed further from the liquid crystal layer. Further, as shown in FIG. 57, the liquid-crystal display device according to Embodiment 5-1 includes the corrective floating electrode 61, and the floating electrode 61 is disposed to overlap both the end portions of the comb teeth of the pixel electrode 21 and the end portions of the comb teeth of the common electrode 22. Furthermore, the floating electrode 61 extends in a linear shape in a short side direction (a direction following the gate wiring 25) of the sub-pixel so as to be used to correct the common electrode 22.

Embodiment 5-2

Figure 59:
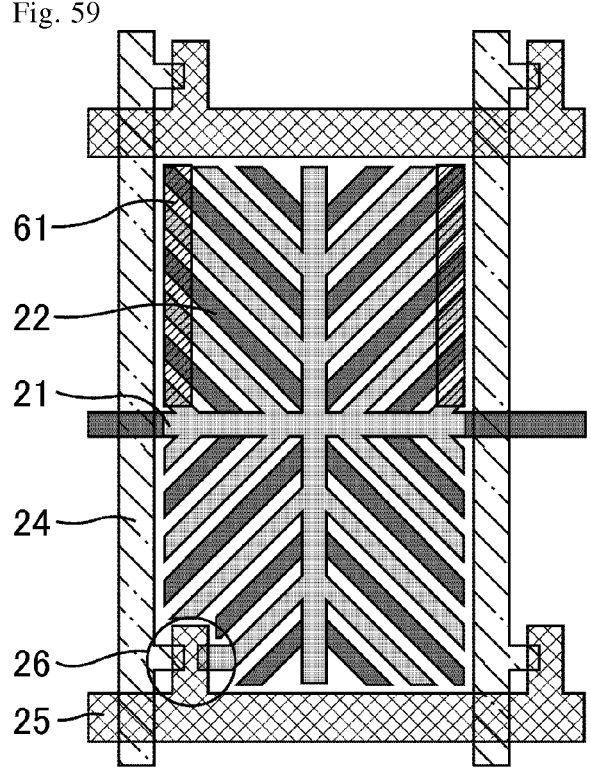
FIG. 59 is a planar schematic view showing a single sub-pixel unit of a TFT substrate provided in a liquid-crystal display device according to Embodiment 5-2.

FIG. 59 is a planar schematic view showing a single sub-pixel unit of a TFT substrate provided in a liquid-crystal display device according to Embodiment 5-2. As shown in FIG. 59, in the liquid-crystal display device according to Embodiment 5-2, the floating electrode 61 of the liquid-crystal display device according to Embodiment 5-1 is disposed to overlap both the end portions of the comb teeth of the pixel electrode 21 and the end portions of the comb teeth of the common electrode 22. Further, the floating electrode 61 extends in a linear shape in a long side direction (a direction following the source wiring 24) of the sub-pixel such that the floating electrode 61 can be used as an electrode for correcting both the pixel electrode 21 and the common electrode 22.

Embodiment 5-3

Figure 60:
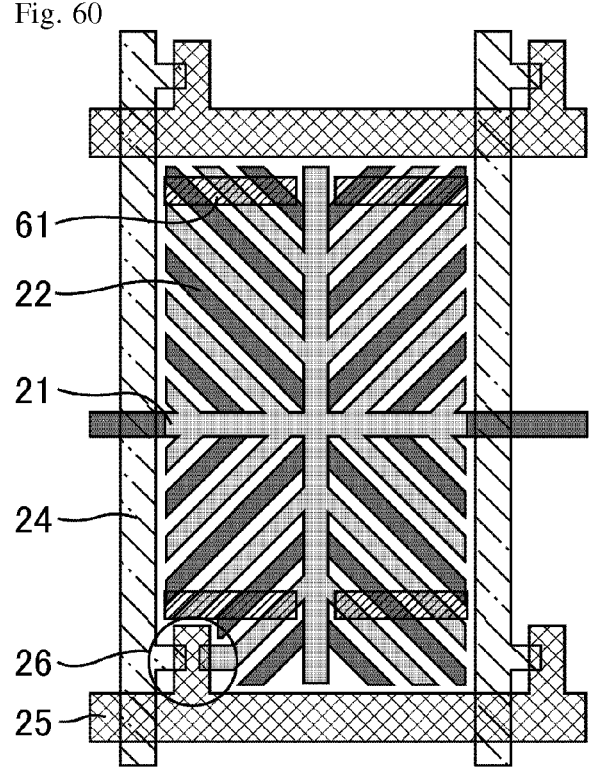
FIG. 60 is a planar schematic view showing a single sub-pixel unit of a TFT substrate provided in a liquid-crystal display device according to Embodiment 5-3.

FIG. 60 is a planar schematic view showing a single sub-pixel unit of a TFT substrate provided in a liquid-crystal display device according to Embodiment 5-3. As shown in FIG. 60, in the liquid-crystal display device according to Embodiment 5-3, the floating electrode 61 is disposed to overlap both the end portions of the comb teeth of the pixel electrode 21 and the end portions of the comb teeth of the common electrode 22. Further, the floating electrode 61 is disposed on both an upper side and a lower side of the short side direction (the direction following the gate wiring 25) of the sub-pixel. Thus, the floating electrode 61 disposed along the upper side can be used as an electrode for correcting the common electrode 22 and the floating electrode 61 disposed along the lower side can be used as an electrode for correcting the pixel electrode 21. As a result, both the pixel electrode 21 and the common electrode 22 can be corrected.

Embodiment 5-4

Figure 61:
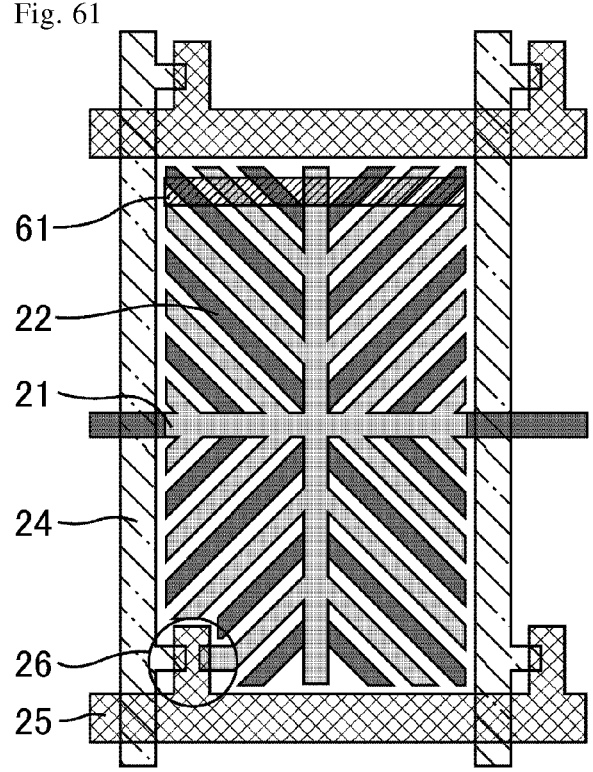
FIG. 61 is a planar schematic view showing a single sub-pixel unit of a TFT substrate provided in a liquid-crystal display device according to Embodiment 5-4.

FIG. 61 is a planar schematic view showing a single sub-pixel unit of a TFT substrate provided in a liquid-crystal display device according to Embodiment 5-4. As shown in FIG. 61, in the liquid-crystal display device according to Embodiment 5-4, the floating electrode 61 is disposed to overlap both the end portions of the comb teeth of the pixel electrode 21 and the end portions of the comb teeth of the common electrode 22. Further, the floating electrode 61 is disposed in the short side direction (the direction following the gate wiring 25) of the sub-pixel so as to overlap not only the end portions of the comb teeth but also an end portion of the shaft. The floating electrode 61 thus disposed overlaps both the end portions of the comb teeth of the pixel electrode 21 and the end portions of the comb teeth of the common electrode 22, and therefore the single floating electrode 61 can be used as an electrode for correcting both the pixel electrode 21 and the common electrode 22.

Embodiment 5-5

Figure 62:
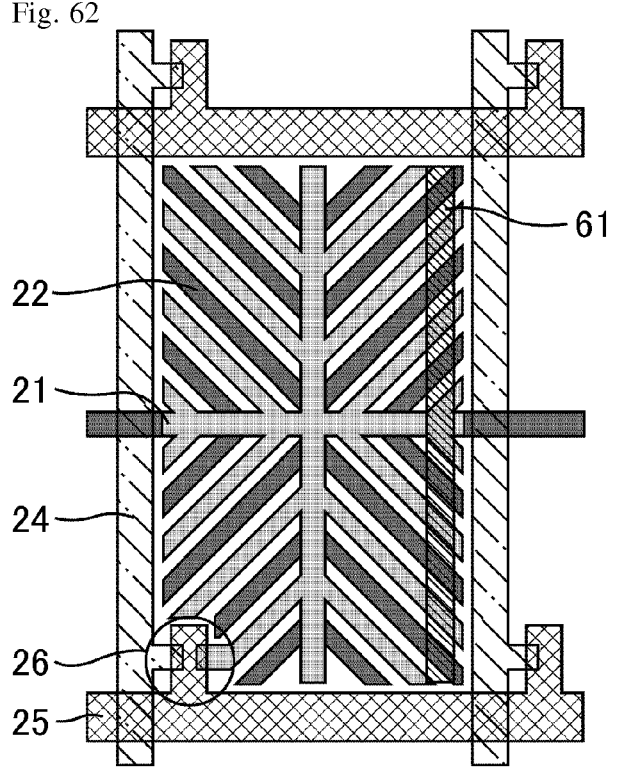
FIG. 62 is a planar schematic view showing a single sub-pixel unit of a TFT substrate provided in a liquid-crystal display device according to Embodiment 5-5.

FIG. 62 is a planar schematic view showing a single sub-pixel unit of a TFT substrate provided in a liquid-crystal display device according to Embodiment 5-5. As shown in FIG. 62, in the liquid-crystal display device according to Embodiment 5-5, the floating electrode 61 is disposed to overlap both the end portions of the comb teeth of the pixel electrode 21 and the end portions of the comb teeth of the common electrode 22. Further, the floating electrode 61 is disposed in the long side direction (the direction following the source wiring 24) of the sub-pixel so as to overlap not only the end portions of the comb teeth but also an end portion of the shaft. The floating electrode 61 thus disposed overlaps both the end portions of the comb teeth of the pixel electrode 21 and the end portions of the comb teeth of the common electrode 22, and therefore the single floating electrode 61 can be used as an electrode for correcting both the pixel electrode 21 and the common electrode 22.

Embodiment 5-6

Figure 63:
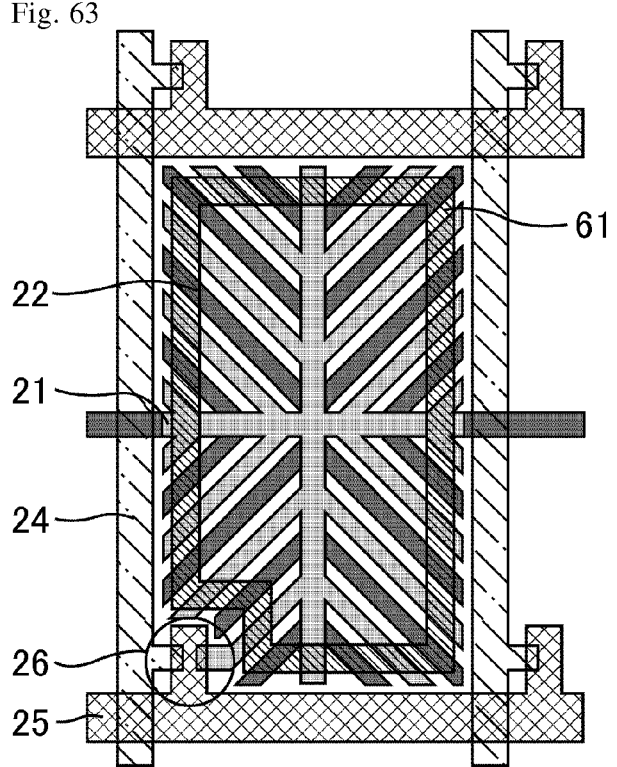
FIG. 63 is a planar schematic view showing a single sub-pixel unit of a TFT substrate provided in a liquid-crystal display device according to Embodiment 5-6.

FIG. 63 is a planar schematic view showing a single sub-pixel unit of a TFT substrate provided in a liquid-crystal display device according to Embodiment 5-6. As shown in FIG. 63, in the liquid-crystal display device according to Embodiment 5-6, the floating electrode 61 is disposed to overlap both the end portions of the comb teeth of the pixel electrode 21 and the end portions of the comb teeth of the common electrode 22. Further, the floating electrode 61 is disposed in both the short side direction (the direction following the gate wiring 25) of the sub-pixel and the long side direction (the direction following the source wiring 24) of the sub-pixel so as to overlap not only the end portions of the comb teeth but also end portions of the shaft. Note that the floating electrode 61 is disposed around an outer periphery of the TFT 26 so as not to overlap the TFT 26. In other words, in Embodiment 5-6, the floating electrode 61 is disposed around an outer periphery of a region surrounded by the source wiring 25, the gate wiring 24, and the TFT 26, and can thus be used as a corrective electrode for correcting a disconnection in a comb tooth of either the pixel electrode 21 or the common electrode 22.

Embodiment 5-7

Figure 64:
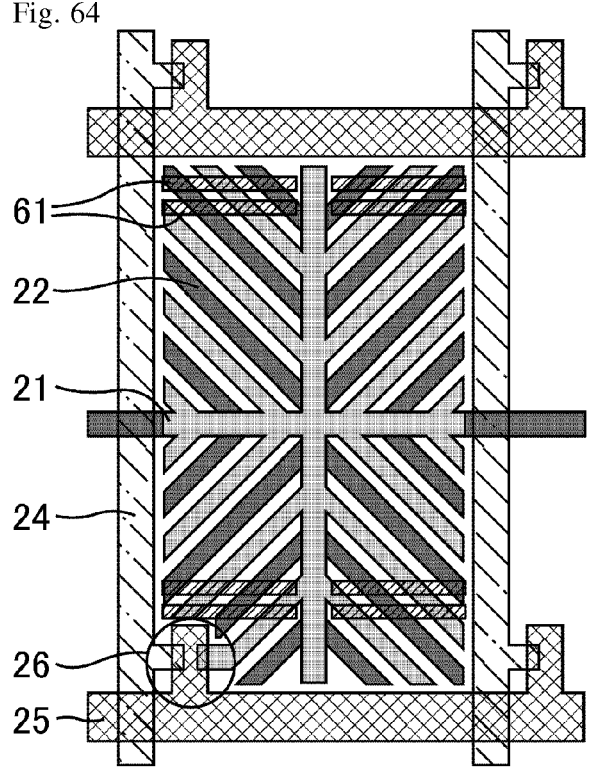
FIG. 64 is a planar schematic view showing a single sub-pixel unit of a TFT substrate provided in a liquid-crystal display device according to Embodiment 5-7.

FIG. 64 is a planar schematic view showing a single sub-pixel unit of a TFT substrate provided in a liquid-crystal display device according to Embodiment 5-7. As shown in FIG. 64, in the liquid-crystal display device according to Embodiment 5-7, two floating electrodes 61 are disposed respectively in the regions overlapping the end portions of the comb teeth of the pixel electrode 21 and the end portions of the comb teeth on both sides of the common electrode 22.

By disposing the floating electrode 61 in duplex in this manner, when a disconnection occurs in one of the floating electrodes 61, a correction can be performed using the other floating electrode 61.

Embodiment 5-8

Figure 65:
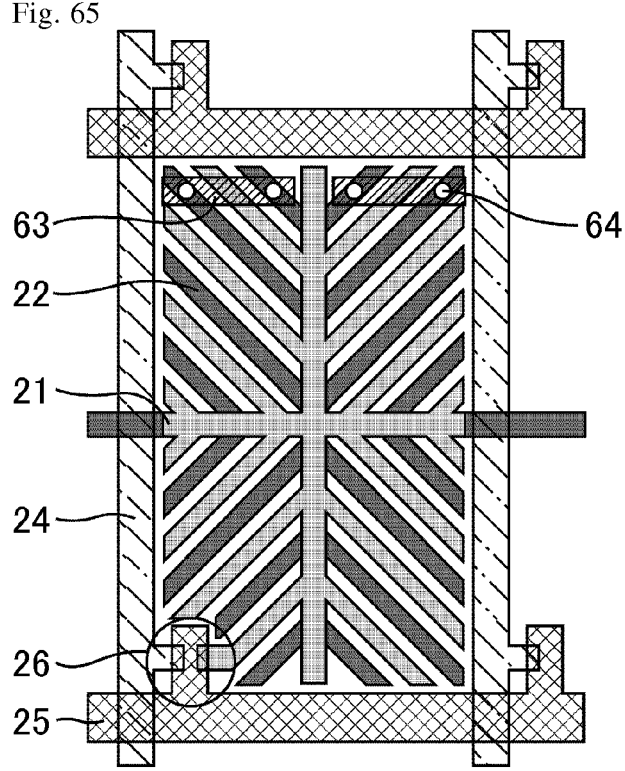
FIG. 65 is a planar schematic view showing a single sub-pixel unit of a TFT substrate provided in a liquid-crystal display device according to Embodiment 5-8.

FIG. 65 is a planar schematic view showing a single sub-pixel unit of a TFT substrate provided in a liquid-crystal display device according to Embodiment 5-8. As shown in FIG. 65, in the liquid-crystal display device according to Embodiment 5-8, the contact hole 64 is formed in the end portion of each comb tooth of the common electrode 22, and the respective end portions of the comb teeth of the common electrode 22 are connected to the bridge electrode 63 via the contact holes 64. The bridge electrode 63 is linearly shaped and disposed to overlap the end portions of the comb teeth of the common electrode 22.

By providing the bridge electrode 63, when a disconnection occurs in a part of the comb teeth of the common electrode 22, the disconnected comb tooth of the common electrode 22 and the non-disconnected comb teeth of the common electrode 22 remain connected via the bridge electrode 63. Therefore, the signal voltage can be supplied to the entire common electrode 22, and as a result, a pixel defect does not occur.

Embodiment 5-9

Figure 66:
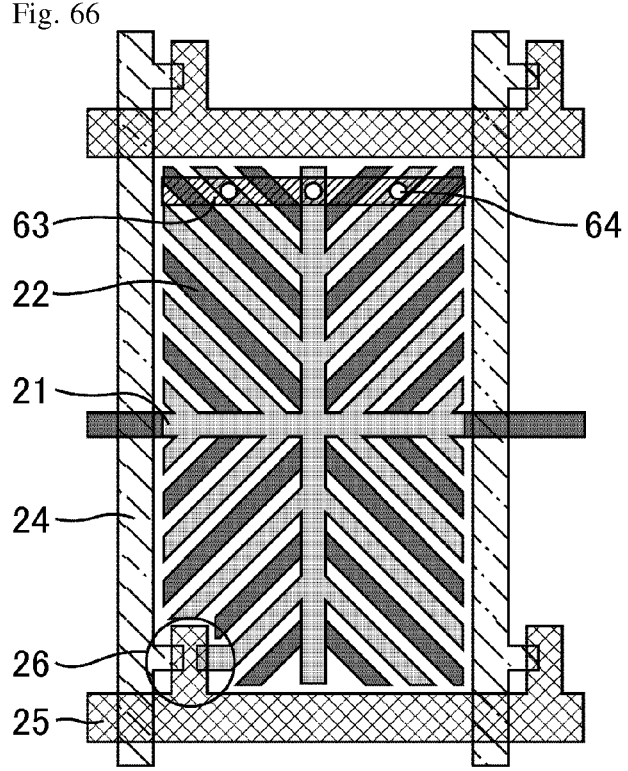
FIG. 66 is a planar schematic view showing a single sub-pixel unit of a TFT substrate provided in a liquid-crystal display device according to Embodiment 5-9.

FIG. 66 is a planar schematic view showing a single sub-pixel unit of a TFT substrate provided in a liquid-crystal display device according to Embodiment 5-9. As shown in FIG. 66, in the liquid-crystal display device according to Embodiment 5-9, the contact hole 64 is formed in the end portion of each comb tooth of the pixel electrode 21, and the respective end portions of the comb teeth of the pixel electrode 21 are connected to the bridge electrode 63 via the contact holes 64. The bridge electrode 63 is linearly shaped and disposed in an upper side direction (a direction following the gate wiring 26) of the sub-pixel. Further, the bridge electrode 63 is disposed to overlap the end portions of the comb teeth of the pixel electrode 21, and disposed to overlap not only the end portions of the comb teeth but also an end portion of the shaft. The contact hole 64 is also provided in the end portion of the shaft of the pixel electrode 21.

By providing the bridge electrode 63, when a disconnection occurs in a part of the comb teeth of the pixel electrode 21, the disconnected comb tooth of the pixel electrode 21 and the non-disconnected comb teeth or the shaft of the pixel electrode 21 remain connected via the bridge electrode 63. Therefore, the signal voltage can be supplied to the entire pixel electrode 21, and as a result, a pixel defect does not occur.

Embodiment 5-10

Figure 67:
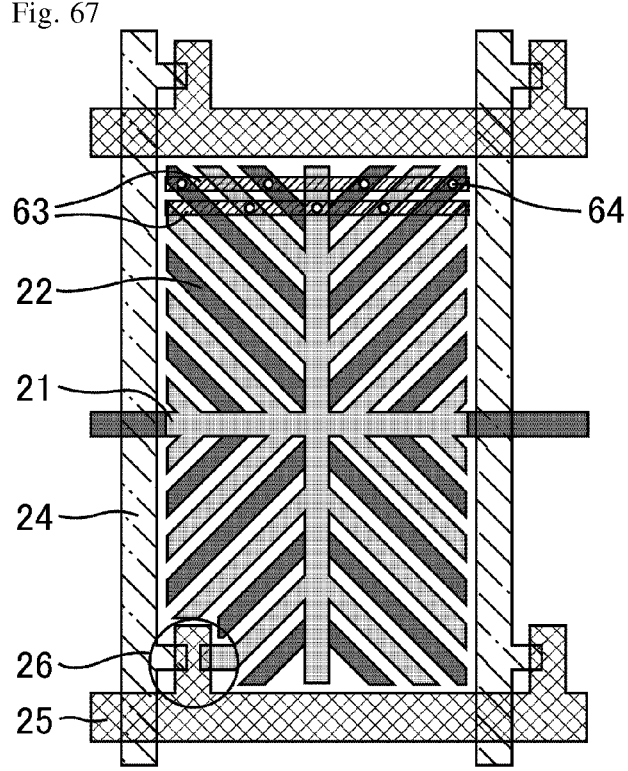
FIG. 67 is a planar schematic view showing a single sub-pixel unit of a TFT substrate provided in a liquid-crystal display device according to Embodiment 5-10.

FIG. 67 is a planar schematic view showing a single sub-pixel unit of a TFT substrate provided in a liquid-crystal display device according to Embodiment 5-10. As shown in FIG. 67, in the liquid-crystal display device according to Embodiment 5-10, the contact hole 64 is formed in the respective end portions of the comb teeth of the pixel electrode 21, the comb teeth of the common electrode 22, and the shaft of the pixel electrode 21. The bridge electrode 63 is linearly shaped, and two bridge electrodes 63 are disposed to overlap the end portions of the comb teeth of the pixel electrode 21, the end portions of the comb teeth of the common electrode 22, and the shaft of the pixel electrode 21. Further, of the two bridge electrodes 63, one is connected only to the pixel electrode 21 via the contact holes 64 and the other is connected only to the common electrode 22 via the contact holes 64.

By providing two bridge electrodes 63 connected to separate electrodes in this manner, when a disconnection occurs in one of the pixel electrode 21 and the common electrode 22, the signal voltage can be supplied to the entire pixel electrode 21 via one of the bridge electrodes 63 and the common voltage can be supplied to the entire common electrode 22 via the other bridge electrode 63. As a result, the likelihood of a pixel defect can be reduced.

Embodiment 5-11

Figure 68:
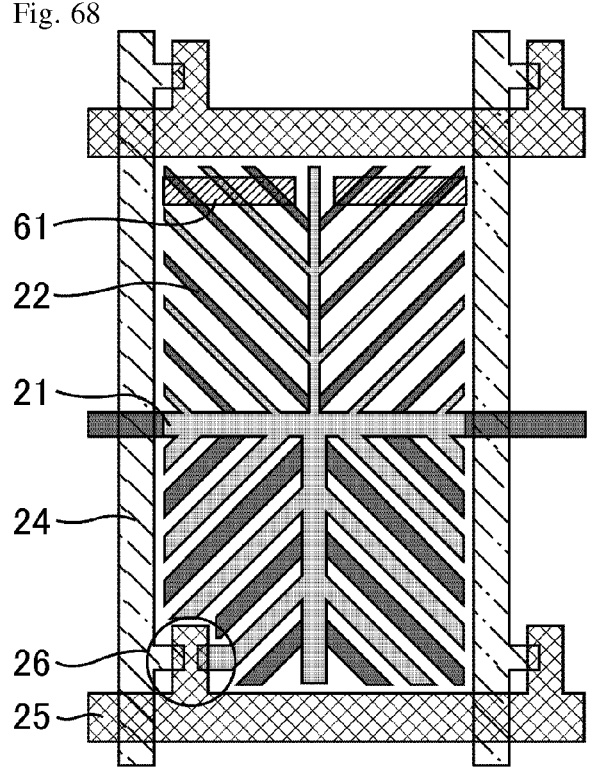
FIG. 68 is a planar schematic view showing a single sub-pixel unit of a TFT substrate provided in a liquid-crystal display device according to Embodiment 5-11.

FIG. 68 is a planar schematic view showing a single sub-pixel unit of a TFT substrate provided in a liquid-crystal display device according to Embodiment 5-11. As shown in FIG. 68, in the liquid-crystal display device according to Embodiment 5-11, the comb teeth on one side of the pixel electrode 21 and the common electrode 22 relative to a center line of the pixel electrode 21 are formed to be narrower than the comb teeth on the other side, and the floating electrode 61 is disposed in the region overlapping the end portions of the comb teeth of the pixel electrode 21 and the end portions of the comb teeth of the common electrode 22.

By disposing the floating electrode 61 to overlap the narrowly formed parts of the pixel electrode 21 and the common electrode 22, where a disconnection is more likely to occur, a disconnection in these narrowly formed parts can be corrected through laser irradiation.

Embodiment 5-12

Figure 69:
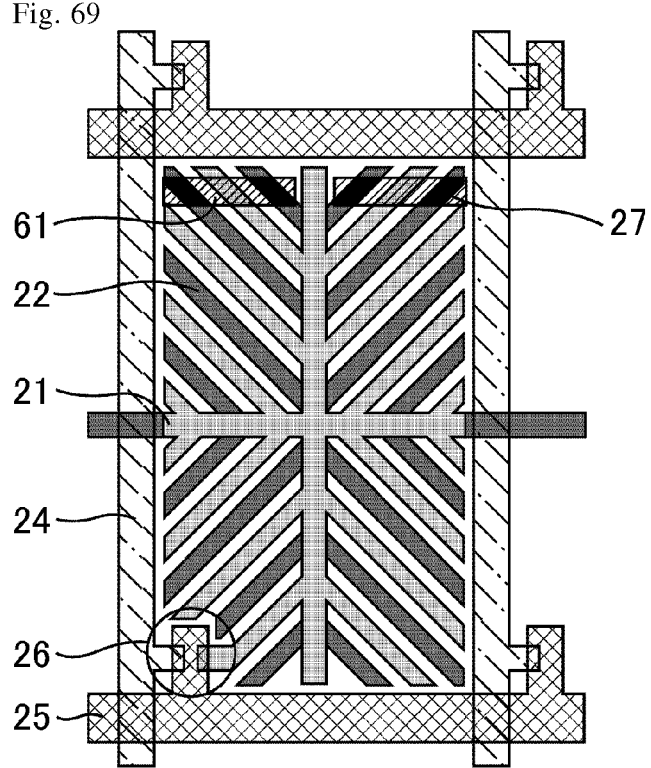
FIG. 69 is a planar schematic view showing a single sub-pixel unit of a TFT substrate provided in a liquid-crystal display device according to Embodiment 5-12.

FIG. 69 is a planar schematic view showing a single sub-pixel unit of a TFT substrate provided in a liquid-crystal display device according to Embodiment 5-12. As shown in FIG. 69, in the liquid-crystal display device according to Embodiment 5-12, the light shielding film is disposed respectively on the end portions of the comb teeth of the pixel electrode and the end portions of the comb teeth on one side of the common electrode.

As a result, similarly to Embodiment 1-7, an alignment disturbance can be prevented from adversely affecting the display quality even when a correction is performed through laser irradiation.

Embodiment 5-13

Figure 70:
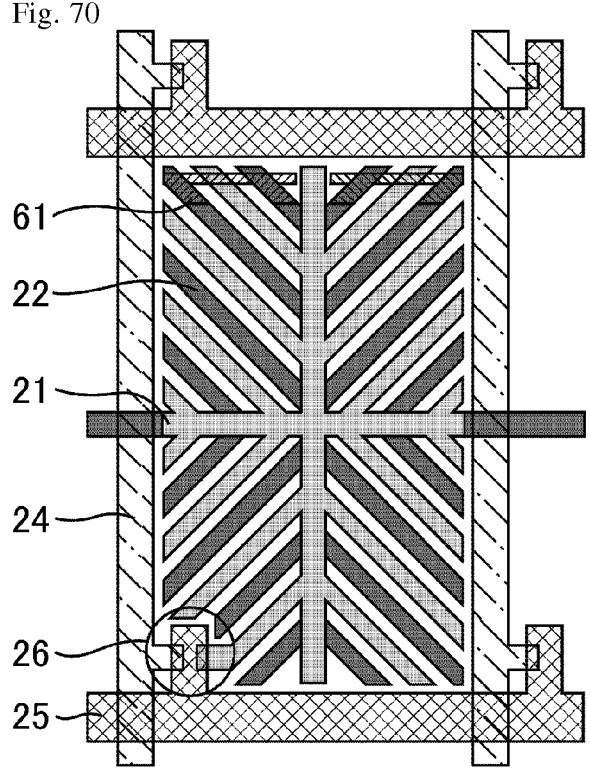
FIG. 70 is a planar schematic view showing a single sub-pixel unit of a TFT substrate provided in a liquid-crystal display device according to Embodiment 5-13.

FIG. 70 is a planar schematic view showing a single sub-pixel unit of a TFT substrate provided in a liquid-crystal display device according to Embodiment 5-13. As shown in FIG. 70, in the liquid-crystal display device according to Embodiment 5-13, the floating electrode 61 is formed to be wider in sites overlapping the end portions of the comb teeth of the pixel electrode 21 than in sites not overlapping the end portions of the comb teeth of the common electrode 22.

Similarly to Embodiment 1-8, by forming the sites overlapping the end portions of the comb teeth of the common electrode 22 to be wider in this manner, correction through laser irradiation becomes easier. Further, the transmittance can be improved in accordance with the reduction in width.

Embodiment 5-14

In a liquid-crystal display device according to Embodiment 5-14, a horizontal alignment layer is used instead of the vertical alignment layer used in Embodiments 5-1 to 5-13. In other words, the method of controlling the liquid crystal molecules in the liquid-crystal display device according to Embodiment 5-14 corresponds to the IPS mode. Accordingly, a planar schematic view showing a single sub-pixel unit of a TFT substrate provided in the liquid-crystal display device according to Embodiment 5-14 is similar to FIG. 57.

The method of controlling the liquid crystal molecules in the liquid-crystal display device according to Embodiment 5-14 is similar to that of Embodiment 1-10.

Embodiment 5-15

Figure 71:
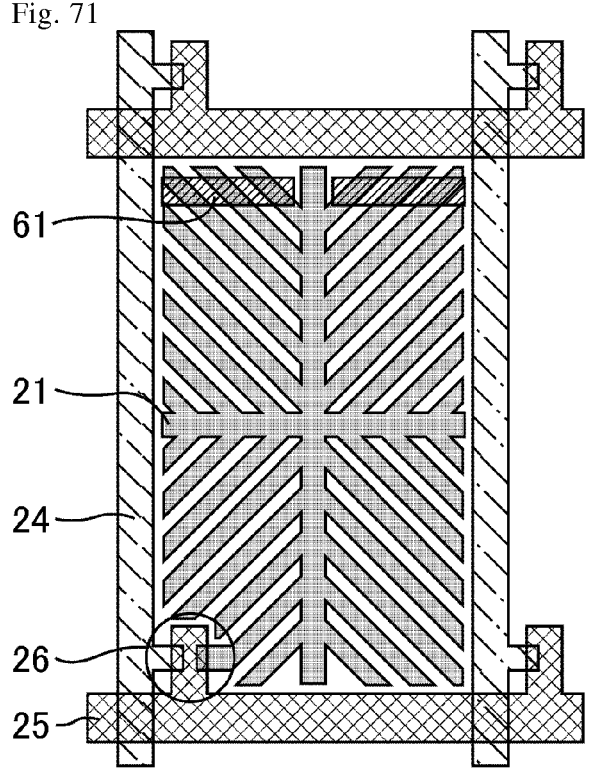
FIG. 71 is a planar schematic view showing a single sub-pixel unit of a TFT substrate provided in a liquid-crystal display device according to Embodiment 5-15.

FIG. 71 is a planar schematic view showing a single sub-pixel unit of a TFT substrate provided in a liquid-crystal display device according to Embodiment 5-15. As shown in FIG. 71, the TFT substrate of the liquid-crystal display device according to Embodiment 5-15 includes only the pixel electrode 21 and does not have a common electrode. The common electrode is disposed on the other substrate (the opposed substrate) opposing the TFT substrate. The common electrode on the opposed substrate has a planar shape without slits and without a detailed pattern such as that of the pixel electrode.

Figures 1, 72:
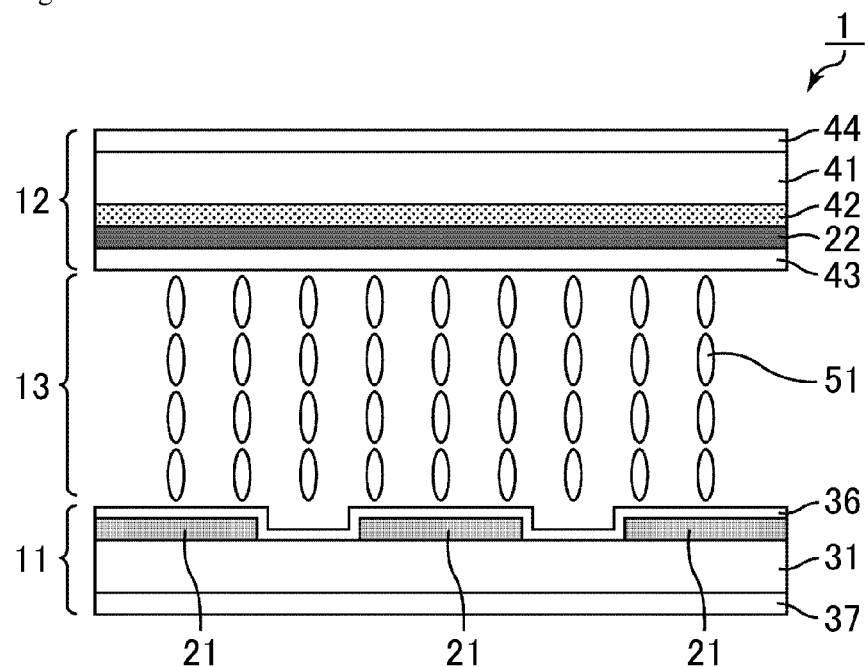
Figures 2, 72:
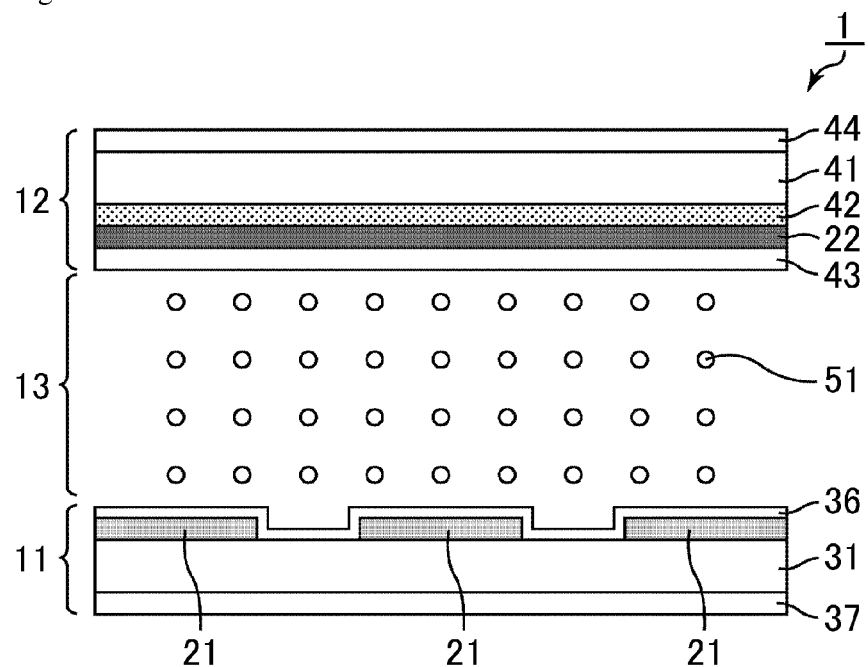
Figure 73:
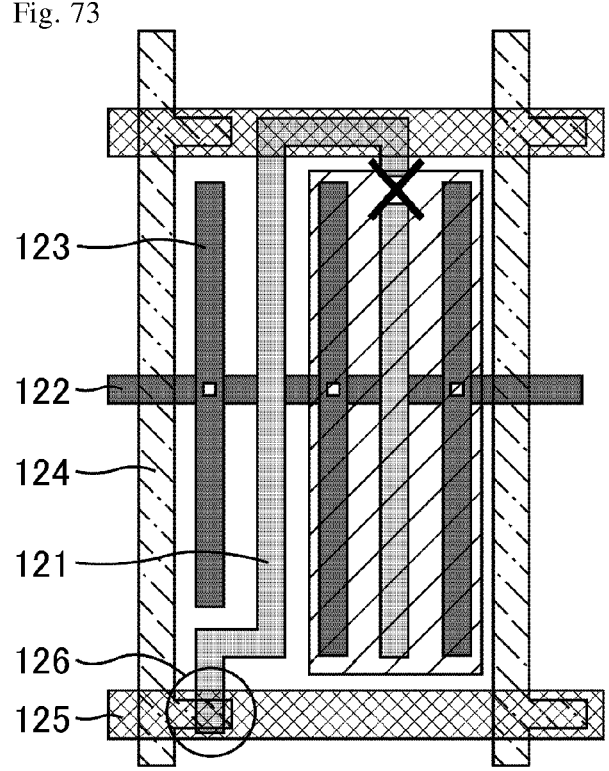
FIG. 73 is a planar schematic view showing a disconnection in a conventional liquid-crystal display device.

A method of controlling the liquid crystal molecules in the liquid-crystal display device according to Embodiment 5-15 will now be described. FIGS. 72-1 and 72-2 are sectional schematic views showing the liquid-crystal display device according to Embodiment 5-15 and illustrating the behavior of the liquid crystal molecules in particular detail. FIG. 72-1 shows a condition in which a voltage is not applied to the liquid crystal layer, and FIG. 72-2 shows a condition in which a voltage is applied to the liquid crystal layer.

As shown in FIGS. 72-1 and 72-2, the liquid crystal layer 13 is interposed between the pixel electrode 21 and the common electrode 22, and therefore, when a predetermined voltage is applied to the pixel electrode 21 and the common electrode 22, an electric field is formed in the liquid crystal layer 13, enabling control of the alignment of the liquid crystal molecules 51. A liquid crystal material having negative dielectric constant anisotropy is used in the liquid crystal layer 13, and the vertical alignment layers 36, 43 are disposed on respective surfaces of the TFT substrate 11 and the opposed substrate 12 that contact the liquid crystal layer 13.

As shown in FIG. 72-1, when no voltage is applied, the liquid crystal molecules 51 are aligned homeotropically, or in other words aligned vertically relative to the surfaces of the pair of substrates 11, 12. More specifically, the respective major axes of the rod-shaped liquid crystal molecules 51 are oriented in a substantially orthogonal direction to the substrate surfaces, and all of the liquid crystal molecules 51 are arranged regularly in an identical direction.

When a voltage is applied between the pixel electrode 21 and the common electrode 22, as shown in FIG. 72-2, the respective major axes of the liquid crystal molecules 51 tilt in a substantially horizontal direction relative to the surfaces of the pair of substrates 11, 12 and a substantially parallel direction to a length direction of the comb teeth of the pixel electrode.

Hence, likewise in a VA mode liquid-crystal display device, when a disconnection occurs in a comb tooth of the pixel electrode 21, an electric field is no longer formed between the pixel electrode 21 and the common electrode 22, and therefore a disturbance may occur in the alignment of the liquid crystal molecules, which is recognized as a pixel defect. Therefore, by forming the corrective floating electrode 61 to overlap the end portions of the comb teeth of the pixel electrode 21, a disconnection can be corrected through laser irradiation, and as a result, the signal voltage can be supplied to the entire pixel electrode 21.

Note that in Embodiments 5-1 to 5-14, the width of the comb teeth of the pixel electrode 21 and the width of the comb teeth of the common electrode 22 are preferably as narrow as possible. For example, the comb teeth of the pixel electrode 21 are formed at a width of 2 to 8 μm, and the comb teeth of the common electrode 22 are formed at a width of 2 to 10 μm. Likewise in Embodiment 5-15, the width of the comb teeth of the pixel electrode 21 is preferably as narrow as possible. For example, the comb teeth of the pixel electrode 21 are formed at a width of 2 to 8 μm.

Embodiments 5-1 to 5-15 were described above, but in the respective embodiments, a bridge electrode may be used instead of the floating electrode, as in Embodiment 5-5, for example, and respective features of Embodiments 5-1 to 5-15 may be combined in other ways.

The present application claims priority to Patent Application No. 2009-155457 filed in Japan on Jun. 30, 2009 under the Paris Convention and provisions of national law in a designated state, the entire contents of which are hereby incorporated by reference.

EXPLANATION OF REFERENCE NUMERALS

1: liquid crystal display panel
11: TFT substrate
12: opposed substrate
13: liquid crystal layer
21: pixel electrode
22: common electrode
23, 29, 62, 64: contact hole
24: source wiring (signal wiring)
25: gate wiring (scanning wiring)
26: TFT (thin film transistor)
27: light shielding film
28: extension wiring
31, 41: glass substrate
32: first insulating film
33: second insulating film
34: third insulating film
35: fourth insulating film
36, 43: vertical alignment layer
37, 44: polarizer
38, 45: horizontal alignment layer
42: color filter
51: liquid crystal molecules
61: floating electrode
62: laser device
63: bridge electrode

The invention claimed is:

1. A liquid-crystal display device comprising a liquid crystal layer and a pair of substrates between which the liquid crystal layer is interposed,
wherein at least one of the pair of substrates includes an electrode that applies a voltage to the liquid crystal layer,
the electrode that applies the voltage to the liquid crystal layer includes two or more linear portions, and
the substrate comprising the electrode that applies the voltage to the liquid crystal layer, from among the pair of substrates, includes a floating electrode that overlaps at least two of the two or more linear portions via an insulating film; wherein
the floating electrode is linearly shaped.

2. The liquid-crystal display device according to claim 1, wherein the floating electrode is composed of a metallic element.

3. The liquid-crystal display device according to claim 1, wherein the floating electrode overlaps respective end portions of the two or more linear portions.

4. The liquid-crystal display device according to claim 1, wherein a width of the floating electrode is substantially identical to a width of each of the two or more linear portions.

5. The liquid-crystal display device according to claim 1, wherein a width of the floating electrode is greater than a width of each of the two or more linear portions.

6. The liquid-crystal display device according to claim 1, wherein a width of the floating electrode in a site overlapping the two or more linear portions is greater than a width of the floating electrode in a site not overlapping the two or more linear portions.

7. The liquid-crystal display device according to claim 1, wherein the liquid-crystal display device comprises a plurality of floating electrodes, and
at least one of the plurality of floating electrodes overlaps one end portion of each of the two or more linear portions while at least one of the other of the plurality of floating electrodes overlaps another end portion of each of the two or more linear portions.

8. The liquid-crystal display device according to claim 1, wherein the liquid-crystal display device comprises a plurality of floating electrodes, and
at least two of the plurality of floating electrodes each overlap one end portion of each of the two or more linear portions.

9. The liquid-crystal display device according to claim 1, wherein the respective end portions of the two or more linear portions overlap a light shielding film.

10. The liquid-crystal display device according to claim 1, wherein the substrate comprising the electrode that applies the voltage to the liquid crystal layer includes scanning wirings and signal wirings, and the floating electrode is disposed within a range surrounded by the scanning wirings and the signal wirings.

11. The liquid-crystal display device according to claim 1, wherein the floating electrode is disposed in a position farther from the liquid crystal layer than the electrode that applies the voltage to the liquid crystal layer.

12. The liquid-crystal display device according to claim 1, wherein the electrode that applies the voltage to the liquid crystal layer is a comb-shaped electrode comprising a shaft portion and two or more comb teeth that project from the shaft portion, and the two or more linear portions are the two or more comb teeth.

13. The liquid-crystal display device according to claim 12, wherein the liquid-crystal display device comprises a pair of the comb-shaped electrodes, and respective comb teeth of the pair of comb-shaped electrodes are disposed alternately via fixed intervals.

14. The liquid-crystal display device according to claim 12, wherein the floating electrode overlaps the comb teeth of both of the pair of comb-shaped electrodes.

15. The liquid-crystal display device according to claim 12, wherein the floating electrode overlaps comb teeth of a comb-shaped electrode having a larger number of comb teeth, from among the pair of comb-shaped electrodes.

16. The liquid-crystal display device according to claim 12, wherein the floating electrode overlaps comb teeth of a comb-shaped electrode comprising narrower comb teeth, from among the pair of comb-shaped electrodes.

* * * * *